US009134890B2

(12) United States Patent
Fujimoto et al.

(10) Patent No.: US 9,134,890 B2
(45) Date of Patent: Sep. 15, 2015

(54) DISPLAY INPUT DEVICE AND IMAGE FORMING APPARATUS HAVING TOUCH PANEL

(71) Applicant: KYOCERA Document Solutions Inc., Osaka (JP)

(72) Inventors: Norie Fujimoto, Osaka (JP); Yasuhiro Sekiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 225 days.

(21) Appl. No.: 13/856,372

(22) Filed: Apr. 3, 2013

(65) Prior Publication Data

US 2013/0275898 A1 Oct. 17, 2013

(30) Foreign Application Priority Data

Apr. 11, 2012 (JP) ................................. 2012-090060

(51) Int. Cl.
| | | |
|---|---|---|
| *G06F 13/00* | (2006.01) | |
| *G06F 15/00* | (2006.01) | |
| *G06F 3/0484* | (2013.01) | |
| *G06F 3/0488* | (2013.01) | |

(52) U.S. Cl.
CPC ........ *G06F 3/04842* (2013.01); *G06F 3/04883* (2013.01); *G06F 2203/04808* (2013.01)

(58) Field of Classification Search
CPC .................................. G03B 5/00; G03B 15/00
USPC ........................... 715/861–863, 763–765, 780
See application file for complete search history.

(56) References Cited

U.S. PATENT DOCUMENTS

| | | | |
|---|---|---|---|
| 2010/0033579 A1* | 2/2010 | Yokohata et al. ............. | 348/169 |
| 2011/0007175 A1* | 1/2011 | Fujita et al. ................ | 348/222.1 |
| 2011/0055773 A1* | 3/2011 | Agarawala et al. ........... | 715/863 |
| 2012/0026100 A1* | 2/2012 | Migos et al. .................. | 345/173 |

FOREIGN PATENT DOCUMENTS

| | | |
|---|---|---|
| JP | 2006139186 A | 6/2006 |
| JP | 2006260575 A | 9/2006 |
| JP | 2010033455 A | 2/2010 |
| JP | 2011023818 A | 2/2011 |
| WO | 2011013778 A1 | 2/2011 |

OTHER PUBLICATIONS

GIMP X Inkscape Design Idea Book, Shinyusha Co. Ltd., Apr. 1, 2012, 4 pages.

* cited by examiner

*Primary Examiner* — Kevin Nguyen
(74) *Attorney, Agent, or Firm* — Alleman Hall McCoy Russell & Tuttle LLP

(57) ABSTRACT

A display input device includes a display portion, a touch panel portion, and a determination portion. The display portion displays a screen and an image, and displays a plurality of objects as images whose display positions are movable. The touch panel portion is provided for the display portion, and accepts a user's input, and detects a plurality of positions being touched. The determination portion determines whether two points being touched are in the vertical direction or the horizontal direction. The touch panel portion accepts an input of selecting, as selected objects, some or all of the objects displayed on the display portion. When the touch panel portion has detected that two-point touching has been performed thereon in the state where the objects are selected, the display portion aligns the display positions of the selected objects, based on the direction of the touched two points and movement of the touched points.

13 Claims, 25 Drawing Sheets

DISPLAY INPUT DEVICE AND IMAGE FORMING APPARATUS HAVING TOUCH PANEL

INCORPORATION BY REFERENCE

This application is based upon and claims the benefit of priority from the corresponding Japanese Patent Application No. 2012-090060 filed on Apr. 11, 2012, the entire contents of which are incorporated herein by reference.

BACKGROUND

The present disclosure relates to a display input device having a display portion and a touch panel portion, and to an image forming apparatus having the touch panel portion.

Some of various electric apparatuses and electronic apparatuses have a display panel attached thereon. The display panel is combined with a touch panel allowing a setting input or an operation of the apparatus. When a user performs an operation or an input, a new image is displayed at any position on a screen of the display panel. An example of the new image thus displayed is an electronic label. When a user performs an input of characters or the like (for example, a note or a message), an electronic label is created. Then, every time a screen on which the electronic label is pasted (posted) is displayed, the electronic label is displayed on the screen.

An image forming apparatus that newly displays (posts), on a screen, such information including characters or the like in response to an input from a user, has been known. The image forming apparatus includes a display portion, an information input portion, a display position setting portion, a storage portion, a label information generation portion, and a label image display portion. The display portion displays an operation screen. The information input portion allows a user to input message information on the operation screen. The display position setting portion sets a display position of the message information on the operation screen. The storage portion stores therein the message information and the display position thereof. The label information generation portion causes the storage portion to register therein, as label information, information in which operation screen information at the time of inputting and setting the message information and the display position is associated with the message information and the display position having been input and set on the operation screen. The label image display portion reads, from the storage portion, the label information corresponding to the operation screen information displayed on the display portion, and displays, on the operation screen, the label image corresponding to the read label information. This configuration facilitates transmission and display of message information such as supplementary operation instructions, reminders, memorandums, and the like on various operation screens, thereby realizing an image forming apparatus with improved operability.

Image forming apparatuses such as copying machines, multifunction peripherals, printers, FAX machines, and the like also include an operation panel including a combination of a display panel and a touch panel. Even a fixed display panel of an image forming apparatus may display a plurality of objects that are images whose display positions are movable. It is noted that examples of the objects include: an image indicating an electronic label as described above (an image containing text data such as a note, like a paper label); and an image (an icon) indicating data or a file.

SUMMARY

A display input apparatus according to one aspect of the present disclosure includes a display portion, a touch panel portion, and a determination portion. The display portion displays a screen and an image, and displays a plurality of objects which are images whose display positions are movable. The touch panel portion is provided for the display portion, accepts an input from a user, and detects a plurality of positions that are touched. The determination portion determines whether two points that are touched are in the vertical direction or in the horizontal direction. The touch panel portion accepts an input of selecting, as selected objects, some or all of the objects displayed on the display portion. When the touch panel portion has detected that two-point touching has been performed thereon in the state where the objects are selected, the display portion aligns the display positions of the selected objects in accordance with the direction of the touched two points and movement of the touched points.

An image forming apparatus according to another aspect of the present disclosure includes a display portion, a touch panel portion, and a determination portion. The display portion displays a screen and an image, and displays a plurality of objects which are images whose display positions are movable. The touch panel portion is provided for the display portion, accepts an input from a user, and detects a plurality of positions that are touched. The determination portion determines whether two points that are touched are in the vertical direction or in the horizontal direction. The touch panel portion accepts an input of selecting, as selected objects, some or all of the objects displayed on the display portion. When the touch panel portion has detected that two-point touching has been performed thereon in the state where the objects are selected, the display portion aligns the display positions of the selected objects in accordance with the direction of the touched two points and movement of the touched points.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to FIGS. 1 to 27. In the following description, a multifunction peripheral 100 (corresponding to an image forming apparatus) including an operation panel 1 (corresponding to a display input device) is used as an example. It is noted that matters such as configurations, arrangements, and the like described in the present embodiment are not intended to limit the scope of the present disclosure, and are merely illustrative.

(Schematic Configuration of Image Forming Apparatus)

Figure 1:
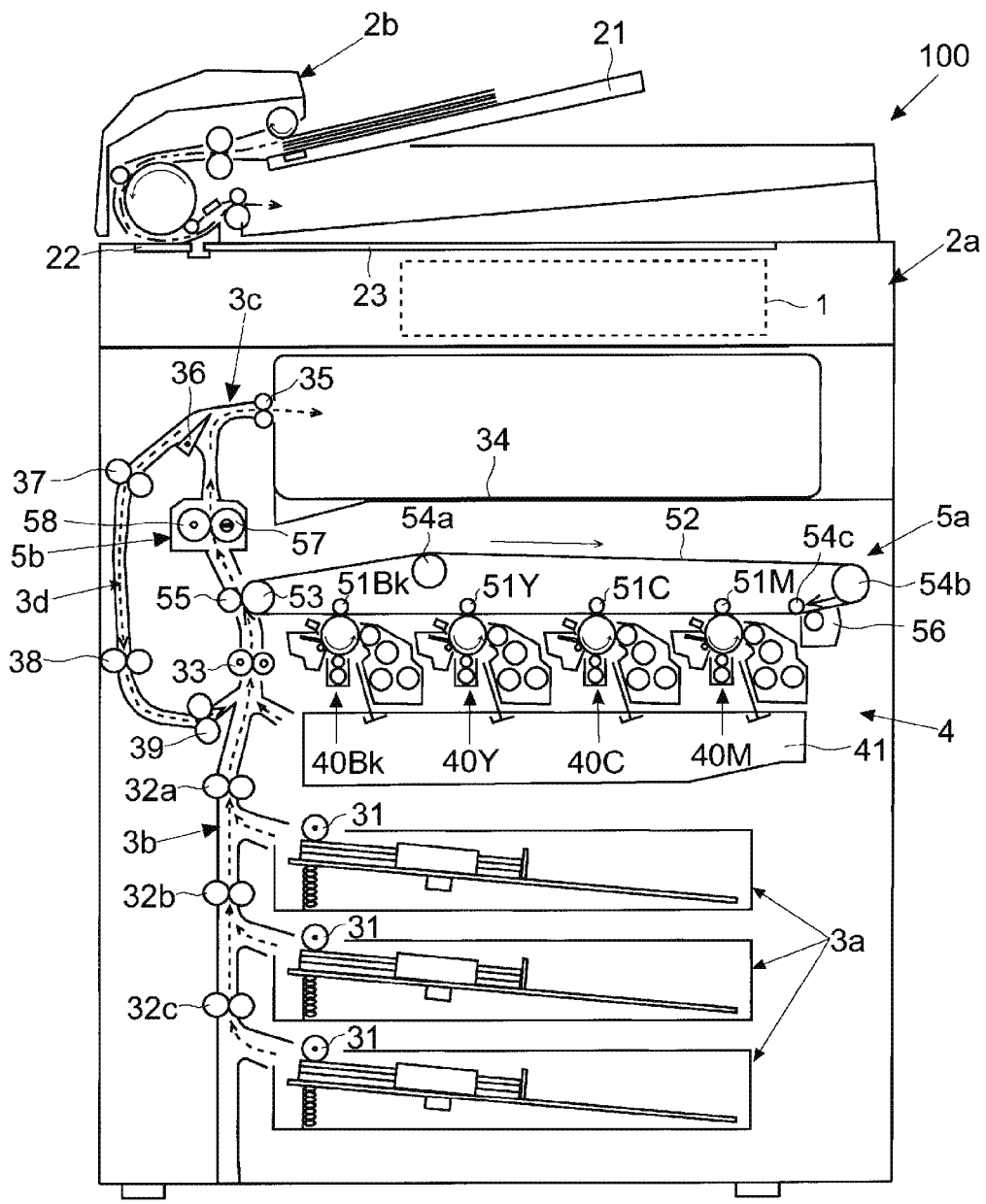
FIG. 1 is a front schematic sectional view showing an example of a multifunction peripheral according to an embodiment of the present disclosure.

First, with reference to FIG. 1, the schematic configuration of the multifunction peripheral 100 according to an embodiment will be described. FIG. 1 is a front schematic sectional view showing an example of the multifunction peripheral 100.

As shown in FIG. 1, the operation panel 1 (described later in detail) that allows various types of setting for the multifunction peripheral 100 is provided so as to be directed forward, on the front surface of the multifunction peripheral 100. In addition, as shown in FIG. 1, the multifunction peripheral 100 of the present embodiment has an image reading portion 2a and a document sheet conveying portion 2b which are provided on an upper portion, and has sheet feed portions 3a, a conveying portion 3b, an image forming portion 4, an intermediate transfer portion 5a, a fixing portion 5b, a discharge conveying portion 3c, a both-side conveying portion 3d, and the like which are provided inside.

The document sheet conveying portion 2b has a document sheet tray 21. Document sheets to be copied or scanned are placed on the document sheet tray 21. Then, the document sheet conveying portion 2b automatically and continuously conveys the document sheets one by one from the document sheet tray 21 to a reading position (conveying reading contact glass 22). In addition, the document sheet conveying portion 2b is attached to the image reading portion 2a in an openable and closable fashion in the up-down direction via a supporting point at the back of the drawing of FIG. 1. The document sheet conveying portion 2b functions as a cover for pressing contact glass (conveying reading contact glass 22 and placement reading contact glass 23) of the image reading portion 2a from above.

As shown in FIG. 1, the conveying reading contact glass 22 and the placement reading contact glass 23 are provided on the upper surface of the image reading portion 2a. When a document sheet of a book or the like is to be read one by one, the document sheet is placed on the placement reading contact glass 23. Inside the image reading portion 2a, a lamp, a mirror, a lens, an image sensor, and the like are provided (not shown). The image sensor reads the document sheet, based on light reflected from the document sheet passed on the conveying reading contact glass 22 by the document sheet conveying portion 2b or a document sheet placed on the placement reading contact glass 23. Then, the image sensor converts the reflected light to an analog electric signal corresponding to the shading of an image, and quantizes the electric signal. Thus, image data of the document sheet is obtained. It is noted that the image reading portion 2a of the present embodiment can perform reading in color and also reading in black and white.

The plurality of sheet feed portions 3a in a main body of the multifunction peripheral 100 each contain a plurality of sheets of paper having the corresponding size (for example, an A-series or B-series formal size such as A4 sheet or B4 sheet, a letter size, or the like), including various types of paper (for example, copy paper, recycled paper, heavy paper, OHP sheet, and the like). The sheet feed portions 3a each have a sheet feed roller 31 which is rotationally driven, thereby conveying a sheet of paper one by one to the conveying portion 3b upon printing.

The conveying portion 3b is a passage that conveys a sheet of paper inside the apparatus from the sheet feed portion 3a to the image forming portion 4. The conveying portion 3b has provided therein: a guide plate that guides a sheet of paper; conveying roller pairs 32 (in FIG. 1, a total of three pairs of rollers 32a, 32b, and 32c from above) which are rotationally driven when a sheet of paper is conveyed; a registration roller pair 33 that causes a conveyed sheet of paper to stand by just before the image forming portion 4 and conveying the sheet of paper at a timing of transferring a formed toner image; and the like.

The image forming portion 4 includes a plurality of image forming units 40 (40Bk for black, 40Y for yellow, 40C for cyan, and 40M for magenta) and an exposure device 41. The image forming units 40 each have a photosensitive drum supported so as to be rotationally driven, a charging device provided around the photosensitive drum, a developing device, a cleaning device, and the like. Based on image data read by the image reading portion 2a, image data stored in a storage device 62 described later, or the like, the exposure device 41 emits laser light while turning on or off the laser light, and scans and exposes each photosensitive drum with the laser light. Then, by each of the image forming units 40 and the exposure device 41, a toner image is formed on the circumferential surface of each photosensitive drum.

The intermediate transfer portion 5a receives primary transfer of a toner image from each of the image forming units 40, and performs secondary transfer onto a sheet of paper. The intermediate transfer portion 5a includes primary transfer rollers 51Bk to 51M, an intermediate transfer belt 52, a drive roller 53, a plurality of driven rollers 54 (54a to 54c), a secondary transfer roller 55, a belt cleaning device 56, and the like. The intermediate transfer belt 52 is stretched over the drive roller 53 and the like, and circulates by rotational driving of the drive roller 53 connected to a drive mechanism (not shown) such as a motor. Then, transfer voltage is applied to each of the primary transfer rollers 51Bk to 51M, and a toner image of each photosensitive drum is transferred to the intermediate transfer belt 52. After the intermediate transfer belt 52 has received primary transfer such that the toner images are superimposed thereon without displacement, the toner image is transferred to a sheet of paper by the secondary transfer roller 55 to which predetermined voltage is applied.

The fixing portion 5b fixes a toner image transferred to a sheet of paper. The fixing portion 5b includes a heating roller 57 having a heat generator therein, and a pressure roller 58 pressed to the heating roller 57. When the sheet of paper passes through a nip portion between the heating roller 57 and the pressure roller 58, toner is heated and melted, whereby the toner image is fixed on the sheet of paper. The sheet of paper discharged from the fixing portion 5b is conveyed toward the discharge tray 34.

The discharge conveying portion 3c sorts printed sheets of paper by switching the paper conveying direction between the direction to the discharge tray 34 and the direction to the both-side conveying portion 3d. The discharge conveying portion 3c has a discharge roller pair 35 which is rotationally driven in a forward rotational direction so as to convey the sheet of paper in the direction to the discharge tray 34 or reversely rotates so as to perform switchback for both-side printing. Further, the discharge conveying portion 3c has a switch flap 36 that switches the conveying direction of a sheet of paper. The switch flap 36 is configured to turn. The switch flap 36 is set at, as a basic position, a position for guiding a sheet of paper in the direction to the discharge tray 34 by closing the both-side conveying portion 3d, and upon both-side printing, turns to guide a switched-back sheet of paper having been printed for its one side, to the both-side conveying portion 3d. The both-side conveying portion 3d links the downstream side of the fixing portion 5b to the upstream side of the registration roller pair 33. In the both-side conveying portion 3d, a plurality of both-side conveying roller pairs 37 to 39 which are rotationally driven are provided for both-side printing, whereby a sheet of paper having been printed for its one side is conveyed.

(Operation Panel 1)

Figure 2:
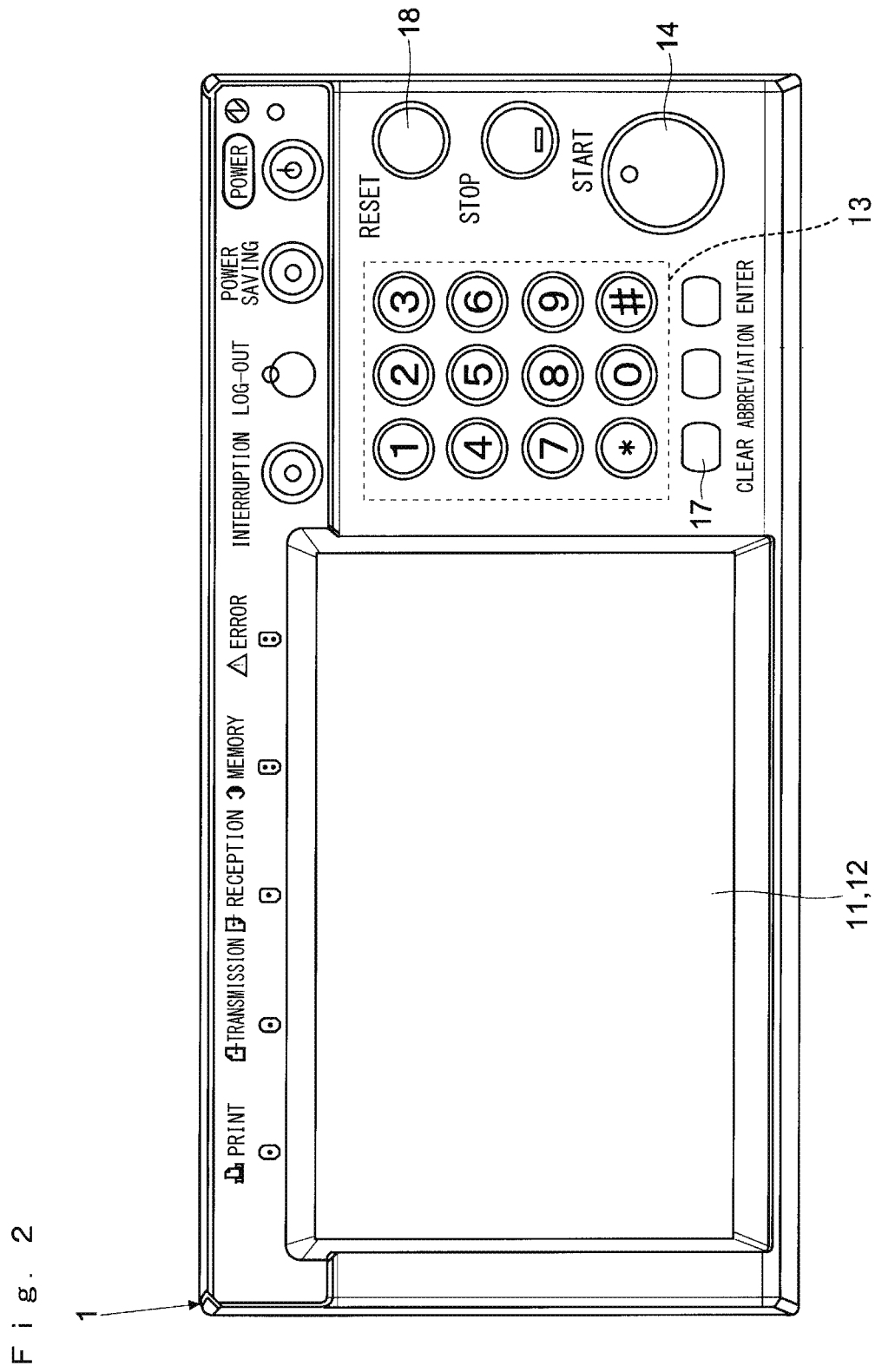
FIG. 2 is a plane view showing an example of an operation panel according to the embodiment of the present disclosure.

Next, with reference to FIG. 2, an example of the operation panel 1 according to an embodiment will be described. FIG. 2 is a plane view showing an example of the operation panel 1.

As shown in FIG. 1, the operation panel 1 is provided on an upper portion of the front surface of the multifunction peripheral 100. The operation panel 1 includes a display portion 11, a touch panel portion 12, and hardware keys (for example, a numeric keypad portion 13 for numeric input and a start key 14 for instruction to start processing such as copying).

For example, the display portion 11 is a liquid crystal display panel. The display portion 11 may be another type of display panel such as an organic EL panel. The display portion 11 displays a screen or an image on which a menu or a key that allows setting of the multifunction peripheral 100. A user can designate a key displayed on the display portion 11, thereby inputting various settings of the multifunction peripheral 100. The display portion 11 displays various images or screens indicating a status message or the like of the multifunction peripheral 100 or the like.

The touch panel portion 12 is provided on an upper surface of the display portion 11. The touch panel portion 12 detects a position or coordinates touched by a user. By comparing the display position of a key with the touched position, a key designated by a user is specified and the user's input is accepted.

The touch panel portion 12 can recognize a plurality of positions touched at the same time. Therefore, a touch panel of projected capacitive type can be used for the touch panel portion 12. It is noted that it is only necessary to recognize a plurality of positions touched at the same time, and the touch panel portion 12 is not necessarily limited to a projected capacitive type.

The display portion 11 of the present embodiment displays objects 8. Each object 8 is an image that can be additionally provided (displayed) by performing an input to the operation panel 1, and also is an image whose display position is movable. The objects 8 can be aligned by using the touch panel portion 12. Examples of the objects 8 include an electronic label 81 (an image like memorandum containing a character string), and an image indicating data or a file (the details will be described later).

(Hardware Configurations of Multifunction Peripheral 100 and the Like)

Figure 3:
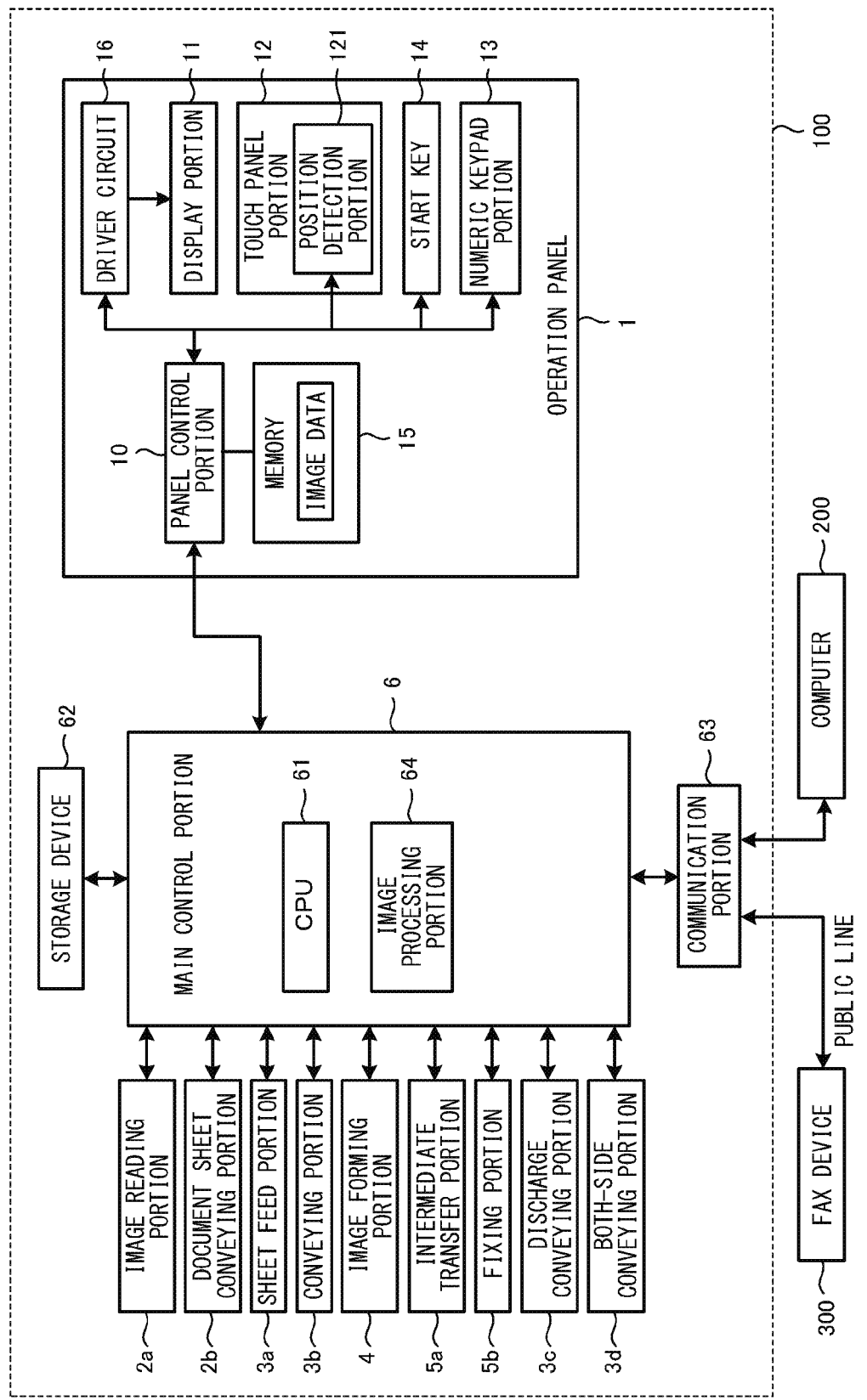
FIG. 3 is a block diagram showing an example of the hardware configurations of the multifunction peripheral and the operation panel according to the embodiment of the present disclosure.

Next, with reference to FIG. 3, an example of the hardware configurations of the multifunction peripheral 100 and the operation panel 1 according to the present embodiment will be described. FIG. 3 is a block diagram showing an example of the hardware configurations of the multifunction peripheral 100 and the operation panel 1.

A main control portion 6 is provided in the main body of the multifunction peripheral 100. For example, the main control portion 6 is connected to the operation panel 1, the document sheet conveying portion 2b, the image reading portion 2a, the sheet feed portion 3a, the conveying portion 3b, the image forming portion 4, the fixing portion 5b, the discharge conveying portion 3c, and the like, and controls these portions.

For example, the main control portion 6 includes a device that controls a CPU 61 and the like. The CPU 61 performs an arithmetic operation based on a developable control program stored in the storage device 62, thereby controlling each portion in the multifunction peripheral 100. It is noted that the main control portion 6 may be divided into several types of units for respective functions such as a main control portion that performs overall control and image processing, and an engine control portion that controls printing by, for example, performing image formation or turning on or off a motor and the like that rotate various rotary bodies. In the present embodiment, the case where such control portions are integrated as the main control portion 6 will be described.

The storage device 62 is connected to the main control portion 6. The storage device 62 is composed of a combination of a non-volatile device and a volatile device such as ROM, RAM, and HDD. The storage device 62 is configured to store various data such as a control program, control data, setting data, and image data of the multifunction peripheral 100.

The main control portion 6 is connected to an interface portion (hereinafter, referred to as a communication portion 63) having various connectors, a socket, a FAX modem, and the like. The communication portion 63 can be connected to a plurality of external computers 200 (for example, a personal computer or a server) or other FAX devices 300 (in FIG. 3, one external computer 200 and one FAX device 300 are shown for convenience) via a network, a public line, or the like. For example, image data obtained by the image reading portion 2a can be stored in the storage device 62 (box function), or can be transmitted to the external computer 200 or the other FAX device 300 (scanner function and FAX function). In addition, when image data is transmitted from the external computer 200 or the other FAX device 300 and inputted to the multifunction peripheral 100, the image data can be printed (printer function) or transmitted by FAX (FAX function), for example.

For example, the main control portion 6 has provided therein an image processing portion 64 that performs image processing for image data obtained by reading a document sheet by the image reading portion 2a or image data inputted to the multifunction peripheral 100 via the communication portion 63. For example, the image data processed by the image processing portion 64 is transmitted to the exposure device 41 so as to be used for scanning and exposure of the photosensitive drum, or is stored in the storage device 62.

The main control portion 6 recognizes an input given to the operation panel 1, and controls the multifunction peripheral 100 so that a job such as copying or scanning will be performed in accordance with the user's setting. The operation panel 1 of the present embodiment includes a panel control portion 10 (corresponding to a determination portion), the display portion 11, the touch panel portion 12, the hardware keys (for example, the numeric keypad portion 13 and the start key 14), a memory 15, a driver circuit 16, and the like. The panel control portion 10 is composed of a CPU, an IC, and the like. The panel control portion 10 controls display of the display portion 11, receives an output of the touch panel portion 12, and specifies a touched position (coordinates). Data such as a table indicating the correspondence between the output and the position (coordinates) of the touch panel portion 12 is stored in the memory 15. The memory 15 includes a ROM and a RAM. The panel control portion 10 compares a touched position with image data of a screen displayed on the display portion 11 when the position is touched, and recognizes a key displayed at the touched position. Thus, the panel control portion 10 recognizes a key designated by a user.

In a normal operation, a user selects each function of the multifunction peripheral 100, and selects setting items (for example, in the case of copy function, expansion/reduction, density, aggregation, both-side printing, and the like) that can be set on the selected function. In order to set setting values for the selected setting item, the user repeats designation (selection) of a key displayed on the display portion 11 from the display (a home screen 7, see FIG. 4) at the uppermost layer on the display portion 11. Then, the user switches the display screen of the display portion 11 upon every designation (selection) of a key. Finally, the setting values of the function that the user desires to set, are set. The panel control portion 10 recognizes that the selection and setting of the function have been performed, and transmits the recognized content to the main control portion 6 of the main body. Then, the main control portion 6 causes each portion such as the image forming portion 4 to perform an operation reflecting therein the function selected and set on the operation panel 1 so that the user's intension will be reflected in a job such as printing.

Image data of a screen or an image displayed on the display portion 11 is stored in, for example, the memory 15 in the operation panel 1. Therefore, the panel control portion 10 reads image data of a screen or an image to be next displayed, from the memory 15, in accordance with a key displayed at a touched position. It is noted that the image data of a screen or an image to be displayed on the display portion 11 may be stored in the storage device 62 on the main body side. In this case, the operation panel 1 receives image data to be displayed on the display portion 11, from the storage device 62 via the main control portion 6. In any case, the panel control portion 10 gives an instruction to the driver circuit 16 (for example, if the display portion 11 is a liquid crystal display panel, a liquid crystal driver IC) that actually controls the display of the display portion 11, thereby causing the display portion 11 to perform display based on image data. It is noted that the operation panel 1 may not have the panel control portion 10 and the memory 15, and instead, the components (the CPU 61 and the storage device 62) of the main control portion 6 may serve the functions of the panel control portion 10 and the memory 15.

The touch panel portion 12 has provided thereon a position detection portion 121 that detects a touched position. For example, the position detection portion 121 is an IC that detects a touched position (the coordinates of a touched point). For example, if the touch panel portion 12 includes a panel of projected capacitive type, the position detection portion 121 detects variation in the capacitance on the touch panel portion 12, and outputs a signal indicating one or a plurality of positions touched at the same time. The panel control portion 10 recognizes the touched position based on the output of the position detection portion 121.

(Home Screen 7 and Selection of Function)

Figure 4:
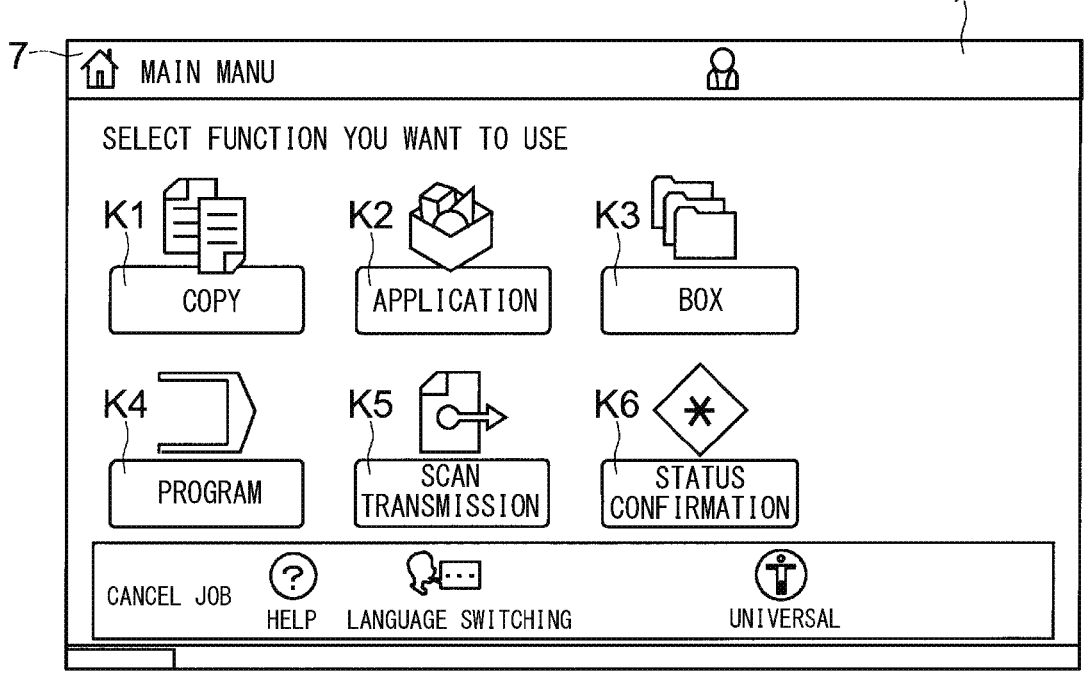
FIG. 4 is an explanation diagram showing an example of a home screen 7 displayed on the operation panel according to the embodiment of the present disclosure.

Next, with reference to FIG. 4, the home screen 7 displayed on the operation panel 1 of the present embodiment will be described. FIG. 4 is an explanation diagram showing an example of the home screen 7 displayed on the operation panel 1.

On the operation panel 1 of the present embodiment, the home screen 7 that allows selection of a function to be used is provided. Hierarchically, the home screen 7 is positioned at the uppermost layer. For example, when a clear key 17 or a reset key 18 (see FIG. 2) provided on the operation panel 1 is pressed, the panel control portion 10 causes the display portion 11 to display the home screen 7. In addition, for example, when a predetermined time has elapsed since an input to the operation panel 1 (an operation of touching the touch panel portion 12 or pressing a hardware key) is finished or when a job is completed, the panel control portion 10 may discard the current setting and cause the display portion 11 to display the home screen 7 (automatic clearing).

For example, on the home screen 7, a copy key K1, an application key K2, a box key K3, a program key K4, a scan transmission key K5, and a status confirmation key K6 are provided as function selection keys. The touch panel portion 12 outputs data (signal) indicating a touched position to the panel control portion 10. Based on an output of the touch panel portion 12, the panel control portion 10 recognizes that a function corresponding to the function selection key displayed at the touched position has been designated. Then, the panel control portion 10 displays an initial setting screen of the designated function. For example, when it is recognized that a copy function has been designated, the panel control portion 10 displays an initial setting screen 71 of the copy function. Thus, a user can select a function to be used, on the home screen 7.

(Electronic Label 81)

Figure 5:
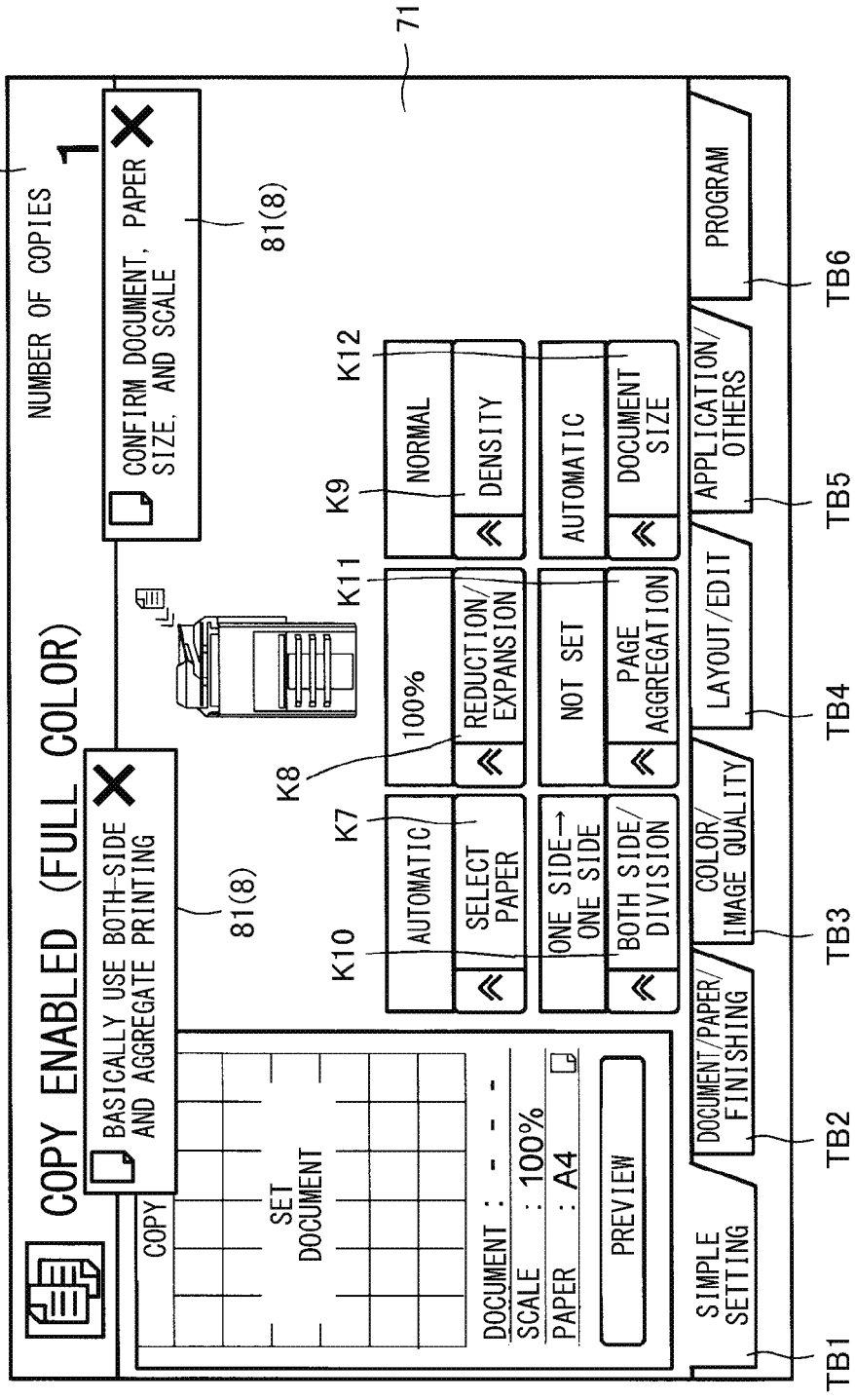
FIG. 5 is an explanation diagram showing an example of an initial setting screen of a copy function, on which an electronic label is pasted, according to the embodiment of the present disclosure.
Figure 6:
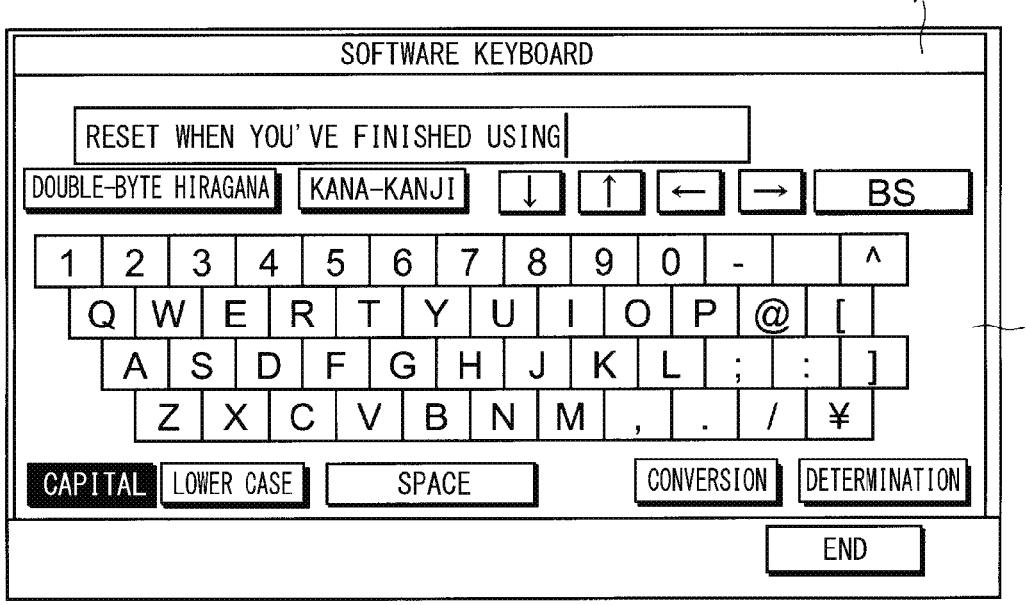
FIG. 6 is an explanation diagram showing an example of a software keyboard screen according to the embodiment of the present disclosure.

Next, with reference to FIGS. 5 and 6, the electronic label 81 as the object 8 will be described. FIG. 5 is an explanation diagram showing an example of the initial setting screen 71 of the copy function, on which the electronic label 81 is pasted. FIG. 6 is an explanation diagram showing an example of a software keyboard screen 72.

As described above, the object 8 is an image whose display position is variable. With reference to FIGS. 5 and 6, the electronic label 81 as an example of the object 8 will be described. It is noted that the electronic label 81 is an image to be displayed on the display portion 11, which is pasted on a screen like a paper label and contains text data such as a note.

In order to describe the electronic label 81, first, an example of a setting screen of the copy function shown in FIG. 5 will be described. The initial setting screen 71 of the copy function shown in FIG. 5 is a screen that the panel control portion 10 first causes the display portion 11 to display when the copy key K1 is pressed on the home screen 7.

As shown in FIG. 5, for example, a plurality of simple setting keys K7 to K12 that allow setting of setting items that are often used are provided on the initial setting screen 71 of the copy function. In FIG. 5, the simple setting key K7 for a setting item of "paper selection", the simple setting key K8 for a setting item of "expansion/reduction", and the like are displayed as an example.

In order to set setting items that are not displayed on the initial setting screen 71 (including a large number of setting items, e.g., a setting item of frame elimination, a setting item of margin, a setting item of reading resolution, and a setting item of document type), a position of a document/paper/finishing tab TB2, a color/image quality tab TB3, a layout/edit tab TB4, an application/others tab TB5, or a program tab TB6 displayed side by side with a simple setting tab TB1, is to be touched. The above setting items are each associated with one of the tabs in advance. When a position where the tab is displayed is touched, the panel control portion 10 causes the display portion 11 to display a setting screen on which a list of setting keys indicating the setting items associated with the tab designated by the touching operation is displayed. A user touches a display position of any tab, and then, touches a display position of one of the setting keys of the setting items displayed at this time, thereby designating the desired setting item. Thus, the panel control portion 10 displays a setting screen for the designated setting item. For example, when a user designates a setting item of aggregate printing, on a setting screen for aggregate printing, the user can set a setting value such as 2 in 1 or 4 in 1 or a setting value such as the type of boundary line. Thus, while switching the setting screen, the user can set a setting value of a desired setting item.

Next, creation of the electronic label 81 will be described. In order to create the electronic label 81, a user performs a predetermined operation to the operation panel 1, on a screen (setting screen) on which the user desires to newly paste the electronic label 81. For example, a method of touching for starting creation of the electronic label 81, such as a method of touching the same position a plurality of times (for example, two or three times) or a method of keeping touching a touched position without moving the position, may be defined in advance. A hardware key that calls a mode for creating the electronic label 81 on the operation panel 1 and pasting the electronic label 81 on the screen, may be provided on the operation panel 1.

When the panel control portion 10 has recognized that the touch panel portion 12 has accepted an instruction input for creating the electronic label 81, the panel control portion 10 causes the display portion 11 to display the software keyboard screen 72 as shown in FIG. 6. The touch panel portion 12 accepts a touch on keys of characters, signs, and the like that are displayed. Based on the output of the touch panel portion 12, the panel control portion 10 recognizes a key displayed at a touched position, and recognizes the input content (a character, a number, or a sign that has been inputted). The touch panel portion 12 also accepts correction or deletion of the input content. Thus, a user can manually input a kanji character, a kana character, katakana, an alphabet, a number, various signs to be displayed on the electronic label 81, by using the software keyboard.

Then, when the touch panel portion 12 has accepted an input for closing the software keyboard screen 72, the panel control portion 10 displays the electronic label 81 containing the content inputted on the software keyboard screen 72, on a screen on which an instruction to create the electronic label 81 is given. In FIG. 5, as an example, the display portion 11 displays the electronic label 81 containing a character string of "CONFIRM DOCUMENT, PAPER SIZE, AND SCALE" on the upper right of the initial setting screen 71 of the copy function, and the electronic label 81 containing a character string of "BASICALLY USE BOTH-SIDE AND AGGREGATE PRINTING".

By touching the electronic label 81 and moving the touched position, a user can set the display position of the electronic label 81 to a desired position. In other words, based on the output of the touch panel portion 12, the panel control portion 10 recognizes an operation of touching the display position of the electronic label 81 and moving the touched position while keeping touching the touched position (drag-and-drag operation), and causes the display portion 11 to move the display position of the touched electronic label 81 in accordance with the movement of the touched position.

For example, the memory 15 of the operation panel 1 stores, for each of the electronic labels 81, object data including: information indicating a screen on which the created electronic label 81 is to be displayed; information indicating a display position (coordinates) thereof on the screen; the size of the electronic label 81; and information indicating a content (a character string or the like) contained in the electronic label 81. The object data may be stored in the storage device 62. When the display of the display portion 11 is switched, the panel control portion 10 confirms the stored object data to confirm whether or not there is an electronic label 81 to be displayed. If there is an electronic label 81 to be displayed, the panel control portion 10 causes the display portion 11 to display the electronic label 81. Thus, when the screen is switched, the panel control portion 10 causes the display portion 11 to display the created electronic label 81 on the newly displayed screen.

It is noted that on each of the electronic labels 81 (in an area of the image of the electronic label 81), a mark of x is displayed. When the touch panel portion 12 has accepted that a display position of the mark of x has been touched, the panel control portion 10 causes the display portion 11 to quit displaying the electronic label 81 for which the mark of x has been touched. Thus, a user can delete the electronic label 81 that is unnecessary.

(Image Indicating Data and Image Indicating Folder)

Figure 7:
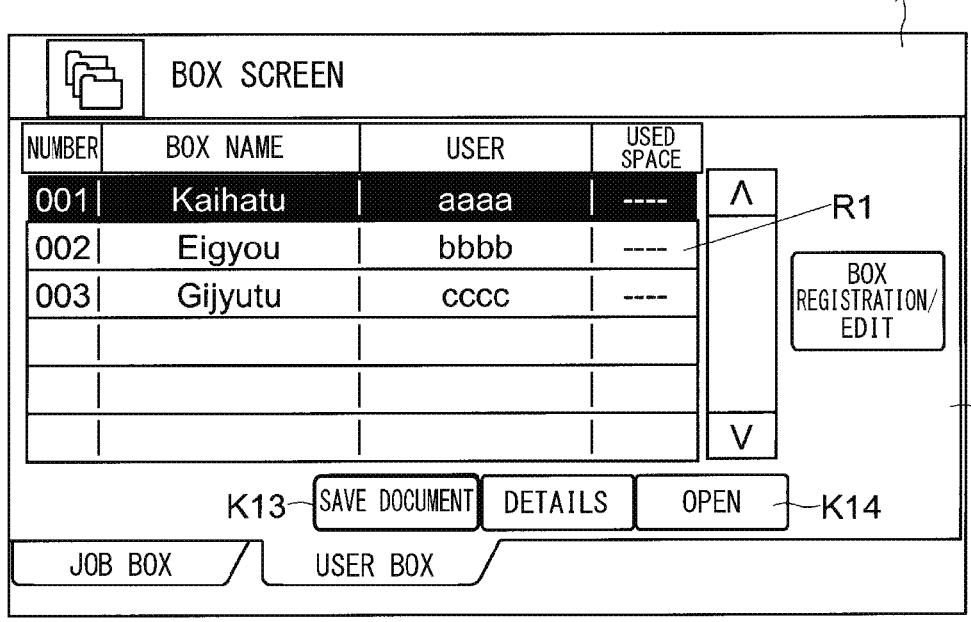
FIG. 7 is an explanation diagram showing an example of an initial setting screen of a box function according to the embodiment of the present disclosure.
Figure 8:
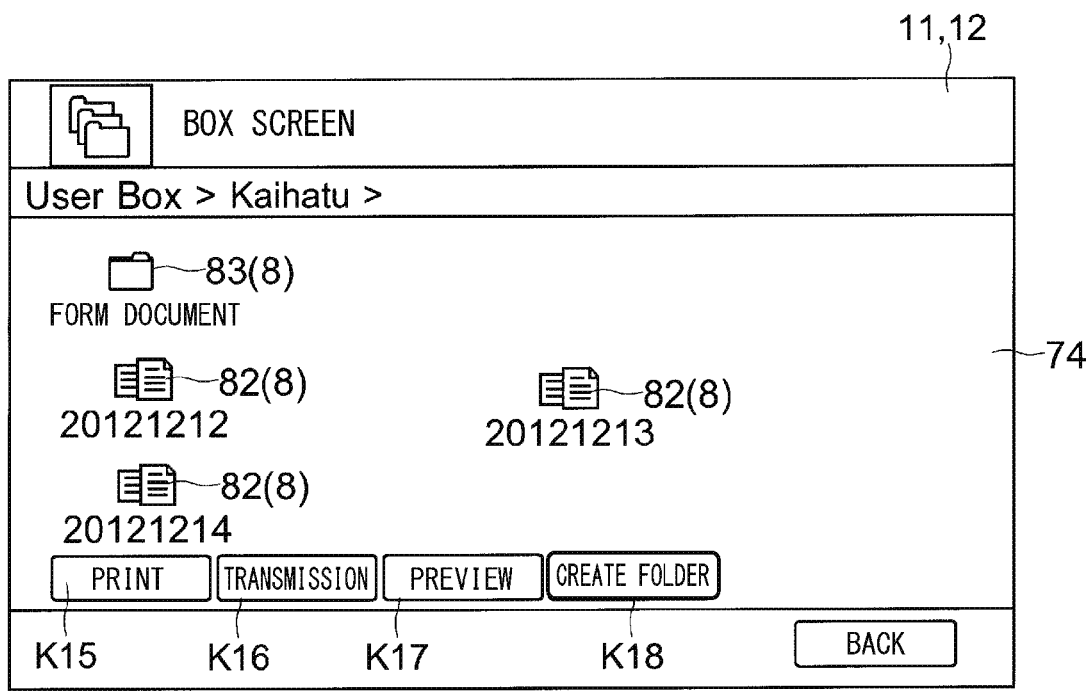
FIG. 8 is an explanation diagram showing an example of a box screen on which an image indicating data and an image indicating a folder are displayed, according to the embodiment of the present disclosure.

Next, with reference to FIGS. 7 and 8, as the object 8, an image indicating data (hereinafter, for convenience, referred to as a "data image 82") and an image indicating a folder (hereinafter, for convenience, referred to as a "folder image 83") will be described. FIG. 7 is an explanation diagram showing an example of an initial setting screen 73 of a box function. FIG. 8 is an explanation diagram showing an example of a box screen 74 on which an image indicating data and an image indicating a folder are displayed.

In order to describe the data image 82 and the folder image 83, first, an example of various setting screens of the box function shown in FIGS. 7 and 8 will be described. When a display position of the box key K3 is touched to designate the box function on the home screen 7, the panel control portion 10 causes the display portion 11 to display the initial setting screen 73 shown in FIG. 7 as a first setting screen of the box function. A part of the storage area of the storage device 62 (HDD) is allocated for the box function. For example, a user can store image data in a box and can reuse (printing, transmission, or the like) the image data stored in the box.

A box name list display area R1 is provided on the initial setting screen 73. By touching the box name list display area R1, a user can designate a box to be used. Then, after designating the box, by touching a display position of a document saving key K13, the user can store image data obtained by reading a document sheet by the image reading portion 2a, in the designated box (the HDD of the storage device 62). The panel control portion 10 newly creates a data image 82 corresponding to the image data newly stored in the box, and causes the display portion 11 to display the data image 82 as an image indicating the image data when the box is opened. It is noted that when the document saving key K13 is designated, the panel control portion 10 causes the display portion 11 to display a setting screen of a scanning content (for example, a screen that allows setting of a resolution, the size of a document sheet, and the size of image data obtained by reading), thereby causing the user to perform setting about reading of a document sheet and storage of image data in the box. In addition, after designating the box, by touching a display position of an open key K14, the user can reuse (printing or transmission) the data such as the image data stored in the box.

Then, when the open key K14 is designated in the state where a box is designated, as shown in FIG. 8, the panel control portion 10 displays the box screen 74 which is a setting screen about usage (printing or transmission) of data stored in the designated box, thereby causing a user to perform setting about reuse of the data stored in the box. FIG. 8 shows an example of the box screen 74 displayed when "Kaihatu" is opened, among the boxes shown in FIG. 7.

The panel control portion 10 causes the display portion 11 to display, on the box screen 74, the data image 82 indicating data stored in a box and the folder image 83 indicating a folder created in the box. For example, the data image 82 is a combination of an icon and a document name (data name). It is noted that information such as a creation date and/or a size may be displayed together with the data image 82.

The folder image 83 includes an image indicating an icon and a folder name. When a display position of the data image 82 or the folder image 83 is touched, the touch panel portion 12 accepts an input for designating data or a folder to be used. When the panel control portion 10 has recognized, based on the output of the touch panel portion 12, that the display position of the folder image 83 has been touched, the panel control portion 10 causes the display portion 11 to newly display the data image 82 corresponding to data determined to be contained in the folder (one-layer down in the folder hierarchy).

A print key K15, a transmission key K16, a preview key K17, a folder creation key K18, and the like are provided on the box screen 74. In the state where data to be used is designated, when the touch panel portion 12 has accepted that a display position of the print key K15 has been touched, the main control portion 6 controls paper feed, paper conveying operation, and image formation, to perform printing based on data corresponding to the designated data image 82. In the state where data to be used is designated, when the touch panel portion 12 has accepted that a display position of the transmission key K16 has been touched, the main control portion 6 controls the image processing portion 64 and the communication portion 63, to transmit data corresponding to the designated data image 82. In the state where data to be used is designated, when the touch panel portion 12 has accepted that a display position of the preview key K17 has been touched, the panel control portion 10 causes the display portion 11 to display a preview image indicating the content of data corresponding to the designated data image 82. When the touch panel portion 12 has accepted that a display position of the folder creation key K18 has been touched, the panel control portion 10 displays the software keyboard screen 72 as shown in FIG. 6, creates a folder having a folder name set on the software keyboard screen 72, and causes the display portion 11 to display the folder image 83 of the created folder.

For example, when a data image 82 or a folder image 83 is newly created, the memory 15 of the operation panel 1 stores, for each data image 82 or folder image 83 created, object data including: information indicating a screen on which the image is to be displayed; information indicating a display position (coordinates) of the image on the screen; the size of the image to be displayed; and a content (name or the like) contained in the data image 82 or the folder image 83. Further, regarding a data image 82 or a folder image 83, whose display position has been moved, the memory 15 updates the information indicating a screen on which the image is to be displayed, and the information indicating a display position (coordinates) of the image on the screen, thereby updating the object data. Then, when the display of the display portion 11 is switched, the panel control portion 10 confirms the content (object data) stored in the memory 15 to confirm whether or not there is a data image 82 or a folder image 83 to be displayed. If there is a data image 82 or a folder image 83 to be displayed, the panel control portion 10 causes the display portion 11 to display the image. Thus, when the screen is switched, the panel control portion 10 causes the display portion 11 to display the data image 82 or the folder image 83 on the newly displayed screen in accordance with the definition of the object data.

It is noted that since there are a variety of setting screens, here, for convenience, only some of the setting screens of the copy function and the box function have been described. However, although not shown, when an application function is designated, the panel control portion 10 causes the display portion 11 to display an initial setting screen for calling or setting an application installed in the storage device 62. For example, such an application is a program or data that enhances the usability of the multifunction peripheral 100. For example, there are a variety of applications for intended uses, such as an application that converts image data obtained by scanning a document such as a name card into text data or a database, and an application that converts data obtained by scanning a document into an electronic document.

When a scan transmission function is designated, the panel control portion 10 causes the display portion 11 to display a setting screen for transmitting image data obtained by reading a document sheet by the image reading portion. The scan transmission function is a function of causing the image reading portion 2a to read a document sheet along with the start of a job, and transmitting image data of the read document sheet as an E-mail or transmitting the image data to a desired computer 200 or a desired FAX device 300. For example, a user can perform various settings, such as designating an address of a transmission destination on an address book screen, or designating a desired transmission method.

When a program function is designated, the panel control portion 10 causes the display portion 11 to display an initial setting screen for calling (activating) a predetermined program or creating a program. The program defines in advance the setting values of one or a plurality of setting items on the operation panel 1. For example, the setting values of each setting item that are often used in combination are defined as the program in advance (registered in advance). When the program is called, the panel control portion 10 recognizes that setting has been performed by the setting values of each setting item defined by the called program. Thus, a user can set the setting values of a plurality of setting items by one touch.

When the status confirmation key K6 is designated, the panel control portion 10 causes the display portion 11 to display a status display screen that indicates the status of the multifunction peripheral 100. For example, the panel control portion 10 causes the display portion 11 to display the content of a job currently being executed, such as a printing state or a document reading state, on the status display screen. The panel control portion 10 may cause the display portion 11 to display the cumulative total number of printed sheets, a remaining sheet amount of each sheet feed portion 3a, or the like on the status display screen. Alternatively, the panel control portion 10 may cause the display portion 11 to display the status of each device or portion in the multifunction peripheral 100, such as the used memory or remaining memory of the storage device 62.

The display portion 11 may display an object 8 such as an electronic label 81 or a data image 82 on the screen displayed when any of the application function, the scan transmission function, the program function, and the status confirmation function is selected.

(Summary of Alignment of Objects 8 and Selection of Objects 8 to be Aligned)

Next, a summary of alignment of objects 8 and selection of the objects 8 to be aligned will be described.

As described above, the operation panel 1 of the present embodiment displays objects 8 such as electronic labels 81 on the various setting screens. By performing an input to the touch panel portion 12, a user can perform alignment of a plurality of objects 8. In order to perform alignment of objects 8 displayed on the display portion 11, first, the user selects an object 8 to be aligned. It is noted that in the following description, an object 8 that has been selected is referred to as a "selected object 9".

A procedure and an operation method for selecting an object 8 can be freely determined. For example, a user may select an object 8 by performing an operation of tracing the touch panel portion 12 with a finger. In this case, based on an output of the touch panel portion 12, the panel control portion 10 recognizes a trajectory of the touched position, thereby recognizing that one or a plurality of objects 8 displayed on the trajectory of the touched position have been selected. Alternatively, the user may select an object 8 by touching a position where the object 8 is displayed (by touching two or more points at the same time if the user desires to select two or more objects). In this case, based on the output of the touch panel portion 12, the panel control portion 10 recognizes one or a plurality of touched positions, thereby recognizing that one or a plurality of objects 8 displayed at the touched positions have been selected. Alternatively, each object 8 may be provided with a checkbox, and the user may select an object 8 by performing an operation of checking the corresponding checkbox. In this case, based on the output of the touch panel portion 12, the panel control portion 10 recognizes the object 8 corresponding to the checkbox whose display position has been touched, thereby recognizing that the object 8 is selected. Thus, there are various manners of selecting an object 8. In any case, the touch panel portion 12 accepts that an object 8 has been selected, and the panel control portion 10 recognizes the selected object 8.

After selecting the object(s) 8, the user can perform alignment of the selected object(s) 9 by performing two-point touching (how the alignment is performed will be described later in detail). The panel control portion 10 causes the display portion 11 to perform alignment of the selected object(s) 9, in accordance with the direction of the touched two points (the vertical direction or the horizontal direction) and the manner of moving the touched points.

Two-point touching performed on the touch panel portion 12 by a user may be regarded as selection of all objects 8 displayed on the screen. In other words, "selection of objects 8" means selection of all objects 8 displayed on the screen. In this case, the touch panel portion 12 accepts the two-point touching. Then, based on the output of the touch panel portion 12, the panel control portion 10 recognizes that all the objects 8 displayed on the display portion 11 have been selected. Thereafter, all the objects 8 displayed on the screen are aligned in accordance with the manner of moving the touched points.

Alternatively, a predetermined input to the touch panel portion 12 by a user (for example, touching substantially the same position several consecutive times) may be regarded as selection of all objects 8 displayed on the screen. Then, the user may touch an object 8 to be excluded from the objects 8 to be aligned, whereby the object 8 displayed at the touched position is excluded from the selected objects. In other words, all the displayed objects 8 are selected once, and then an object 8 not to be aligned is released from its selected state by touching or the like. In this case, the touch panel portion 12 accepts the predetermined input. Then, based on the output of the touch panel portion 12, the panel control portion 10 recognizes that all the objects 8 displayed on the display portion 11 have been selected. In addition, the touch panel portion 12 accepts the input for excluding an object 8 from among the objects 8 being selected. Based on the output of the touch panel portion 12, the panel control portion 10 recognizes the object 8 to be excluded from the objects 8 to be aligned (to be released from its selected state) among the objects 8 displayed on the display portion 11. Thereafter, the selected objects 9 are aligned in accordance with the two-point touching and the manner of moving the touched points.

As described above, the touch panel portion 12 accepts the input of selecting some or all of the objects 8 displayed on the display portion 11, as the selected objects 9. Then, based on the output from the touch panel portion 12, the panel control portion 10 recognizes that some or all of the objects 8 displayed on the display portion 11 have been selected.

(Determination of Positional Relationship Between Touched Two Points)

Figure 9:
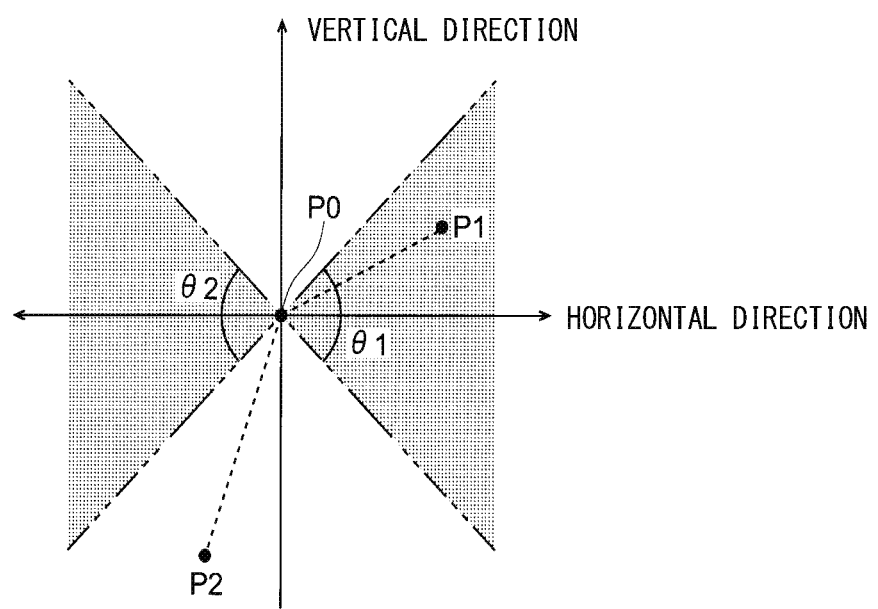
FIG. 9 is an explanation diagram showing an example of determination of the vertical and horizontal positional relationships between two points being touched, based on the angle between the two points, according to the embodiment of the present disclosure.
Figure 10:
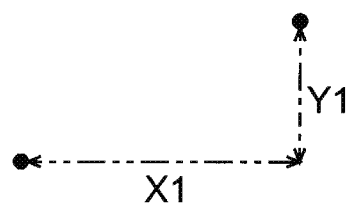
FIG. 10 is an explanation diagram showing an example of determination of the vertical and horizontal positional relationships between two points being touched, based on the distance between the two points, according to the embodiment of the present disclosure.

Next, with reference to FIGS. 9 and 10, a method of determining the positional relationship between two points that are touched at the same time as selection of objects 8, will be described. FIG. 9 is an explanation diagram showing an example of determination of the vertical and horizontal positional relationships between two points being touched, based on the angle between the two points. FIG. 10 is an explanation diagram showing an example of determination of the vertical and horizontal positional relationships between two points being touched, based on the distance between the two points.

As described above, the operation panel 1 of the multifunction peripheral 100 of the present embodiment allows selection of objects 8 such as electronic labels 81 displayed on various setting screens, and alignment of the selected objects. Then, the panel control portion 10 determines whether two points touched on the touch panel portion 12 are in the vertical direction or the horizontal direction, and causes the display portion 11 to perform alignment of the selected objects 9 in accordance with the result of the determination and the manner of moving the touched two points. Hereinafter, determination of the positional relationship between the touched two points will be described.

First, based on the output of the touch panel portion 12, the panel control portion 10 recognizes the positions (coordinates) of the two points touched at the same time. Then, the panel control portion 10 determines whether the touched two points are in the vertical direction or the horizontal direction, based on the angle between the two points. Specifically, as shown in FIG. 9, the panel control portion 10 sets one of the two points being touched, as a base point P0. Which one of the two points is set as a base point P0 may be freely determined. For example, the panel control portion 10 may always select, as a base point P0, a lower (or upper) point in the vertical direction, between the two points.

Then, the panel control portion 10 determines whether the touched two points are in the vertical direction or in the horizontal direction, based on whether or not the point other than the base point P0 is included in a predetermined angle range with respect to the base point P0. In FIG. 9, a range of −45° to 45° about the base point P0 (an angle range θ1 that is shaded) and a range of 135° to 225° about the base point P0 (an angle range θ2 that is shaded) are shown as predetermined angle ranges. The angle ranges may be freely determined.

An example will be described with reference to FIG. 9. In FIG. 9, a point P1 is included (falls) in the predetermined angle range with respect to the base point P0. In this case, the panel control portion 10 determines that the touched two points (the base point P0 and the point P1) are positioned in the horizontal direction. On the other hand, in the example of FIG. 9, a point P2 is not included (does not fall) in the predetermined angle range with respect to the base point P0. In this case, the panel control portion 10 determines that the touched two points (the base point P0 and the point P2) are positioned in the vertical direction.

Further, the panel control portion 10 may determine whether the two points being touched are in the vertical direction or in the horizontal direction, based on which is longer or shorter, the distance between the two points in the vertical direction or the distance between the two points in the horizontal direction. Specifically, as shown in FIG. 10, the panel control portion 10 compares the distance between the touched two points in the horizontal direction (horizontal direction distance X1) to the distance between the touched two points in the vertical direction (vertical direction distance Y1). If the horizontal direction distance X1 is longer than the vertical direction distance Y1, the panel control portion 10 determines that the touched two points are positioned in the horizontal direction. On the other hand, if the vertical direction distance Y1 is longer than the horizontal direction distance X1, the panel control portion 10 determines that the touched two points are positioned in the vertical direction.

(Left-Alignment of Selected Object 9)

Figure 11:
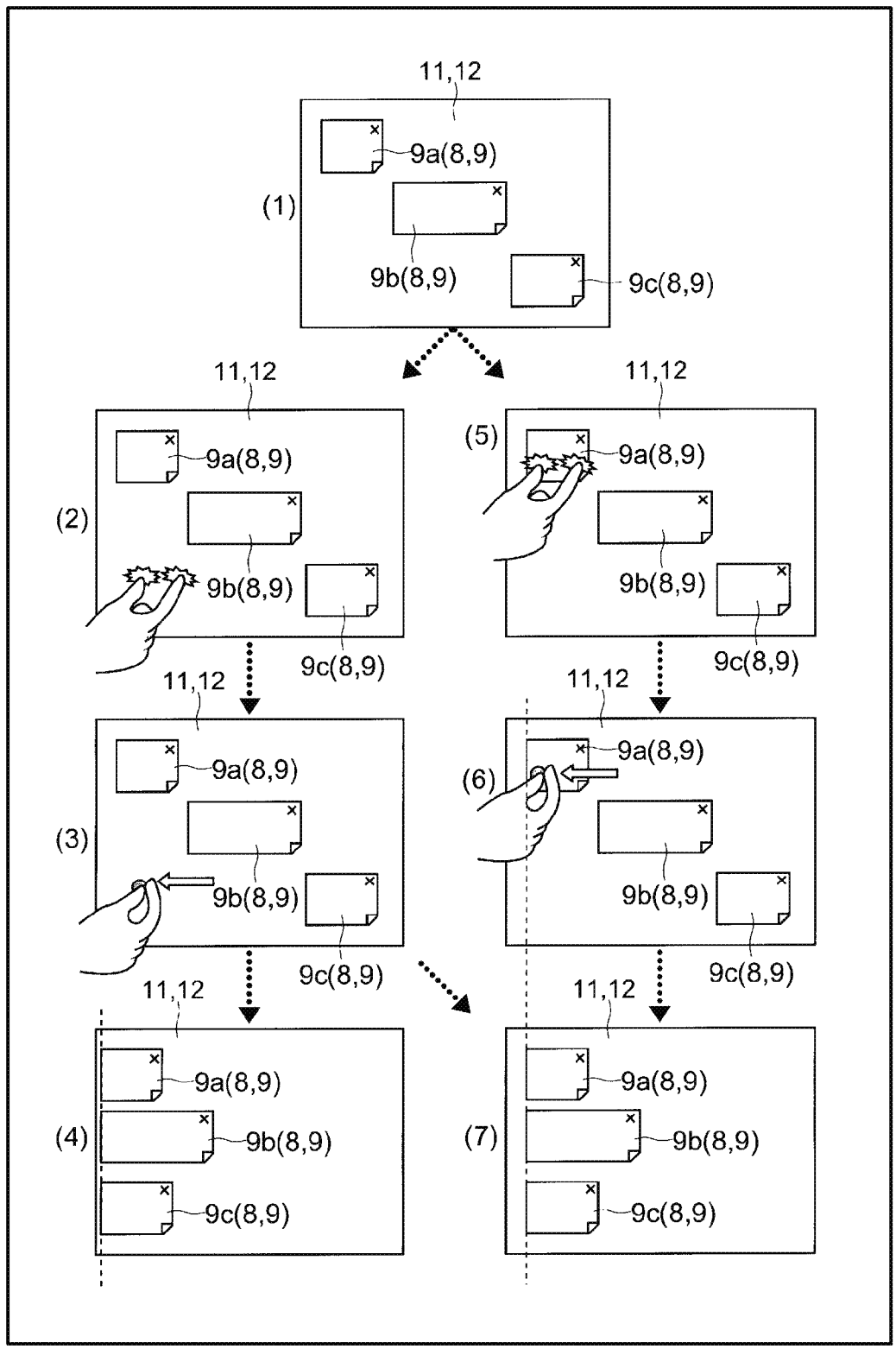
FIG. 11 is an explanation diagram showing an example of a manner of left-alignment of selected objects, according to the embodiment of the present disclosure.

Next, with reference to FIG. 11, an example of left-alignment of selected objects 9 on the operation panel 1 according to the present embodiment will be described. FIG. 11 is an explanation diagram showing an example of a manner of left-alignment of selected objects 9. It is noted that although objects 8 are actually displayed on various screens such as a setting screen, in FIG. 11 and subsequent figures, for convenience, screens to be actually displayed are omitted, and only objects 8 are shown. Further, in FIG. 11 and subsequent figures, electronic labels 81 are shown as examples of objects. However, the following description can be similarly applied to objects 8 other than the electronic labels 81. Further, in FIG. 11 and subsequent figures, an example of performing two-point touching with a thumb and an index finger is shown. However, fingers to be used for two-point touching differ among users (for example, an index finger and a middle finger may be used).

First, in FIG. 11, a diagram at the uppermost stage (a diagram appended with (1)) shows that three objects 8 displayed on the display portion 11 are selected (selected objects 9a to 9c). In advance of alignment, the selected object 9a is displayed at the upper left, the selected object 9b is displayed substantially at the center, and the selected object 9c is displayed at the lower right.

In FIG. 11, a diagram on the left side at the second stage from the top (a diagram appended with (2)) shows that, in the state where the three objects 8 (selected object 9a to 9c) are selected, two-point touching is performed in the horizontal direction at a position where no selected object 9 is displayed. The touch panel portion 12 accepts that the two-point touching has been performed. Based on the output of the touch panel portion 12, the panel control portion 10 recognizes that the two-point touching has been performed. In addition, the panel control portion 10 recognizes that the touched two points are positioned in the horizontal direction.

Then, as shown in a diagram on the left side at the third stage from the top (a diagram appended with (3)) in FIG. 11, in order to align the selected objects 9 by left-alignment, a user performs an operation of moving the right-side finger close to the left-side finger with the left-side finger being fixed (an operation of gathering the selected objects 9 to the left side). The touch panel portion 12 accepts an operation of moving the right-side touched point to the left side with the left-side touched point being fixed. Based on the output of the touch panel portion 12, the panel control portion 10 recognizes that an operation to instruct left-alignment has been performed.

Then, the panel control portion 10 causes the display portion 11 to align the display positions of the respective selected objects 9 so that the left ends of the selected objects 9 are aligned to a predetermined left-alignment position. Thereby, the left-aligned selected objects 9 are displayed. In this case, the direction in which the user moves the finger (leftward direction) coincides with the direction in which the selected objects 9 move (left-alignment). Accordingly, the selected objects 9 move in a similar way to the motion of the finger, and thus the plurality of objects 8 can be easily and quickly left-aligned by such an intuitive operation. As shown in a diagram on the left side at the lowermost stage (a diagram appended with (4)) in FIG. 11, the predetermined left-alignment position may be a position of the left end of a display area of the display portion 11 (a display frame of the display portion 11). Alternatively, as shown in a diagram on the right side at the lowermost stage (a diagram appended with (7)) in FIG. 11, the predetermined left-alignment position may be a position (shown by a dashed line) at the left end of the leftmost selected object 9 among the selected objects 9.

Further, left-alignment may be performed with respect to a reference selected object 9. In other words, the predetermined left-alignment position may be a position of the left end of the reference selected object 9. In this case, as shown in a diagram on the right side at the second stage from the top (a diagram appended with (5)) in FIG. 11, in the state where the objects 8 are selected, a user performs two-point touching on a position including a position where the reference selected object 9 is displayed (in (5) of FIG. 11, the leftmost selected object 9a is the reference selected object 9). One of the touched two points may be included in the display position of the reference selected object 9. Thereby, the touch panel portion 12 accepts that the two-point touching has been performed on the display position of the reference selected object 9. Based on the output of the touch panel portion 12, the panel control portion 10 recognizes that the two-point touching has been performed on the reference selected object 9. Further, the panel control portion 10 recognizes that the touched two points are positioned in the horizontal direction.

Then, as shown in a diagram on the right side at the third stage from the top (a diagram appended with (6)) in FIG. 11, in order to align the selected object 9 by left-alignment with the reference selected object 9, a user performs an operation of moving the right-side finger close to the left-side finger with the left-side finger being fixed (an operation of gathering the selected objects 9 to the left side). The touch panel portion 12 accepts an operation of moving the right-side touched point toward the left side with the left-side touched point being fixed. Based on the output of the touch panel portion 12, the panel control portion 10 recognizes that an operation to instruct left-alignment has been performed.

Then, as shown in a diagram on the right side at the lowermost stage (a diagram appended with (7)) in FIG. 11, the panel control portion 10 causes the display portion 11 to align the display positions (left-end positions) of the respective selected objects 9 with the left-end position (the predetermined left-alignment position shown by a dashed line) of the reference selected object 9 (selected object 9a). Thereby, the selected objects 9 left-aligned with the reference selected object 9 are displayed. In this way, the reference position for left-alignment can be changed in accordance with whether or not two-point touching is performed on the selected object 9. Therefore, the number of options of left-alignment manners is increased. Thus, the selected objects 9 can be easily left-aligned as the user desires, and the usability of the display input device (operation panel 1) in performing left-alignment can be improved.

The panel control portion 10 causes the memory 15 to update, for each of the left-aligned selected objects 9, information indicating the display position of the object on the screen, which information is included in the object data. Thus, thereafter, when displaying the screen on which the selected objects 9 are left-aligned, the panel control portion 10 refers to the object data of each selected object 9 which is stored in the memory 15, and causes the display portion 11 to display the screen in the state where the selected objects 9 are left-aligned.

(Right-Alignment of Selected Object 9)

Figure 12:
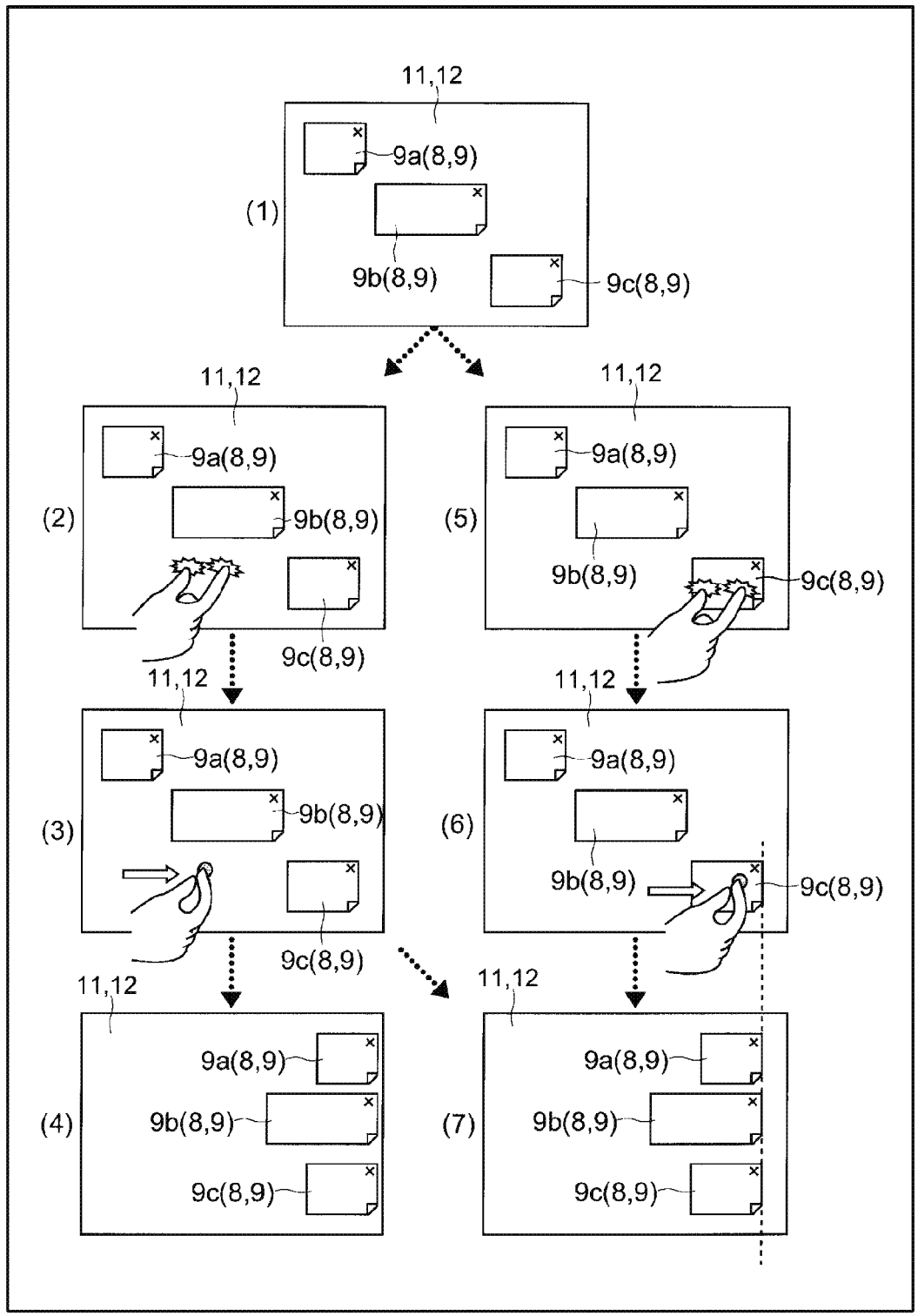
FIG. 12 is an explanation diagram showing an example of a manner of right-alignment of selected objects, according to the embodiment of the present disclosure.

Next, with reference to FIG. 12, an example of right-alignment of selected objects 9 on the operation panel 1 according to the present embodiment will be described. FIG. 12 is an explanation diagram showing an example of a manner of right-alignment of selected objects 9.

First, in FIG. 12, a diagram at the uppermost stage (a diagram appended with (1)) shows that three objects 8 displayed on the display portion 11 are selected (selected objects 9a to 9c). In advance of alignment, the selected object 9a is displayed at the upper left, the selected object 9b is displayed substantially at the center, and the selected object 9c is displayed at the lower right.

In FIG. 12, a diagram on the left side at the second stage from the top (a diagram appended with (2)) shows that, in the state where the three objects 8 (selected object 9a to 9c) are selected, two-point touching is performed in the horizontal direction at a position where no selected object 9 is displayed. The touch panel portion 12 accepts that the two-point touching has been performed. Based on the output of the touch panel portion 12, the panel control portion 10 recognizes that the two-point touching has been performed. In addition, the panel control portion 10 recognizes that the touched two points are positioned in the horizontal direction.

Then, as shown in a diagram on the left side at the third stage from the top (a diagram appended with (3)) in FIG. 12, in order to align the selected objects 9 by right-alignment, a user performs an operation of moving the left-side finger close to the right-side finger with the right-side finger being fixed (an operation of gathering the selected objects 9 to the right side). The touch panel portion 12 accepts an operation of moving the left-side touched point to the right side with the right-side touched point being fixed. Based on the output of the touch panel portion 12, the panel control portion 10 recognizes that an operation to instruct right-alignment has been performed.

Then, the panel control portion 10 causes the display portion 11 to align the display positions of the respective selected objects 9 so that the right ends of the selected objects 9 are aligned to a predetermined right-alignment position. Thereby, the right-aligned selected objects 9 are displayed. In this case, the direction in which the user moves the finger (rightward direction) coincides with the direction in which the selected objects 9 move (right-alignment). Accordingly, the selected objects 9 move in a similar way to the motion of the finger, and thus the plurality of objects 8 can be easily and quickly right-aligned by such an intuitive operation. As shown in a diagram on the left side at the lowermost stage (a diagram appended with (4)) in FIG. 12, the predetermined right-alignment position may be a position of the right end of the display area of the display portion 11 (the display frame of the display portion 11). Alternatively, as shown in a diagram on the right side at the lowermost stage (a diagram appended with (7)) in FIG. 12, the predetermined right-alignment position may be a position (shown by a dashed line) at the right end of the rightmost selected object 9 among the selected objects 9.

Further, right-alignment may be performed with respect to a reference selected object 9. In other words, the predetermined right-alignment position may be a position of the right end of the reference selected object 9. In this case, as shown in a diagram on the right side at the second stage from the top (a diagram appended with (5)) in FIG. 12, in the state where the objects 8 are selected, a user performs two-point touching on a position including a position where the reference selected object 9 is displayed ((5) of FIG. 12 shows an example of using the rightmost selected object 9c as the reference selected object 9). Further, one of the touched two points may be included in the display position of the reference selected object 9. Thereby, the touch panel portion 12 accepts that the two-point touching has been performed on the display position of the reference selected object 9. Based on the output of the touch panel portion 12, the panel control portion 10 recognizes that the two-point touching has been performed on the reference selected object 9. Further, the panel control portion 10 recognizes that the touched two points are positioned in the horizontal direction.

Then, as shown in a diagram on the right side at the third stage from the top (a diagram appended with (6)) in FIG. 12, in order to align the selected objects 9 by right-alignment with the reference selected object 9, a user performs an operation of moving the left-side finger close to the right-side finger with the right-side finger being fixed (an operation of gathering the selected objects 9 to the right side). The touch panel portion 12 accepts an operation of moving the left-side touched point toward the right side with the right-side touched point being fixed. Based on the output of the touch panel portion 12, the panel control portion 10 recognizes that an operation to instruct right-alignment has been performed.

Then, as shown in a diagram on the right side at the lowermost stage (a diagram appended with (7)) in FIG. 12, the panel control portion 10 causes the display portion 11 to align the display positions (right-end positions) of the respective selected objects 9 with the right-end position (the predetermined right-alignment position shown by a dashed line) of the reference selected object 9 (selected object 9c). Thereby, the selected objects 9 right-aligned with the reference selected object 9 are displayed. In this way, the reference position for right-alignment can be changed according to whether or not two-point touching is performed on the selected object 9. Therefore, the number of options of right-alignment manners is increased. Thus, the selected objects 9 can be easily right-aligned as the user desires, and the usability of the display input device (operation panel 1) in performing right-alignment can be improved.

The panel control portion 10 causes the memory 15 to update, for each of the right-aligned selected objects 9, information indicating the display position of the object on the screen, which information is included in the object data. Thus, thereafter, when displaying the screen on which the selected objects 9 are right-aligned, the panel control portion 10 refers to the object data of each selected object 9 which is stored in the memory 15, and causes the display portion 11 to display the screen in the state where the selected objects 9 are right-aligned.

(Top-Alignment of Selected Object 9)

Figure 13:
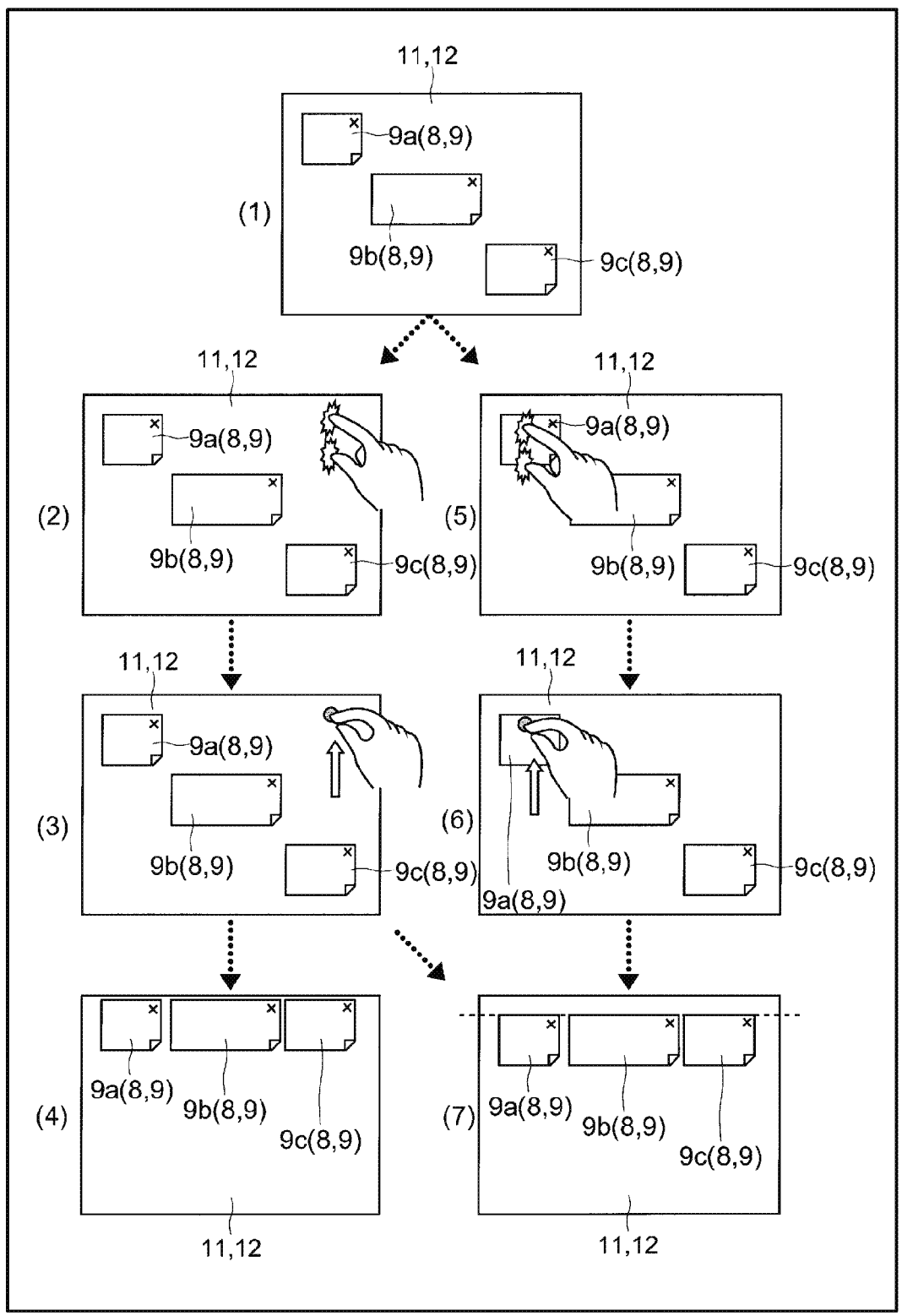
FIG. 13 is an explanation diagram showing an example of a manner of top-alignment of selected objects, according to the embodiment of the present disclosure.

Next, with reference to FIG. 13, an example of top-alignment of selected objects 9 on the operation panel 1 according to the present embodiment will be described. FIG. 13 is an explanation diagram showing an example of a manner of top-alignment of selected objects 9.

First, in FIG. 13, a diagram at the uppermost stage (a diagram appended with (1)) shows that three objects 8 displayed on the display portion 11 are selected (selected objects 9a to 9c). In advance of alignment, the selected object 9a is displayed at the upper left, the selected object 9b is displayed substantially at the center, and the selected object 9c is displayed at the lower right.

In FIG. 13, a diagram on the left side at the second stage from the top (a diagram appended with (2)) shows that, in the state where the three objects 8 (selected object 9a to 9c) are selected, two-point touching is performed in the vertical direction at a position where no selected object 9 is displayed. The touch panel portion 12 accepts that the two-point touching has been performed. Based on the output of the touch panel portion 12, the panel control portion 10 recognizes that the two-point touching has been performed. In addition, the panel control portion 10 recognizes that the touched two points are positioned in the vertical direction.

Then, as shown in a diagram on the left side at the third stage from the top (a diagram appended with (3)) in FIG. 13, in order to align the selected objects 9 by top-alignment, a user performs an operation of moving the lower finger close to the upper finger with the upper finger being fixed (an operation of gathering the selected objects 9 to the upper side). The touch panel portion 12 accepts an operation of moving the lower touched point to the upper side with the upper touched point being fixed. Based on the output of the touch panel portion 12, the panel control portion 10 recognizes that an operation to instruct top-alignment has been performed.

Then, the panel control portion 10 causes the display portion 11 to align the display positions of the respective selected objects 9 so that the upper ends of the selected objects 9 are aligned to a predetermined top-alignment position. Thereby, the top-aligned selected objects 9 are displayed. In this case, the direction in which the user moves the finger (upward direction) coincides with the direction in which the selected objects 9 move (top-alignment). Accordingly, the selected objects 9 move in a similar way to the motion of the finger, and thus the plurality of objects 8 can be easily and quickly top-aligned by such an intuitive operation. As shown in a diagram on the left side at the lowermost stage (a diagram appended with (4)) in FIG. 13, the predetermined top-alignment position may be a position of the upper end of the display area of the display portion 11 (the display frame of the display portion 11). Alternatively, as shown in a diagram on the right side at the lowermost stage (a diagram appended with (7)) in FIG. 13, the predetermined top-alignment position may be a position (shown by a dashed line) of the upper end of the uppermost selected object 9 (in the example of FIG. 13, the selected object 9a) among the selected objects 9.

Further, top-alignment may be performed with respect to a reference selected object 9. In other words, the predetermined top-alignment position may be a position of the upper end of the reference selected object 9. In this case, as shown in a diagram on the right side at the second stage from the top (a diagram appended with (5)) in FIG. 13, in the state where the objects 8 are selected, a user performs two-point touching on a position including a position where the reference selected object 9 is displayed ((5) of FIG. 13 shows an example of using the uppermost selected object 9a as the reference selected object 9). One of the touched two points may be included in the display position of the reference selected object 9. Thereby, the touch panel portion 12 accepts that the two-point touching has been performed in the vertical direction on the display position of the reference selected object 9. Based on the output of the touch panel portion 12, the panel control portion 10 recognizes that the two-point touching has been performed on the reference selected object 9. Further, the panel control portion 10 recognizes that the touched two points are positioned in the vertical direction.

Then, as shown in a diagram on the right side at the third stage from the top (a diagram appended with (6)) in FIG. 13, in order to align the selected objects 9 by top-alignment with the reference selected object 9, a user performs an operation of moving the lower finger close to the upper finger with the upper finger being fixed (an operation of gathering the selected objects 9 to the upper side). The touch panel portion 12 accepts an operation of moving the lower touched point toward the upper side with the upper touched point being fixed. Based on the output of the touch panel portion 12, the panel control portion 10 recognizes that an operation to instruct top-alignment has been performed.

Then, as shown in a diagram on the right side at the lowermost stage (a diagram appended with (7)) in FIG. 13, the panel control portion 10 causes the display portion 11 to align the display positions (upper-end positions) of the respective selected objects 9 with the upper-end position (the predetermined top-alignment position shown by a dashed line) of the reference selected object 9 (selected object 9*a*). Thereby, the selected objects 9 top-aligned with the reference selected object 9 are displayed. In this way, the reference position for top-alignment can be changed according to whether or not two-point touching is performed on the selected object 9. Therefore, the number of options of top-alignment manners is increased. Thus, the selected objects 9 can be easily top-aligned as the user desires, and the usability of the display input device (operation panel 1) in performing top-alignment can be improved.

The panel control portion 10 causes the memory 15 to update, for each of the top-aligned selected objects 9, information indicating the display position of the object on the screen, which information is included in the object data. Thus, thereafter, when displaying the screen on which the selected objects 9 are top-aligned, the panel control portion 10 refers to the object data of each selected object 9 which is stored in the memory 15, and causes the display portion 11 to display the screen in the state where the selected objects 9 are top-aligned.

(Bottom-Alignment of Selected Object 9)

Figure 14:
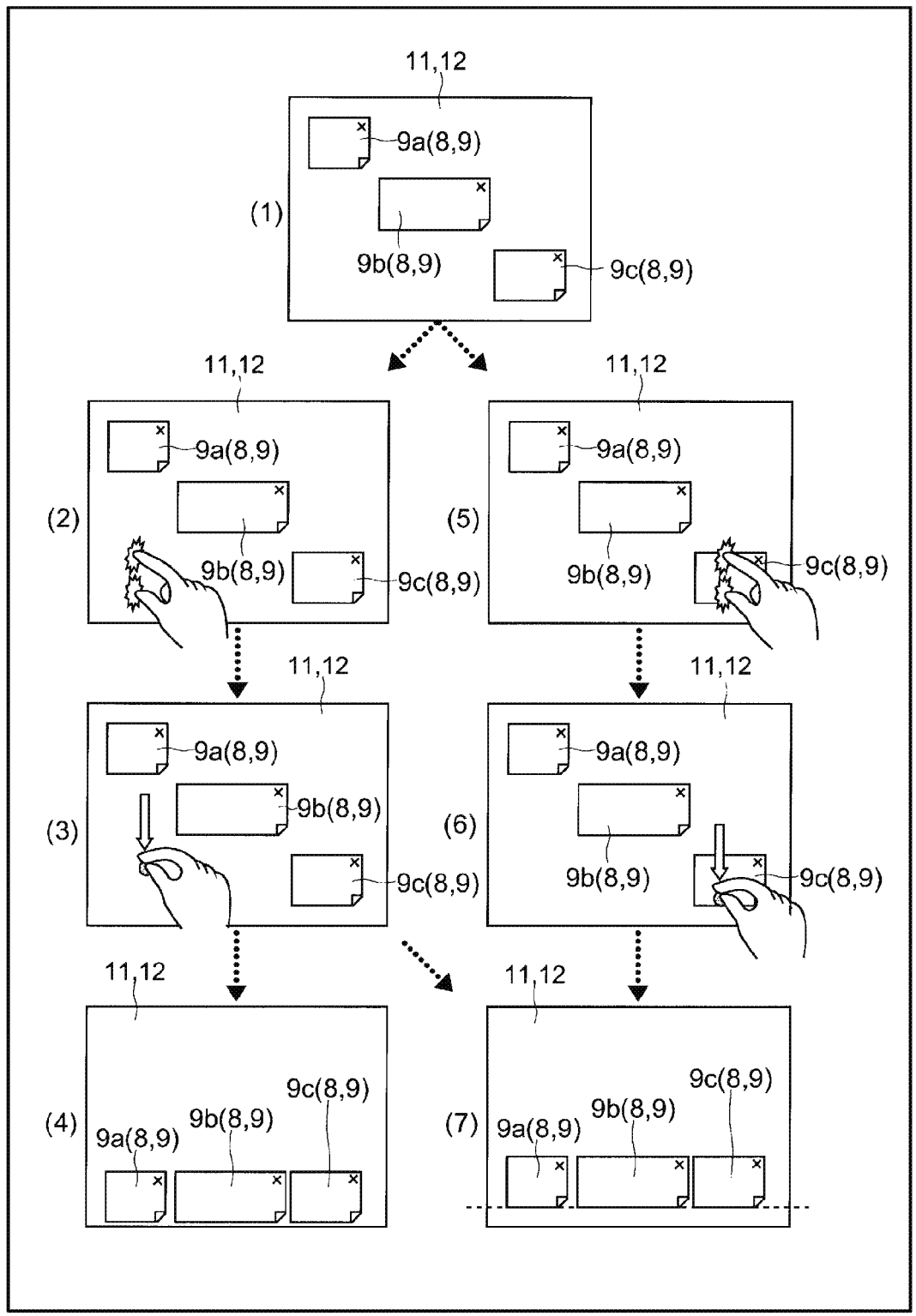
FIG. 14 is an explanation diagram showing an example of a manner of bottom-alignment of selected objects, according to the embodiment of the present disclosure.

Next, with reference to FIG. 14, an example of bottom-alignment of selected objects 9 on the operation panel 1 according to the present embodiment will be described. FIG. 14 is an explanation diagram showing an example of a manner of bottom-alignment of selected objects 9.

First, in FIG. 14, a diagram at the uppermost stage (a diagram appended with (1)) shows that three objects 8 displayed on the display portion 11 are selected (selected objects 9*a* to 9*c*). In advance of alignment, the selected object 9*a* is displayed at the upper left, the selected object 9*b* is displayed substantially at the center, and the selected object 9*c* is displayed at the lower right.

In FIG. 14, a diagram on the left side at the second stage from the top (a diagram appended with (2)) shows that, in the state where the three objects 8 (selected object 9*a* to 9*c*) are selected, two-point touching is performed at a position where no selected object 9 is displayed. The touch panel portion 12 accepts that the two-point touching has been performed. Based on the output of the touch panel portion 12, the panel control portion 10 recognizes that the two-point touching has been performed. Further, the panel control portion 10 recognizes that the touched two points are positioned in the vertical direction.

Then, as shown in a diagram on the left side at the third stage from the top (a diagram appended with (3)) in FIG. 14, in order to align the selected objects 9 by bottom-alignment, a user performs an operation of moving the upper finger close to the lower finger with the lower finger being fixed (an operation of gathering the selected objects 9 to the lower side). The touch panel portion 12 accepts an operation of moving the upper touched point to the lower side with the lower touched point being fixed. Based on the output of the touch panel portion 12, the panel control portion 10 recognizes that an operation to instruct bottom-alignment has been performed.

Then, the panel control portion 10 causes the display portion 11 to align the display positions of the respective selected objects 9 so that the lower ends of the selected objects 9 are aligned to a predetermined bottom-alignment position. Thereby, the bottom-aligned selected objects 9 are displayed. In this case, the direction in which the user moves the finger (downward direction) coincides with the direction in which the selected objects 9 move (bottom-alignment). Accordingly, the selected objects 9 move in a similar way to the motion of the finger, and thus the plurality of objects 8 can be easily and quickly bottom-aligned by such an intuitive operation. As shown in a diagram on the left side at the lowermost stage (a diagram appended with (4)) in FIG. 14, the predetermined bottom-alignment position may be a position of the lower end of the display area of the display portion 11 (the display frame of the display portion 11). Alternatively, as shown in a diagram on the right side at the lowermost stage (a diagram appended with (7)) in FIG. 14, the predetermined bottom-alignment position may be a position (shown by a dashed line) of the lower end of the lowermost selected object 9 (in the example of FIG. 14, the selected object 9*c*) among the selected objects 9.

Further, bottom-alignment may be performed with respect to a reference selected object 9. In other words, the predetermined bottom-alignment position may be a position of the lower end of the reference selected object 9. In this case, as shown in a diagram on the right side at the second stage from the top (a diagram appended with (5)) in FIG. 14, in the state where the objects 8 are selected, a user performs two-point touching on a position including a position where the reference selected object 9 is displayed ((5) of FIG. 14 shows an example of using the lowermost selected object 9*a* as the reference selected object 9). One of the touched two points may be included in the display position of the reference selected object 9. Thereby, the touch panel portion 12 accepts that the two-point touching has been performed on the display position of the reference selected object 9. Based on the output of the touch panel portion 12, the panel control portion 10 recognizes that the two-point touching has been performed on the reference selected object 9. Further, the panel control portion 10 recognizes that the touched two points are positioned in the vertical direction.

Then, as shown in a diagram on the right side at the third stage from the top (a diagram appended with (6)) in FIG. 14, in order to align the selected objects 9 by bottom-alignment with the reference selected object 9, a user performs an operation of moving the upper finger close to the lower finger with the lower finger being fixed (an operation of gathering the selected objects 9 to the lower side). The touch panel portion 12 accepts an operation of moving the upper touched point toward the lower side with the lower touched point being fixed. Based on the output of the touch panel portion 12, the panel control portion 10 recognizes that an operation to instruct bottom-alignment has been performed.

Then, as shown in a diagram on the right side at the lowermost stage (a diagram appended with (7)) in FIG. 14, the panel control portion 10 causes the display portion 11 to align the display positions (lower-end positions) of the respective selected objects 9 with the lower-end position (the predetermined bottom-alignment position shown by a dashed line) of the reference selected object 9 (selected object 9c). Thus, the selected objects 9 bottom-aligned with the reference selected object 9 are displayed. In this way, the reference position for bottom-alignment can be changed according to whether or not two-point touching is performed on the selected object 9. Therefore, the number of options of bottom-alignment manners is increased. Thereby, the selected objects 9 can be easily bottom-aligned as the user desires, and the usability of the display input device (operation panel 1) in performing bottom-alignment can be improved.

The panel control portion 10 causes the memory 15 to update, for each of the bottom-aligned selected objects 9, information indicating the display position of the object on the screen, which information is included in the object data. Thus, thereafter, when displaying the screen on which the selected objects 9 are bottom-aligned, the panel control portion 10 refers to the object data of each selected object 9 which is stored in the memory 15, and causes the display portion 11 to display the screen in the state where the selected objects 9 are bottom-aligned.

(Horizontal Center-Alignment of Selected Objects 9)

Figure 15:
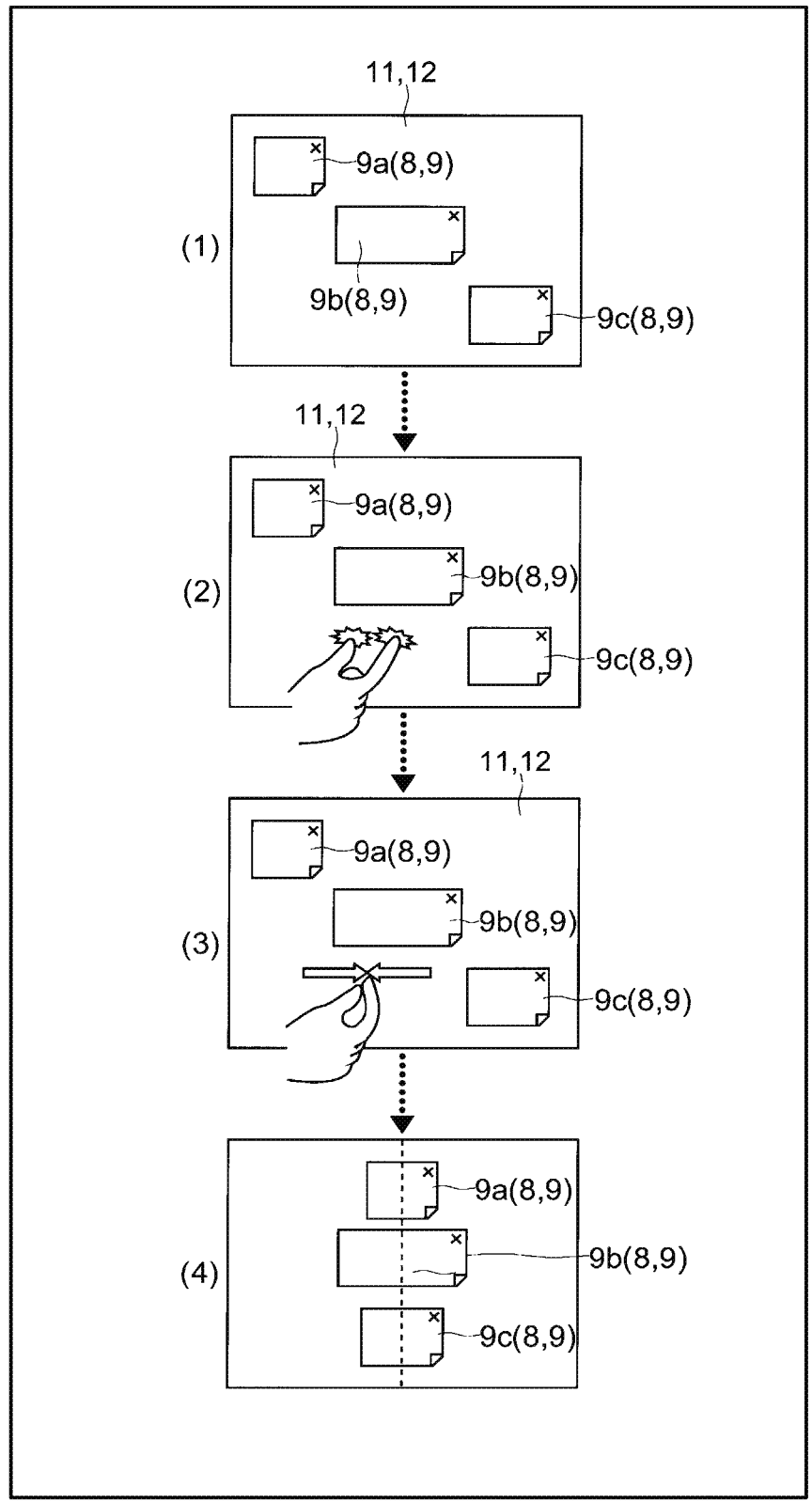
FIG. 15 is an explanation diagram showing an example of a manner of horizontal center-alignment of selected objects, according to the embodiment of the present disclosure.

Next, with reference to FIG. 15, an example of horizontal center-alignment of selected objects 9 on the operation panel 1 according to the present embodiment will be described. FIG. 15 is an explanation diagram showing an example of a manner of horizontal center-alignment of selected objects 9.

First, in FIG. 15, a diagram at the uppermost stage (a diagram appended with (1)) shows that three objects 8 displayed on the display portion 11 are selected (selected objects 9a to 9c). In advance of alignment, the selected object 9a is displayed at the upper left, the selected object 9b is displayed substantially at the center, and the selected object 9c is displayed at the lower right.

In FIG. 15, a diagram at the second stage from the top (a diagram appended with (2)) shows that, in the state where the three objects 8 (selected object 9a to 9c) are selected, two-point touching is performed in the horizontal direction at a position where no selected object 9 is displayed. The touch panel portion 12 accepts that the two-point touching has been performed. Based on the output of the touch panel portion 12, the panel control portion 10 recognizes that the two-point touching has been performed. Further, the panel control portion 10 recognizes that the touched two points are positioned in the horizontal direction.

Then, as shown in a diagram at the third stage from the top (a diagram appended with (3)) in FIG. 15, in order to align the selected objects 9 by horizontal center-alignment, a user performs an operation of narrowing the interval between two fingers in the horizontal direction (an operation of gathering the selected objects 9 to the center in the horizontal direction). The touch panel portion 12 accepts an operation of narrowing the interval between the touched two points in the horizontal direction. Based on the output of the touch panel portion 12, the panel control portion 10 recognizes that an operation to instruct horizontal center-alignment has been performed.

Then, the panel control portion 10 causes the display portion 11 to align the display positions of the respective selected objects 9 by horizontal center-alignment so that the center of each selected object 9 in the horizontal direction is aligned with the center (center line) of the display area (display frame) of the display portion 11 in the horizontal direction. Thereby, the selected objects 9 center-aligned in the horizontal direction are displayed. Thus, the selected objects 9 are aligned toward the center (center-aligned) in the horizontal direction in accordance with the operation of gathering the touched two points to the center. Therefore, the selected objects 9 move in a similar way to the motion of the fingers, and thus the plurality of objects 8 can be easily and quickly center-aligned in the horizontal direction by such an intuitive operation.

The panel control portion 10 causes the memory 15 to update, for each of the horizontally center-aligned selected objects 9, information indicating the display position of the object on the screen, which information is included in the object data. Thus, thereafter, when displaying the screen on which the selected objects 9 are horizontally center-aligned, the panel control portion 10 refers to the object data of each selected object 9 which is stored in the memory 15, and causes the display portion 11 to display the screen in the state where the selected objects 9 are horizontally center-aligned.

(Vertical Center-Alignment of Selected Objects 9)

Figure 16:
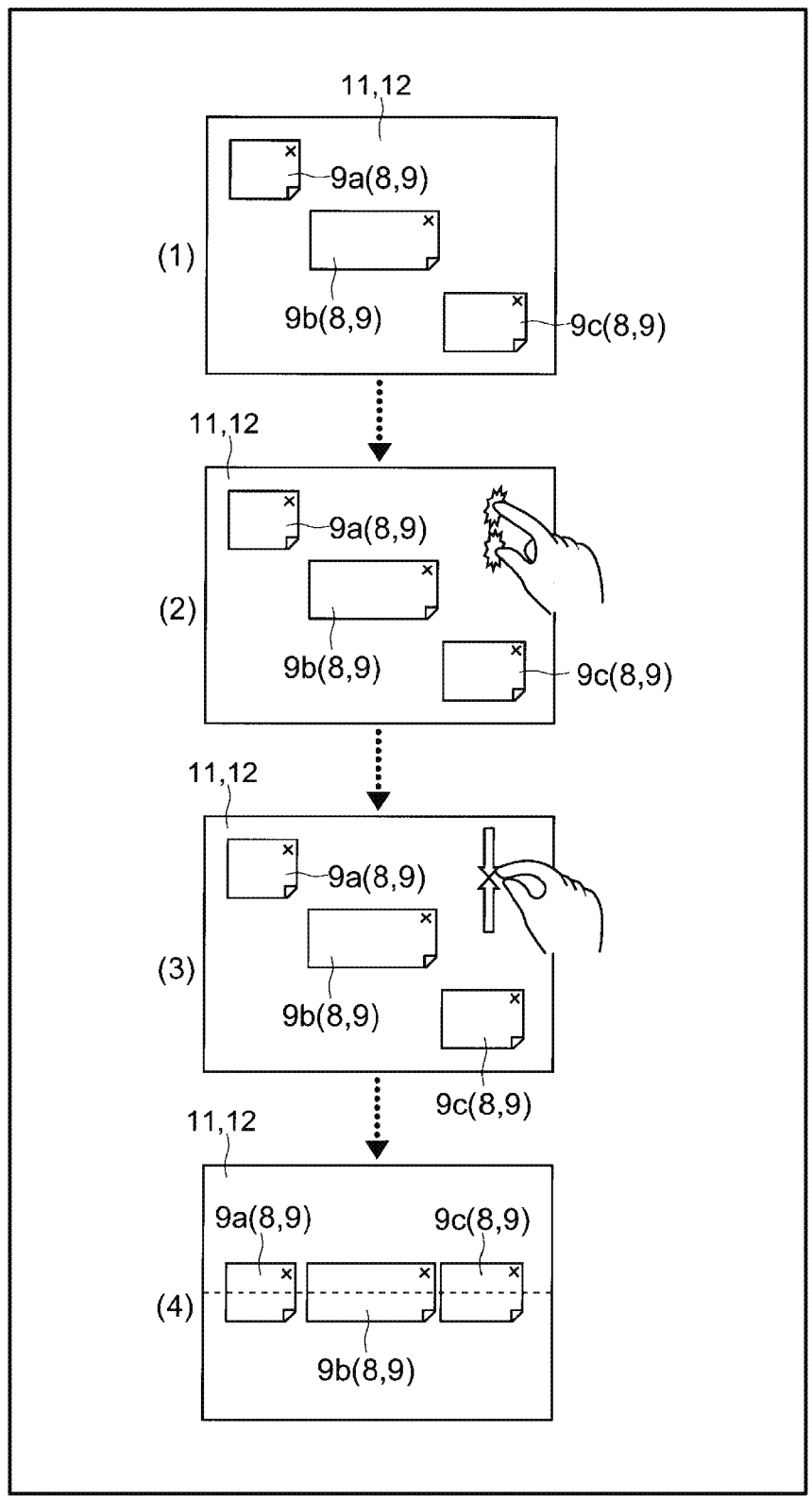
FIG. 16 is an explanation diagram showing an example of a manner of vertical center-alignment of selected objects, according to the embodiment of the present disclosure.

Next, with reference to FIG. 16, an example of vertical center-alignment of selected objects 9 on the operation panel 1 according to the present embodiment will be described. FIG. 16 is an explanation diagram showing an example of a manner of vertical center-alignment of selected objects 9.

First, in FIG. 16, a diagram at the uppermost stage (a diagram appended with (1)) shows that three objects 8 displayed on the display portion 11 are selected (selected objects 9a to 9c). In advance of alignment, the selected object 9a is displayed at the upper left, the selected object 9b is displayed substantially at the center, and the selected object 9c is displayed at the lower right.

In FIG. 16, a diagram at the second stage from the top (a diagram appended with (2)) shows that, in the state where the three objects 8 (selected object 9a to 9c) are selected, two-point touching is performed in the vertical direction at a position where no selected object 9 is displayed. The touch panel portion 12 accepts that the two-point touching has been performed. Based on the output of the touch panel portion 12, the panel control portion 10 recognizes that the two-point touching has been performed. Further, the panel control portion 10 recognizes that the touched two points are positioned in the vertical direction.

Then, as shown in a diagram at the third stage from the top (a diagram appended with (3)) in FIG. 16, in order to align the selected objects 9 by vertical center-alignment, a user performs an operation of narrowing the interval between two fingers in the vertical direction (an operation of gathering the selected objects 9 to the center in the vertical direction). The touch panel portion 12 accepts an operation of narrowing the interval between the touched two points in the vertical direction. Based on the output of the touch panel portion 12, the panel control portion 10 recognizes that an operation to instruct vertical center-alignment has been performed.

Then, the panel control portion 10 causes the display portion 11 to align the display positions of the respective selected objects 9 by vertical center-alignment so that the center of each selected object 9 in the vertical direction is aligned with the center (center line) of the display area (display frame) of the display portion 11 in the vertical direction. Thereby, the selected objects 9 center-aligned in the horizontal direction are displayed. Thus, the selected objects 9 are aligned toward the center (center-aligned) in the vertical direction, in accordance with the operation of gathering the touched two points to the center. Therefore, the selected objects 9 move in a similar way to the motion of the fingers, and thus the plurality of objects 8 can be easily and quickly center-aligned in the vertical direction by such an intuitive operation.

The panel control portion 10 causes the memory 15 to update, for each of the vertically center-aligned selected objects 9, information indicating the display position of the object on the screen, which information is included in the object data. Thus, thereafter, when displaying the screen on which the selected objects 9 are vertically center-aligned, the panel control portion 10 refers to the object data of each selected object 9 which is stored in the memory 15, and causes the display portion 11 to display the screen in the state where the selected objects 9 are vertically center-aligned.

(Horizontal Equal-Spacing of Selected Objects 9)

Figure 17:
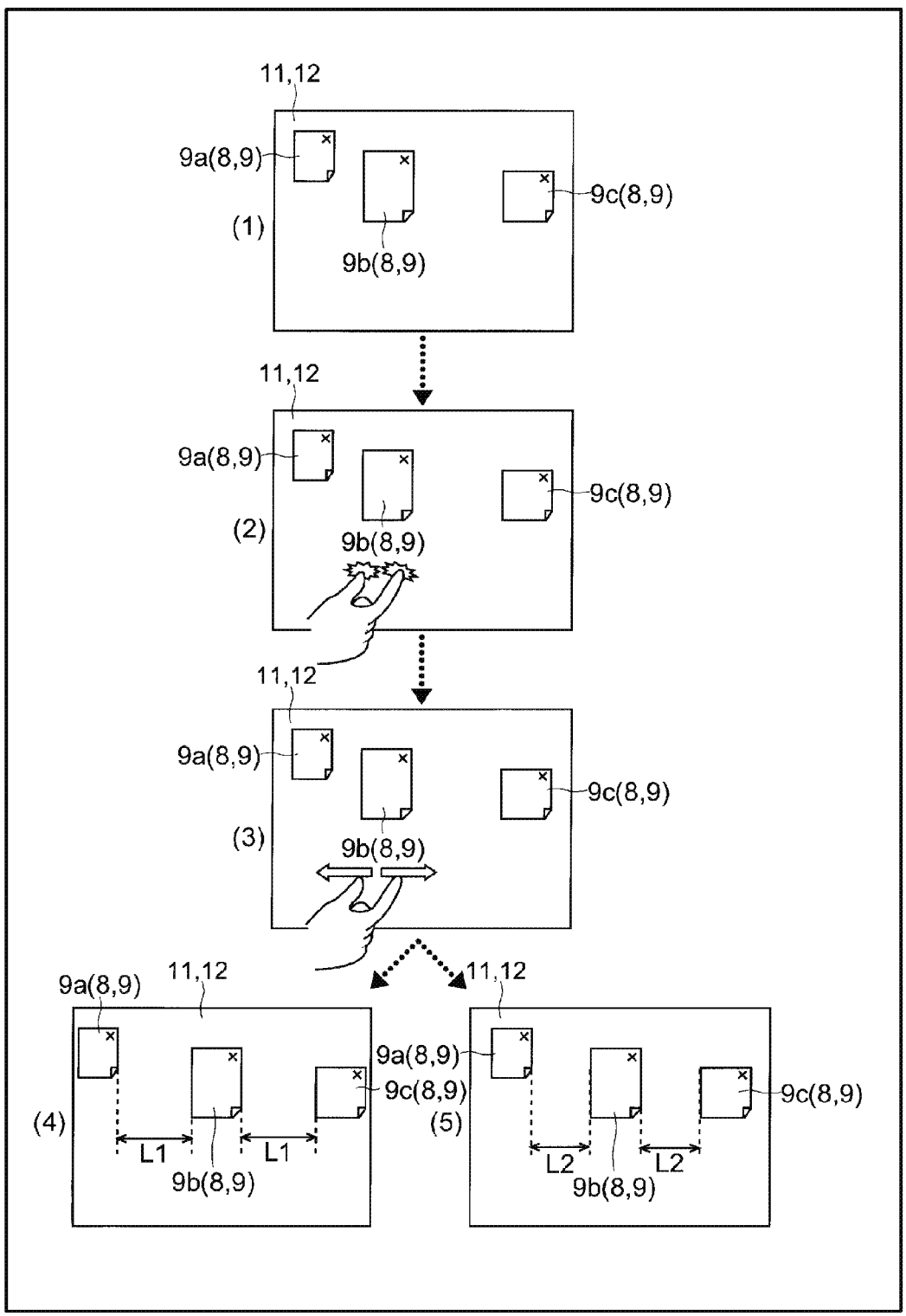
FIG. 17 is an explanation diagram showing an example of a manner of horizontal equal spacing of selected objects, according to the embodiment of the present disclosure.

Next, with reference to FIG. 17, an example of horizontal equal-spacing of selected objects 9 on the operation panel 1 according to the present embodiment will be described. FIG. 17 is an explanation diagram showing an example of a manner of horizontal equal-spacing of selected objects 9.

First, in FIG. 17, a diagram at the uppermost stage (a diagram appended with (1)) shows that three objects 8 displayed on the display portion 11 are selected (selected objects 9a to 9c). In advance of equal-spacing, in order from the left, the selected object 9a, the selected object 9b, and the selected object 9c are arranged at irregular intervals.

In FIG. 17, a diagram at the second stage from the top (a diagram appended with (2)) shows that, in the state where the three objects 8 (selected object 9a to 9c) are selected, two-point touching is performed in the horizontal direction. The touch panel portion 12 accepts that the two-point touching has been performed. Based on the output of the touch panel portion 12, the panel control portion 10 recognizes that the two-point touching has been performed. Further, the panel control portion 10 recognizes that the touched two points are positioned in the horizontal direction.

Then, as shown in a diagram at the third stage from the top (a diagram appended with (3)) in FIG. 17, in order to align the selected objects 9 so that the spaces between the selected objects 9 are equal to each other in the horizontal direction (in order to perform horizontal equal-spacing of the selected objects 9), a user performs an operation of broadening the interval between two fingers in the horizontal direction (an operation of separating the selected objects 9 in the horizontal direction). The touch panel portion 12 accepts an operation of broadening the interval between the touched two points in the horizontal direction. Based on the output of the touch panel portion 12, the panel control portion 10 recognizes that an operation to instruct horizontal equal-spacing has been performed.

Then, the panel control portion 10 causes the display portion 11 to align the display positions of the respective selected objects 9 so that the spaces between the selected objects 9 are equal to each other. Thereby, the selected objects 9 aligned at equal spaces in the horizontal direction are displayed. In this way, the spaces between the selected objects 9 are made equal to each other in accordance with the operation of moving the touched two points away from the center, and thus the selected objects 9 are aligned so as to spread from the center of the display area of the display portion 11 in the horizontal direction (horizontal equal-spacing). Accordingly, the selected objects 9 move in a similar way to the motion of the fingers, and thus the plurality of objects 8 can be easily and quickly aligned at equal spaces in the horizontal direction by such an intuitive operation. When performing horizontal equal-spacing, as shown in a diagram on the left side at the lowermost stage (a diagram appended with (4)) in FIG. 17, the endmost elected objects 9 in the horizontal direction (in the example of FIG. 17, the selected objects 9a and 9c) may be moved to the both ends of the display area of the display portion 11, respectively, to align the selected objects 9 at equal spaces.

In this case, the panel control portion 10 causes the display portion 11 to change the display position of the leftmost selected object 9 (selected object 9a) among the selected objects 9 (to move the display position of the leftmost selected object 9a in the leftward direction) so that the position of the left end of the leftmost selected object 9a coincides with the left end of the display area of the display portion 11. Further, the panel control portion 10 causes the display portion 11 to change the display position of the rightmost selected object 9 (selected object 9c) among the selected objects 9 (to move the display position of the rightmost selected object 9c in the rightward direction) so that the position of the right end of the rightmost selected object 9c coincides with the right end of the display area of the display portion 11. Then, the panel control portion 10 causes the display portion 11 to display the selected object 9 (in the example of FIG. 17, the selected object 9b) sandwiched between the rightmost and leftmost selected objects 9, at a position where the interval between the selected object 9b and the rightmost selected object 9 becomes substantially equal to the interval between the selected object 9b and the leftmost selected object 9 (in (4) of FIG. 17, each interval is represented as L1).

Alternatively, when performing horizontal equal-spacing, as shown in a diagram on the right side at the lowermost stage (a diagram appended with (5)) in FIG. 17, the respective selected objects 9 may be aligned at equal spaces without moving the endmost selected objects 9 (in the example of FIG. 17, the selected objects 9a and 9c).

In this case, the panel control portion 10 does not change the display positions of the leftmost selected object 9 (selected object 9a) and the rightmost selected object 9 (selected object 9c) among the selected objects 9. Then, the panel control portion 10 causes the display portion 11 to display the selected object 9 (in the example of FIG. 17, the selected object 9b) sandwiched between the rightmost and leftmost selected objects 9, at a position where the interval between the selected object 9b and the rightmost selected object 9 becomes substantially equal to the interval between the selected object 9b and the leftmost selected object 9 (in (5) of FIG. 17, each interval is represented as L2).

For example, when the touch panel portion 12 has accepted that two-point touching has been performed at a position where no selected object 9 is displayed, the panel control portion 10 causes the display portion 11 to perform horizontal equal-spacing of the selected objects 9 so that the endmost selected objects 9 are moved to the both ends of the display area of the display portion 11, respectively. When the touch panel portion 12 has accepted that two-point touching has been performed at a position where any selected object 9 is displayed, the panel control portion 10 causes the display portion 11 to perform horizontal equal-spacing of the selected objects 9 so that the endmost selected objects 9 are not moved.

As described above, the display positions of the selected objects 9 are aligned so that the spaces between the selected objects 9 are equal to each other in the horizontal direction. Therefore, it is possible to easily and quickly align a plurality of objects 8 by horizontal equal-spacing.

The panel control portion 10 causes the memory 15 to update, for each of the selected objects 9 equally spaced in the horizontal direction, information indicating the display position of the object on the screen, which information is included in the object data. Thus, thereafter, when displaying the screen on which the selected objects 9 are equally spaced in the horizontal direction, the panel control portion 10 refers to the object data of each selected object 9 which is stored in the memory 15, and causes the display portion 11 to display the screen in the state where the selected objects 9 are equally spaced in the horizontal direction.

(Vertical Equal-Spacing of Selected Objects 9)

Figure 18:
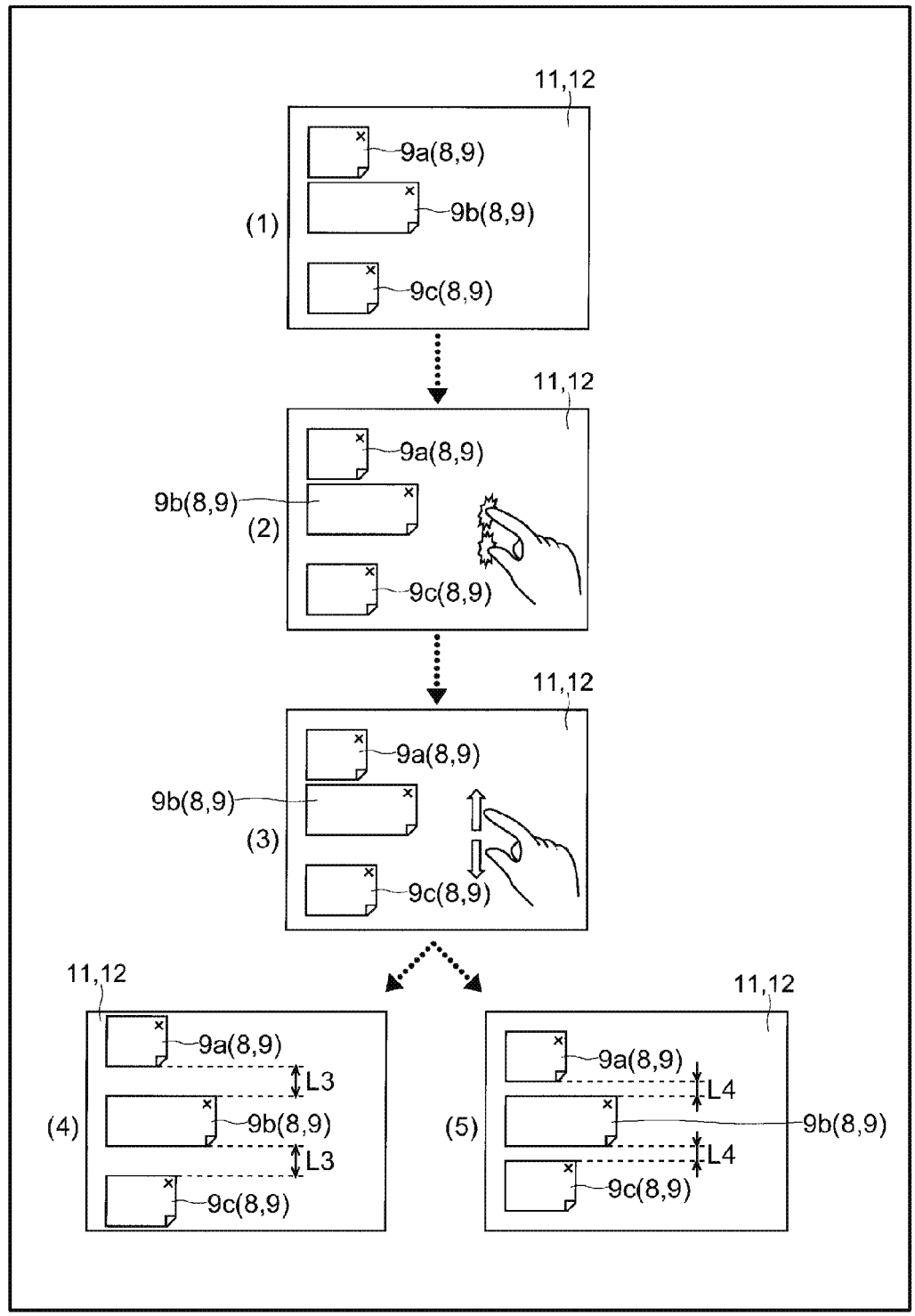
FIG. 18 is an explanation diagram showing an example of a manner of vertical equal spacing of selected objects, according to the embodiment of the present disclosure.

Next, with reference to FIG. 18, an example of vertical equal-spacing of selected objects 9 on the operation panel 1 according to the present embodiment will be described. FIG. 18 is an explanation diagram showing an example of a manner of vertical equal-spacing of selected objects 9.

First, in FIG. 18, a diagram at the uppermost stage (a diagram appended with (1)) shows that three objects 8 displayed on the display portion 11 are selected (selected objects 9*a* to 9*c*). In advance of equal-spacing, in order from the top, the selected object 9*a*, the selected object 9*b*, and the selected object 9*c* are arranged at irregular intervals in a left-side position of the display portion 11.

In FIG. 18, a diagram at the second stage from the top (a diagram appended with (2)) shows that, in the state where the three objects 8 (selected object 9*a* to 9*c*) are selected, two-point touching is performed in the vertical direction. The touch panel portion 12 accepts that the two-point touching has been performed. Based on the output of the touch panel portion 12, the panel control portion 10 recognizes that the two-point touching has been performed. Further, the panel control portion 10 recognizes that the touched two points are positioned in the vertical direction.

Then, as shown in a diagram at the third stage from the top (a diagram appended with (3)) in FIG. 18, in order to align the selected objects 9 so that the spaces between the selected objects 9 are equal to each other in the vertical direction (in order to perform horizontal equal-spacing of the selected objects 9), a user performs an operation of broadening the interval between two fingers in the vertical direction (an operation of separating the selected objects 9 in the vertical direction). The touch panel portion 12 accepts an operation of broadening the interval between the touched two points in the vertical direction. Based on the output of the touch panel portion 12, the panel control portion 10 recognizes that an operation to instruct vertical equal-spacing has been performed.

Then, the panel control portion 10 causes the display portion 11 to align the display positions of the respective selected objects 9 so that the spaces between the selected objects 9 are equal to each other. Thereby, the selected objects 9 aligned at equal spaces in the vertical direction are displayed. In this way, the spaces between the respective selected objects 9 are made equal to each other in accordance with the operation of moving the touched two points away from the center, and thus the selected objects 9 are aligned so as to spread from the center of the display area of the display portion 11 in the vertical direction (vertical equal-spacing). Accordingly, the selected objects 9 move in a similar way to the motion of the fingers, and thus the plurality of objects 8 can be easily and quickly aligned at equal spaces in the vertical direction by such an intuitive operation. When performing vertical equal-spacing, as shown in a diagram on the left side at the lowermost stage (a diagram appended with (4)) in FIG. 18, the endmost selected objects 9 in the vertical direction (in the example of FIG. 18, the selected objects 9*a* and 9*c*) may be moved to the both ends of the display area of the display portion 11, respectively, to align the selected objects 9 at equal spaces.

In this case, the panel control portion 10 causes the display portion 11 to change the display position of the uppermost selected object 9 (selected object 9*a*) among the selected objects 9 (to move the display position of the uppermost selected object 9*a* in the upward direction) so that the position of the upper end of the uppermost selected object 9*a* coincides with the upper end of the display area of the display portion 11. Further, the panel control portion 10 causes the display portion 11 to change the display position of the lowermost selected object 9 (selected object 9*c*) among the selected objects 9 (to move the display position of the lowermost selected object 9*c* in the downward direction) so that the position of the lower end of the lowermost selected object 9*c* coincides with the lower end of the display area of the display portion 11. Then, the panel control portion 10 causes the display portion 11 to display the selected object 9 (in the example of FIG. 18, the selected object 9*b*) sandwiched between the lowermost and uppermost selected objects 9, at a position where the interval between the selected object 9*b* and the lowermost selected object 9 becomes substantially equal to the interval between the selected object 9*b* and the uppermost selected object 9 (in (4) of FIG. 18, each interval is represented as L3).

Alternatively, when performing vertical equal-spacing, as shown in a diagram on the right side at the lowermost stage (a diagram appended with (5)) in FIG. 18, the respective selected objects 9 may be aligned at equal spaces without moving the endmost selected objects 9 (in the example of FIG. 18, the selected objects 9*a* and 9*c*).

In this case, the panel control portion 10 does not change the display positions of the uppermost selected object 9 (selected object 9*a*) and the lowermost selected object 9 (selected object 9*c*) among the selected objects 9. Then, the panel control portion 10 causes the display portion 11 to display the selected object 9 (in the example of FIG. 18, the selected object 9*b*) sandwiched between the lowermost and uppermost selected objects 9, at a position where the interval between the selected object 9*b* and the lowermost selected object 9 becomes substantially equal to the interval between the selected object 9*b* and the uppermost selected object 9 (in (5) of FIG. 18, each interval is represented as L4).

For example, when the touch panel portion 12 has accepted that two-point touching has been performed at a position where no selected object 9 is displayed, the panel control portion 10 causes the display portion 11 to perform vertical equal-spacing of the selected objects 9 so that the endmost selected objects 9 are moved to the both ends of the display area of the display portion 11, respectively. When the touch panel portion 12 has accepted that two-point touching has been performed at a position where any selected object 9 is displayed, the panel control portion 10 causes the display portion 11 to perform vertical equal-spacing of the selected objects 9 so that the endmost selected objects 9 are not moved.

As described above, the display positions of the selected objects 9 are aligned so that the spaces between the selected objects 9 are equal to each other in the vertical direction. Therefore, it is possible to easily and quickly align a plurality of objects 8 by vertical equal-spacing.

The panel control portion 10 causes the memory 15 to update, for each of the selected objects 9 equally spaced in the vertical direction, information indicating the display position of the object on the screen, which information is included in the object data. Thus, thereafter, when displaying the screen on which the selected objects 9 are equally spaced in the vertical direction, the panel control portion 10 refers to the object data of each selected object 9 which is stored in the memory 15, and causes the display portion 11 to display the screen in the state where the selected objects 9 are equally spaced in the vertical direction.

(Cancellation of Overlapping of Selected Objects 9: Leftward Movement)

Figure 19:
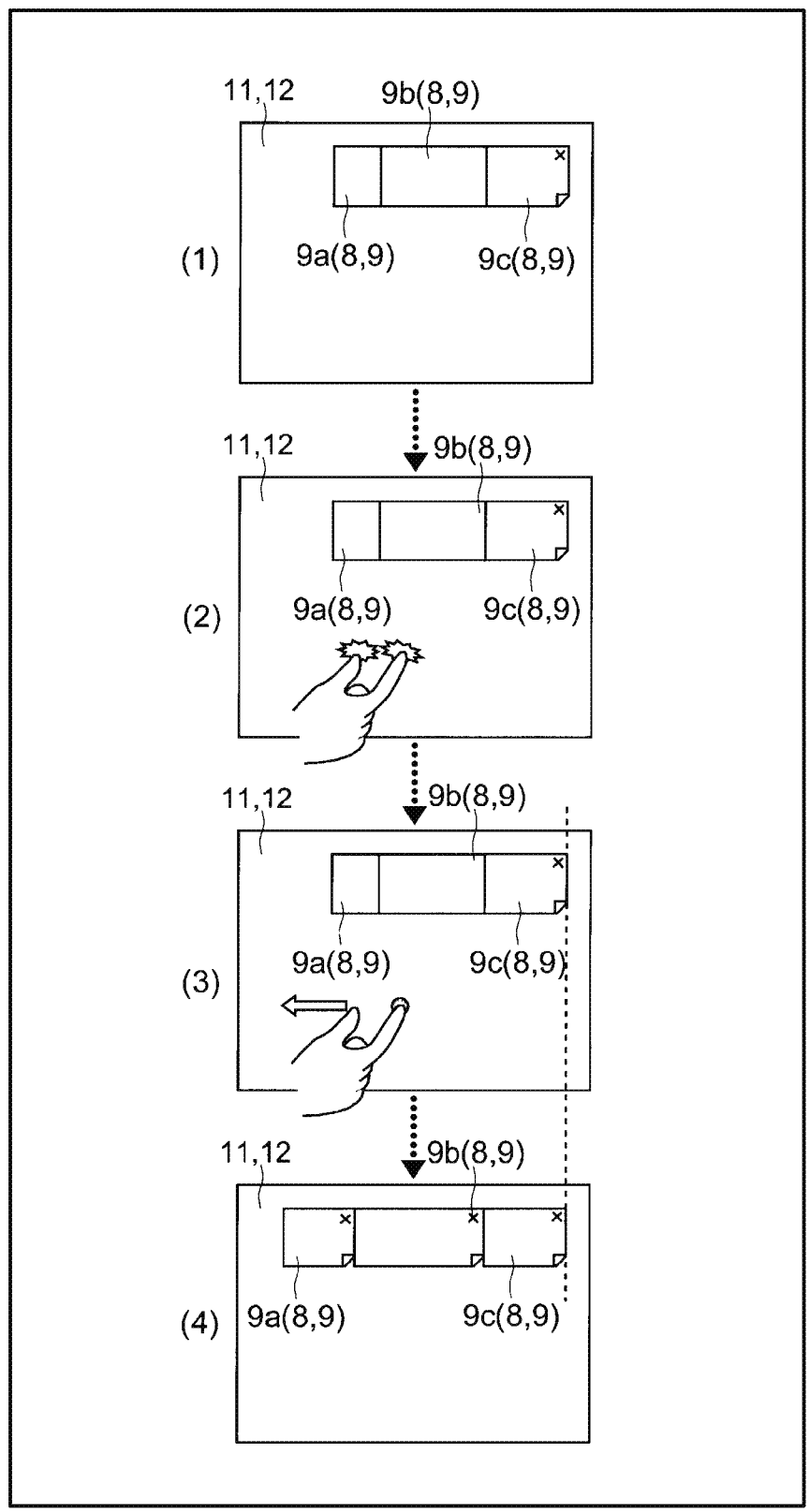
FIG. 19 is an explanation diagram showing an example of a manner of leftward movement of selected objects to cancel overlapping of the selected objects, according to the embodiment of the present disclosure.

Next, with reference to FIG. 19, an example of leftward movement of selected objects 9 to cancel overlapping of the selected objects 9 on the operation panel 1 according to the present embodiment will be described. FIG. 19 is an explanation diagram showing an example of a manner of moving selected objects 9 in the leftward direction to cancel overlapping of the selected objects 9.

First, in FIG. 19, a diagram at the uppermost stage (a diagram appended with (1)) shows that three objects 8 displayed on the display portion 11 are selected (selected objects 9a to 9c). FIG. 19 shows an example of a state where, in advance of alignment, the selected objects 9 are partially overlapped with each other and displayed at an upper position on the display portion 11. Specifically, in FIG. 19, the selected object 9b lies over the selected object 9a, and the selected object 9c lies over the selected object 9b. For example, top-alignment may cause such overlapping of the selected objects 9 as shown in (1) of FIG. 19.

The panel control portion 10 recognizes a range (display range) occupied by the selected objects 8, based on the object data including information relating to each object 8, which object data is stored in the memory 15. Then, the panel control portion 10 recognizes the degree of overlapping of the objects 8, based on the position where the objects 8 are displayed, and the range occupied by the objects 8. It is noted that the object data includes information indicating the priority order of display of the objects 8 when the objects 8 overlap each other. The panel control portion 10 refers to the content stored in the memory 15, and displays the objects 8 so that a higher-priority object 8 is positioned on (is not hidden behind) a lower-priority object 8.

When two selected objects 9 overlap each other, the lower-side object 9 is hidden behind the upper-side selected object 9 and cannot be viewed. For example, an electronic label 81 includes information such as a note. If a part of the note is hidden, a user cannot accurately recognize the information included in the electronic label 81. So, when the selected objects 9 overlap each other, the overlapping is easily canceled by an intuitive operation. It is noted that not only when all the selected objects 9 overlap each other but also when some of the selected objects 9 overlap each other, such overlapping of the selected objects 9 can be canceled by performing the following operation.

In FIG. 19, a diagram at the second stage from the top (a diagram appended with (2)) shows that, in the state where the overlapping three objects 8 (selected objects 9a to 9c) are selected, two-point touching is performed in the horizontal direction. The touch panel portion 12 accepts that the two-point touching has been performed. Based on the output of the touch panel portion 12, the panel control portion 10 recognizes that the two-point touching has been performed in the state where the overlapping objects 8 are selected. Further, the panel control portion 10 recognizes that the touched two points are positioned in the horizontal direction.

Then, as shown in a diagram at the third stage from the top (a diagram appended with (3)) in FIG. 19, when performing alignment to cancel the overlapping of the selected objects 9 by moving the selected objects 9 in the leftward direction, a user performs an operation of moving the left-side finger away from the right-side finger with the right-side finger being fixed (an operation of gathering the selected objects 9 to the left side). The touch panel portion 12 accepts an operation of moving (away) the left-side touched point to the left side, with the right-side touched point being fixed. Further, based on the output of the touch panel portion 12, the panel control portion 10 recognizes that an operation to instruct cancellation of overlapping by moving the selected objects 9 in the leftward direction has been performed.

Then, as shown in a diagram at the lowermost stage (a diagram appended with (4)) in FIG. 19, the panel control portion 10 causes the display portion 11 keep the display position of the rightmost selected object 9 (in the example of FIG. 19, the selected object 9c) among the selected objects, and to change (move) the display positions of the other selected objects 9 (in the example of FIG. 19, the selected objects 9a and 9b). At this time, the panel control portion 10 causes the display portion 11 to change the display positions of the other selected objects 9 (the selected objects 9a and 9b) so that any selected object does not overlap another one (so that overlapping is canceled).

Thereby, overlapping of the selected objects 9 is canceled such that, between the touched two points (left-side point and right-side point), the direction of the right-side point that is fixed coincides with the direction of the rightmost selected object 9 that is not moved. Accordingly, it is possible to cancel overlapping of the selected objects 9 in association with the motion of the fingers.

It is noted that FIG. 19 shows the case where the panel control portion 10 causes the display portion 11 to change the display positions of the selected objects 9 by moving the selected objects 9 in the leftward direction, without spaces between the respective selected objects 9. However, the panel control portion 10 may cancel overlapping of the selected objects 9 by causing the display portion 11 to move the display positions of the selected objects 9 in the leftward direction, with predetermined spaces between the respective selected objects 9.

The panel control portion 10 causes the memory 15 to update, for each of the selected objects 9 for which overlapping has been canceled, information indicating the display position of the object on the screen, which information is stored in the object data. Thus, thereafter, when displaying the screen on which overlapping of the selected objects 9 has been canceled, the panel control portion 10 refers to the object data of each selected object 9 which is stored in the memory 15, and causes the display portion 11 to display the screen in the state where overlapping of the selected objects 9 has been canceled.

(Cancellation of Overlapping of Selected Objects 9: Rightward Movement)

Figure 20:
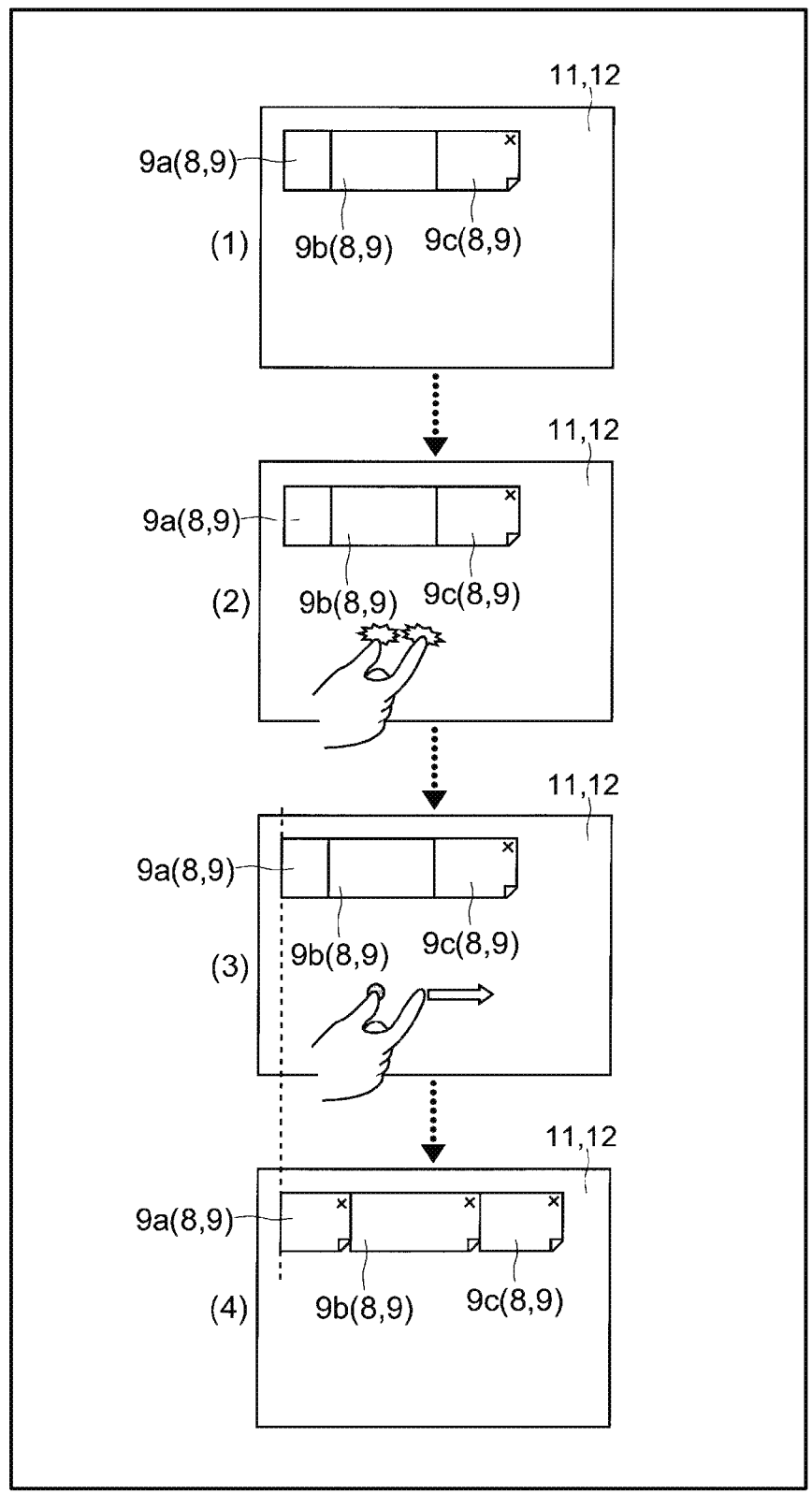
FIG. 20 is an explanation diagram showing an example of a manner of rightward movement of selected objects to cancel overlapping of the selected objects, according to the embodiment of the present disclosure.

Next, with reference to FIG. 20, an example of rightward movement of selected objects 9 to cancel overlapping of the selected objects 9 on the operation panel 1 according to the present embodiment will be described. FIG. 20 is an explanation diagram showing an example of a manner of moving selected objects 9 in the rightward direction to cancel overlapping of the selected objects 9.

First, in FIG. 20, a diagram at the uppermost stage (a diagram appended with (1)) shows that three objects 8 displayed on the display portion 11 are selected (selected objects 9a to 9c). FIG. 19 shows an example of a state where, in advance of alignment, the selected objects 9 are partially overlapped with each other and displayed at an upper position on the display portion 11. Specifically, in FIG. 20, the selected object 9b lies over the selected object 9a, and the selected object 9c lies over the selected object 9b. For example, top-alignment may cause such overlapping of the selected objects 9 as shown in (1) of FIG. 20.

In FIG. 20, a diagram at the second stage from the top (a diagram appended with (2)) shows that, in the state where the overlapping three objects 8 (selected objects 9a to 9c) are selected, two-point touching is performed in the horizontal direction. The touch panel portion 12 accepts that the two-point touching has been performed. Based on the output of the touch panel portion 12, the panel control portion 10 recognizes that the two-point touching has been performed in the state where the overlapping objects 8 are selected. Further, the panel control portion 10 recognizes that the touched two points are positioned in the horizontal direction.

Then, as shown in a diagram in the third stage from the top (a diagram appended with (3)) in FIG. 20, when performing alignment to cancel the overlapping of the selected objects 9 by moving the selected objects 9 in the rightward direction, a user performs an operation of moving the right-side finger away from the left-side finger with the left-side finger being fixed (an operation of gathering the selected objects 9 to the right side). The touch panel portion 12 accepts an operation of moving (away) the right-side touched point to the right side, with the left-side touched point being fixed. Further, based on the output of the touch panel portion 12, the panel control portion 10 recognizes that an operation to instruct cancellation of overlapping by moving the selected objects 9 in the rightward direction has been performed.

Then, as shown in a diagram in the lowermost stage (a diagram appended with (4)) in FIG. 20, the panel control portion 10 causes the display portion 11 not to move the display position of the leftmost selected object 9 (in the example of FIG. 20, the selected object 9a) among the selected objects, and to change (move) the display positions of the other selected objects 9 (in the example of FIG. 20, the selected objects 9b and 9c). At this time, the panel control portion 10 causes the display portion 11 to change the display positions of the other selected objects 9 (the selected objects 9b and 9c) so that any selected object 9 does not overlap another one (so that overlapping is canceled).

Thereby, overlapping of the selected objects 9 is canceled such that, between the touched two points (left-side point and right-side point), the direction of the left-side point that is fixed coincides with the direction of the leftmost selected object 9 that is not moved. Accordingly, it is possible to cancel overlapping of the selected objects 9 in association with the motion of the fingers.

It is noted that FIG. 20 shows the case where the panel control portion 10 causes the display portion 11 to change the display positions of the selected objects 9 by moving the selected objects 9 in the rightward direction, without spaces between the respective selected objects 9. However, the panel control portion 10 may cancel overlapping of the selected objects 9 by causing the display portion 11 to move the display positions of the selected objects 9 in the rightward direction, with predetermined spaces between the respective selected objects 9.

The panel control portion 10 causes the memory 15 to update, for each of the selected objects 9 for which overlapping has been canceled, information indicating the display position of the object on the screen, which information is stored in the object data. Thus, thereafter, when displaying the screen on which overlapping of the selected objects 9 has been canceled, the panel control portion 10 refers to the object data of each selected object 9 which is stored in the memory 15, and causes the display portion 11 to display the screen in the state where overlapping of the selected objects 9 has been canceled.

(Cancellation of Overlapping of Selected Objects 9: Upward Movement)

Figure 21:
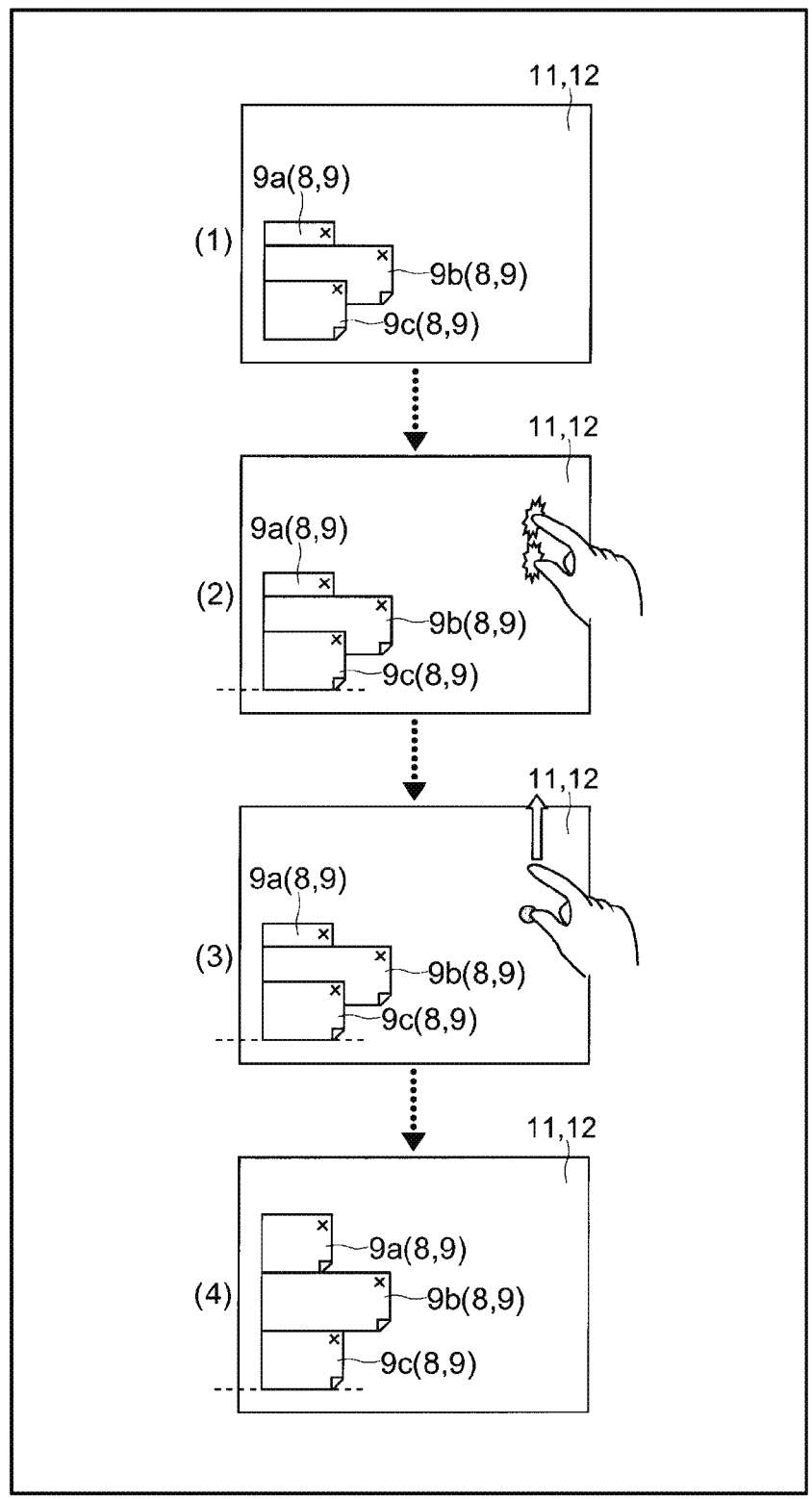
FIG. 21 is an explanation diagram showing an example of a manner of upward movement of selected objects to cancel overlapping of the selected objects, according to the embodiment of the present disclosure.

Next, with reference to FIG. 21, an example of upward movement of selected objects 9 to cancel overlapping of the selected objects 9 on the operation panel 1 according to the present embodiment will be described. FIG. 21 is an explanation diagram showing an example of a manner of moving selected objects 9 in the upward direction to cancel overlapping of the selected objects 9.

First, in FIG. 21, a diagram at the uppermost stage (a diagram appended with (1)) shows that three objects 8 displayed on the display portion 11 are selected (selected objects 9a to 9c). FIG. 21 shows an example of a state where, in advance of alignment, the selected objects 9 are partially overlapped with each other and displayed at a lower-left position on the display portion 11. Specifically, in FIG. 21, the selected object 9b lies over the selected object 9a, and the selected object 9c lies over the selected object 9b. For example, left-alignment may cause such overlapping of the selected objects 9 as shown in (1) of FIG. 21.

In FIG. 21, a diagram at the second stage from the top (a diagram appended with (2)) shows that, in the state where the overlapping three objects 8 (selected objects 9a to 9c) are selected, two-point touching is performed in the vertical direction. The touch panel portion 12 accepts that the two-point touching has been performed. Based on the output of the touch panel portion 12, the panel control portion 10 recognizes that the two-point touching has been performed in the state where the overlapping objects 8 are selected. Further, the panel control portion 10 recognizes that the touched two points are positioned in the vertical direction.

Then, as shown in a diagram in the third stage from the top (a diagram appended with (3)) in FIG. 21, when performing alignment to cancel the overlapping of the selected objects 9 by moving the selected objects 9 in the upward direction, a user performs an operation of moving the upper finger away from the lower finger with the lower finger being fixed (an operation of gathering the selected objects 9 to the upper side). The touch panel portion 12 accepts an operation of moving (away) the upper touched point to the upper side, with the lower touched point being fixed. Further, based on the output of the touch panel portion 12, the panel control portion 10 recognizes that an operation to instruct cancellation of overlapping by moving the selected objects 9 in the upward direction has been performed.

Then, as shown in a diagram in the lowermost stage (a diagram appended with (4)) in FIG. 21, the panel control portion 10 causes the display portion 11 not to move the display position of the lowermost selected object 9 (in the example of FIG. 21, the selected object 9c) among the selected objects, and to change (move) the display positions of the other selected objects 9 (in the example of FIG. 21, the selected objects 9a and 9b). At this time, the panel control portion 10 causes the display portion 11 to change the display positions of the other selected objects 9 (the selected objects 9a and 9b) so that any selected objects 9 does not overlap another one (so that overlapping is canceled).

Thereby, overlapping of the selected objects 9 is canceled such that, between the touched two points (upper point and lower point), the direction of the lower point that is fixed coincides with the direction of the lowermost selected object 9 that is not moved. Accordingly, it is possible to cancel overlapping of the selected objects 9 in association with the motion of the fingers.

It is noted that FIG. 21 shows the case where the panel control portion 10 causes the display portion 11 to change the display positions of the selected objects 9 by moving the selected objects 9 in the upward direction, without spaces between the respective selected objects 9. However, the panel control portion 10 may cancel overlapping of the selected objects 9 by causing the display portion 11 to move the display positions of the selected objects 9 in the upward direction, with predetermined spaces between the respective selected objects 9.

The panel control portion 10 causes the memory 15 to update, for each of the selected objects 9 for which overlapping has been canceled, information indicating the display position of the object on the screen, which information is stored in the object data. Thus, thereafter, when displaying the screen on which overlapping of the selected objects 9 has been canceled, the panel control portion 10 refers to the object data of each selected object 9 which is stored in the memory 15, and causes the display portion 11 to display the screen in the state where overlapping of the selected objects 9 has been canceled.

(Cancellation of Overlapping of Selected Objects 9: Downward Movement)

Figure 22:
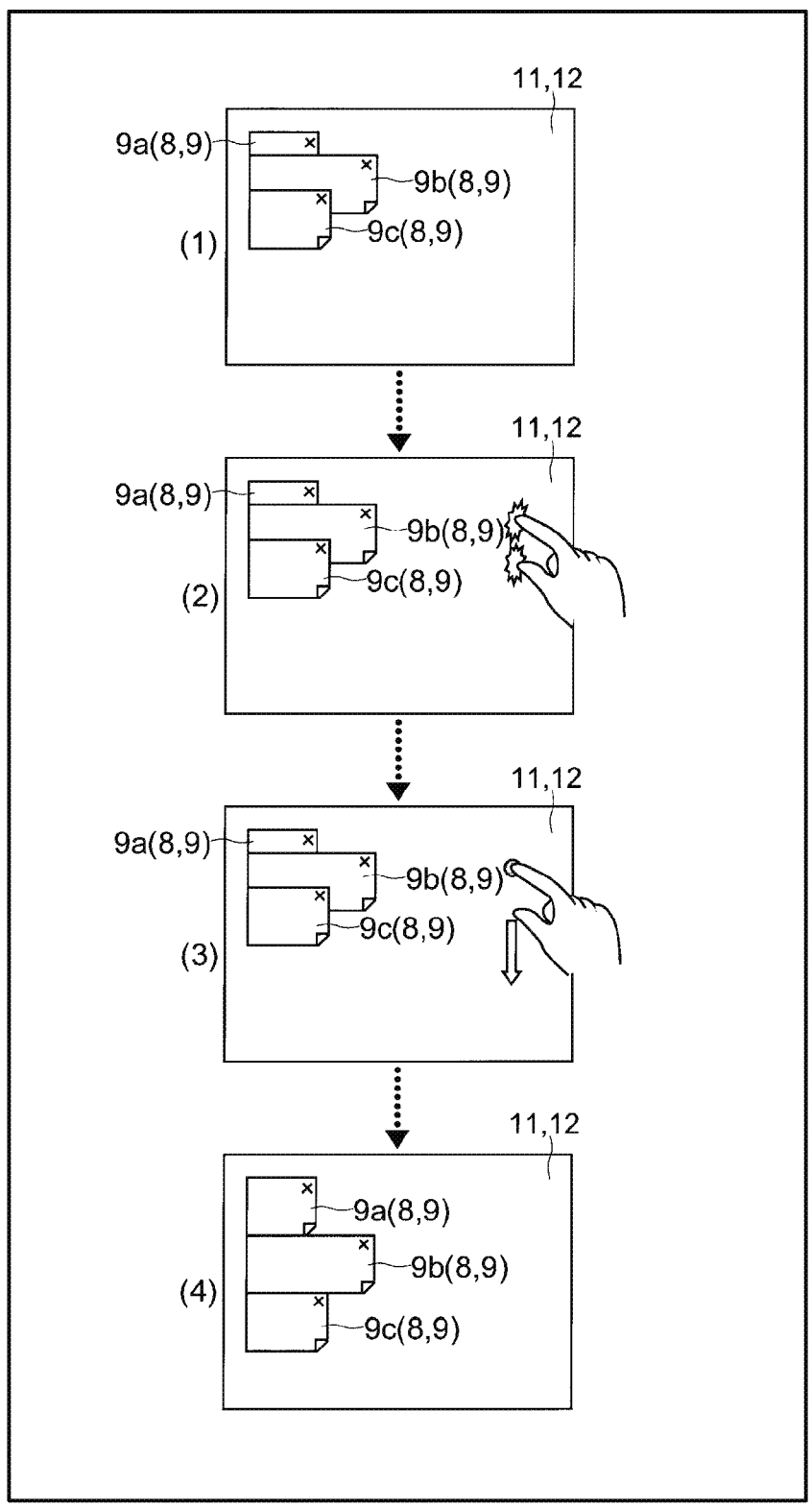
FIG. 22 an explanation diagram showing an example of a manner of downward movement of selected objects to cancel overlapping of the selected objects, according to the embodiment of the present disclosure.

Next, with reference to FIG. 22, an example of downward movement of selected objects 9 to cancel overlapping of the selected objects 9 on the operation panel 1 according to the present embodiment will be described. FIG. 22 is an explanation diagram showing an example of a manner of moving selected objects 9 in the downward direction to cancel overlapping of the selected objects 9.

First, in FIG. 22, a diagram at the uppermost stage (a diagram appended with (1)) shows that three objects 8 displayed on the display portion 11 are selected (selected objects 9a to 9c). FIG. 22 shows an example of a state where, in advance of alignment, the selected objects 9 are partially overlapped with each other and displayed at an upper-left position on the display portion 11. Specifically, in FIG. 22, the selected object 9b lies over the selected object 9a, and the selected object 9c lies over the selected object 9b. For example, left-alignment may cause such overlapping of the selected objects 9 as shown in (1) of FIG. 22.

In FIG. 22, a diagram at the second stage from the top (a diagram appended with (2)) shows that, in the state where the overlapping three objects 8 (selected objects 9a to 9c) are selected, two-point touching is performed in the vertical direction. The touch panel portion 12 accepts that the two-point touching has been performed. Based on the output of the touch panel portion 12, the panel control portion 10 recognizes that the two-point touching has been performed in the state where the overlapping objects 8 are selected. Further, the panel control portion 10 recognizes that the touched two points are positioned in the vertical direction.

Then, as shown in a diagram in the third stage from the top (a diagram appended with (3)) in FIG. 22, when performing alignment to cancel the overlapping of the selected objects 9 by moving the selected objects 9 in the downward direction, a user performs an operation of moving the lower finger away from the upper finger with the upper finger being fixed (an operation of gathering the selected objects 9 to the lower side). The touch panel portion 12 accepts an operation of moving (away) the lower touched point to the lower side, with the upper touched point being fixed. Further, based on the output of the touch panel portion 12, the panel control portion 10 recognizes that an operation to instruct cancellation of overlapping by moving the selected objects 9 in the downward direction has been performed.

Then, as shown in a diagram in the lowermost stage (a diagram appended with (4)) in FIG. 22, the panel control portion 10 causes the display portion 11 not to move the display position of the uppermost selected object 9 (in the example of FIG. 22, the selected object 9a) among the selected objects, and to change (move) the display positions of the other selected objects 9 (in the example of FIG. 22, the selected objects 9b and 9c). At this time, the panel control portion 10 causes the display portion 11 to change the display positions of the other selected objects 9 (the selected objects 9b and 9c) so that any selected object 9 does not overlap another one (so that overlapping is canceled).

Thereby, overlapping of the selected objects 9 is canceled such that, between the touched two points (upper point and lower point), the direction of the upper point that is fixed coincides with the direction of the uppermost selected object 9 that is not moved. Accordingly, it is possible to cancel overlapping of the selected objects 9 in association with the motion of the fingers.

It is noted that FIG. 22 shows the case where the panel control portion 10 causes the display portion 11 to change the display positions of the selected objects 9 by moving the selected objects 9 in the downward direction, without spaces between the respective selected objects 9. However, the panel control portion 10 may cancel overlapping of the selected objects 9 by causing the display portion 11 to move the display positions of the selected objects 9 in the downward direction, with predetermined spaces between the respective selected objects 9.

The panel control portion 10 causes the memory 15 to update, for each of the selected objects 9 for which overlapping has been canceled, information indicating the display position of the object on the screen, which information is stored in the object data. Thus, thereafter, when displaying the screen on which overlapping of the selected objects 9 has been canceled, the panel control portion 10 refers to the object data of each selected object 9 which is stored in the memory 15, and causes the display portion 11 to display the screen in the state where overlapping of the selected objects 9 has been canceled.

(Change of Alignment Direction of Selected Objects 9: From Horizontal Direction to Vertical Direction)

Figure 23:
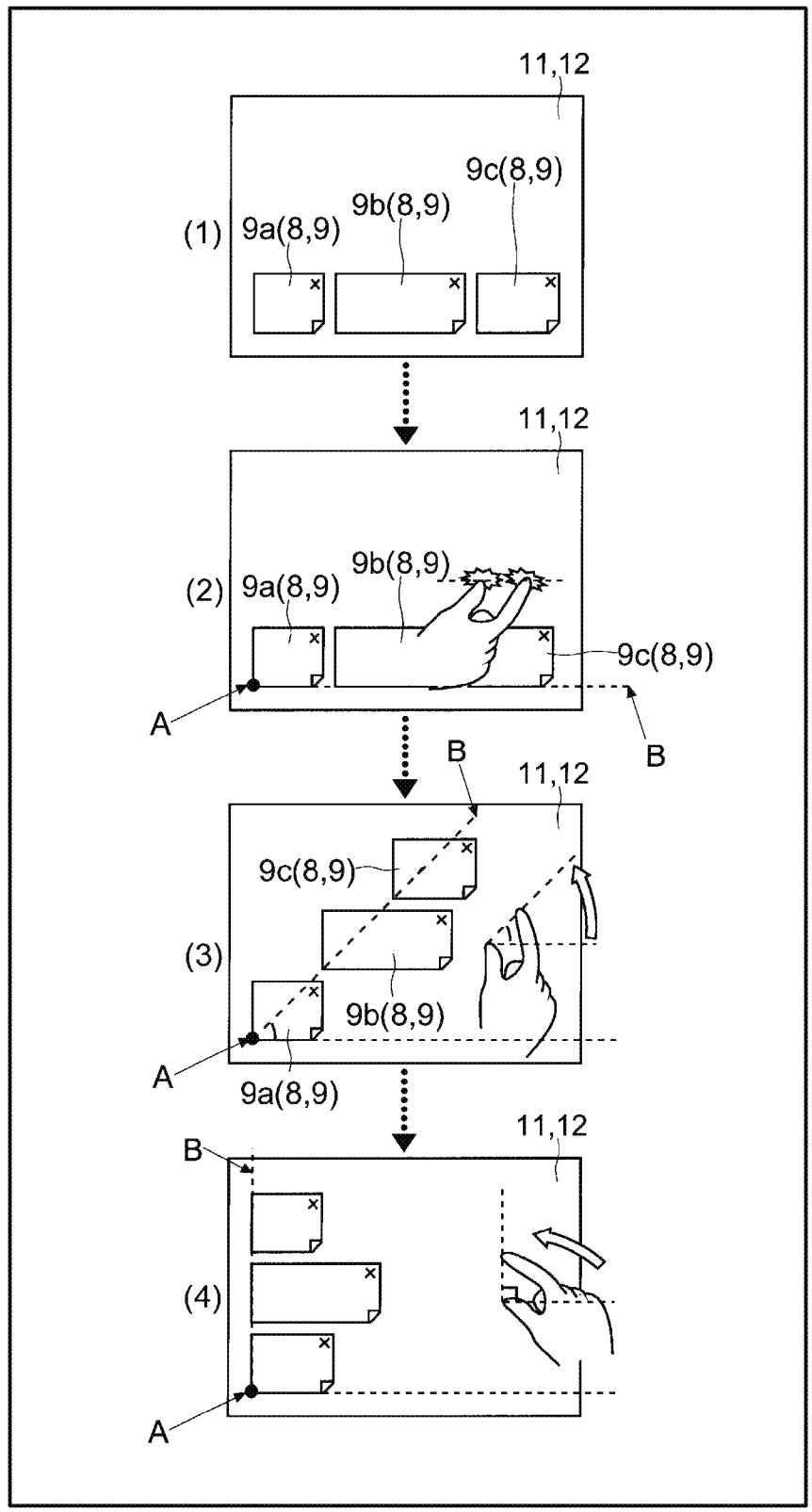
FIG. 23 is an explanation diagram showing an example of a manner of changing the alignment direction of selected objects from the horizontal direction to the vertical direction, according to the embodiment of the present disclosure.

Next, with reference to FIG. 23, an example of change of the alignment direction of selected objects 9 on the operation panel 1 according to the present embodiment will be described. FIG. 23 is an explanation diagram showing an example of a manner of changing the alignment direction of selected objects 9 from the horizontal direction to the vertical direction.

First, in FIG. 23, a diagram at the uppermost stage (a diagram appended with (1)) shows that three objects 8 displayed on the display portion 11 are selected (selected objects 9a to 9c). In advance of change of the alignment direction, in order from the left, the selected object 9a, the selected object 9b, and the selected object 9c are arranged, and the selected objects 9a to 9c are bottom-aligned. For example, bottom alignment may cause the selected objects 9 to be aligned as shown in (1) of FIG. 23.

In FIG. 23, a diagram at the second stage from the top (a diagram appended with (2)) shows that, in the state where the aligned three objects 8 (selected objects 9a to 9c) are selected, two-point touching is performed. The touch panel portion 12 accepts that the two-point touching has been performed. Based on the output of the touch panel portion 12, the panel control portion 10 recognizes that the two-point touching has been performed. Further, the panel control portion 10 recognizes that the touched two points are positioned in the horizontal direction.

Then, as shown in a diagram at the third stage from the top (a diagram appended with (3)) in FIG. 23, in order to change the alignment direction of the selected objects 9, a user performs an operation of rotating the two points the user touches. The touch panel portion 12 accepts an operation of rotating the touched two points. Based on the output of the touch panel portion 12, the panel control portion 10 recognizes that an operation to instruct change of the alignment direction has been performed.

The panel control portion 10 calculates the rotation angle of the touched two points made by the rotation operation. The panel control portion 10 recognizes the coordinates (positions) of the touched two points. Then, the panel control portion 10 calculates the angle between a straight line connecting the two points that have been touched first, and a straight line connecting the two points that have been moved by the rotation operation, when the two straight lines intersect with each other. There are various ways of calculating the angle. For example, the panel control portion 10 calculates, from the coordinates of the touched two points, an inclination of the straight line connecting the two points that have been touched first and an inclination of the straight line connecting the two points that have been moved by the rotation operation. Then, the panel control portion 10 calculates a tangent from the inclinations, and calculates the angle.

Further, when the operation of rotating the touched two points has been performed, the panel control portion 10 determines a reference point A. A manner of determining a reference point A for the selected objects 9 aligned in the horizontal direction has previously been determined. For example, in the case where the two points that have been touched first are positioned in the horizontal direction, if the calculated angle is in the range of 0°<θ<90°, the lower-left corner of the leftmost selected object 9 is determined as the reference point A (in (3) of FIG. 23, an example of the reference point A is shown by a black dot). If the calculated angle is in the range of −90°<θ<0°, the upper-left corner of the leftmost selected object 9 is determined as the reference point A. If the calculated angle is in the range of 90°<θ<180°, the lower-right corner of the rightmost selected object 9 is determined as the reference point A. If the calculated angle is in the range of 180°<θ<270°, the upper-right corner of the rightmost selected object 9 is determined as the reference point A.

Then, the panel control portion 10 recognizes a reference line B connecting the determined reference point A and predetermined specific portions of the selected objects 9. For example, the panel control portion 10 determines, as a specific portion of each selected object 9, a portion at the same position as the reference point A. In the example of FIG. 23 where the lower-left corner of the selected object 9a is the reference point A, the panel control portion 10 recognizes the reference line B with the lower-left corner of each selected object 9 being the specific portion.

Then, as shown in the diagram at the third stage from the top (the diagram appended with (3)) in FIG. 23, the panel control portion 10 causes the display portion 11 to change the display positions of the selected objects 9 other than the selected object 9 having the reference point A, based on the angle calculated in accordance with the rotation operation (based on change of the angle of the straight line connecting the touched two points). In the example of FIG. 23, the panel control portion 10 causes the display portion 11 to change the display positions of the selected objects 9b and 9c.

Then, as shown in the diagram at the third stage from the top in FIG. 23, when causing the display portion 11 to change the display positions of the selected objects 9, the panel control portion 10 causes the display portion 11 to rotate the reference line B around the reference point A by the same angle as the calculated angle, thereby to change the display positions of the selected objects 9 so that the specific portions of the selected objects 9 are located on the reference line B. In the example of FIG. 23, the panel control portion 10 causes the display portion 11 to change the display positions of the selected objects 9b and 9c so that the specific portions (lower-left corners) of the selected objects 9b and 9c are located on the reference line B.

Further, the touch panel portion 12 accepts that the two points are both no longer touched. The panel control portion 10 recognizes that the display positions of the selected objects 9 are fixed at the display positions thereof when the two points are both no longer touched.

As described above, the display positions of the selected objects 9 can be changed so as to be rotated around the reference point A in accordance with the operation of rotating the touched two points. Accordingly, by rotating the positions at which two-point touching has been performed in accordance with the alignment direction of the selected objects 9 and the direction in which a user desires to rotate the selected objects 9, the selected objects 9 move in a similar way to the motion of the fingers, and thereby the alignment direction of the plurality of the selected objects 9 can be easily and quickly changed intuitively.

Then, as shown in a diagram at the fourth stage from the top in FIG. 23, the touch panel portion 12 accepts an operation of rotating the touched points up to 90°. Upon recognizing that the operation of rotating the touched points up to 90° has been performed, the panel control portion 10 causes the display portion 11 to change the display positions of the selected objects 9 so that the alignment direction of the selected objects 9 is changed by 90° from the horizontal direction to the vertical direction. Thus, the alignment direction of the selected objects 9 is changed in a similar way to the motion of the fingers, and thereby the alignment direction of the plurality of objects 8 can be changed between the vertical direction and the horizontal direction by such an intuitive operation.

The panel control portion 10 causes the memory 15 to update, for each of the selected objects 9 for which the alignment direction has been changed, information indicating the display position of the object on the screen, which information is stored in the object data. Thus, thereafter, when displaying the screen on which the alignment direction of the selected objects 9 has been changed, the panel control portion 10 refers to the object data of each selected object 8 which is stored in the memory 15, and causes the display portion 11 to display the screen in the state where the alignment direction of the selected objects 9 has been changed.

(Change of Alignment Direction of Selected Objects 9: From Vertical Direction to Horizontal Direction)

Figure 24:
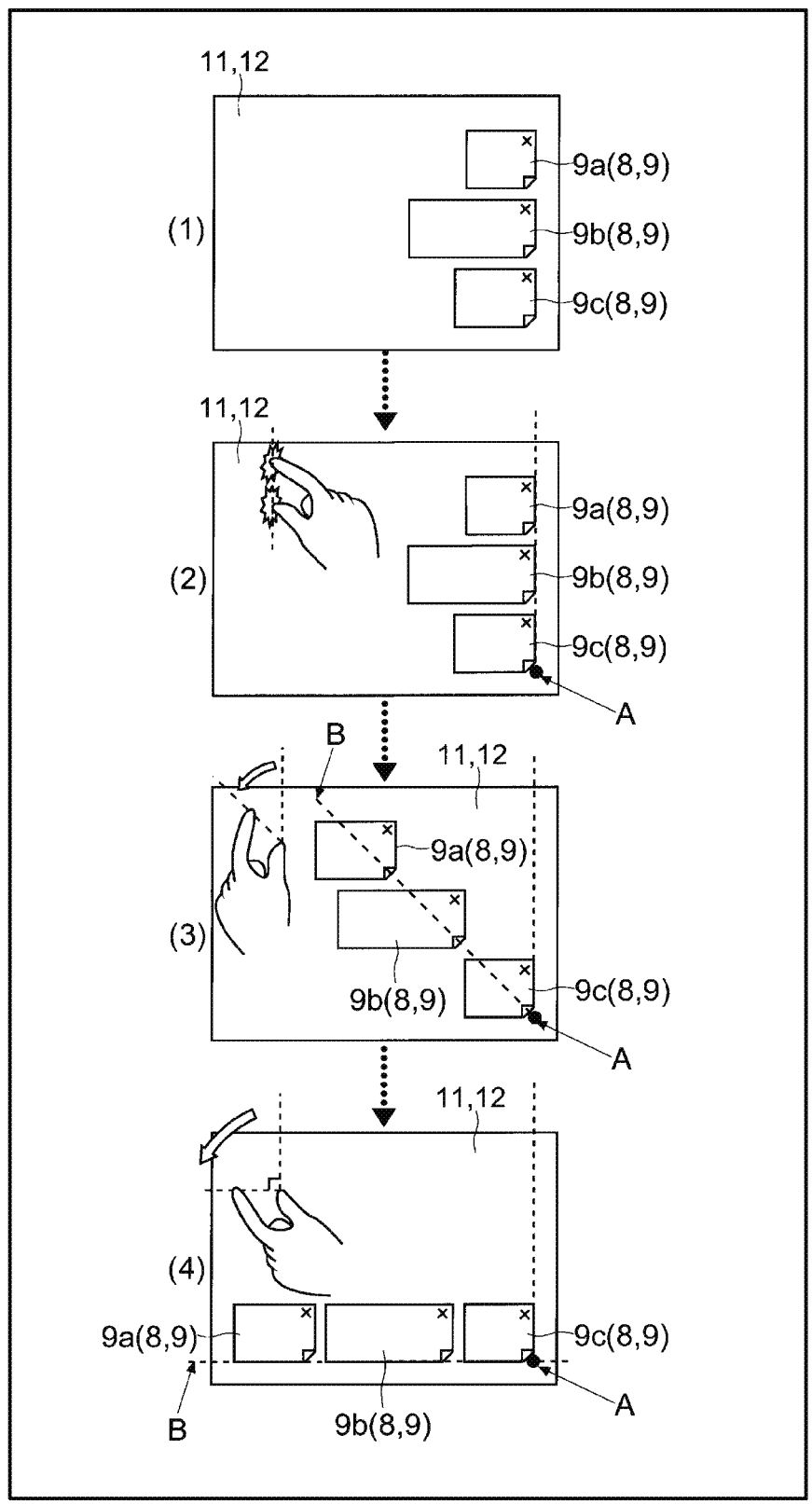
FIG. 24 is an explanation diagram showing an example of a manner of changing the alignment direction of selected objects from the vertical direction to the horizontal direction, according to the embodiment of the present disclosure.

Next, with reference to FIG. 24, an example of change of the alignment direction of selected objects 9 on the operation panel 1 according to the present embodiment will be described. FIG. 24 is an explanation diagram showing an example of a manner of changing the alignment direction of selected objects 9 from the vertical direction to the horizontal direction.

First, in FIG. 24, a diagram at the uppermost stage (a diagram appended with (1)) shows that three objects 8 displayed on the display portion 11 are selected (selected objects 9a to 9c). In advance of change of the alignment direction, in order from the top, the selected object 9a, the selected object 9b, and the selected object 9c are arranged, and the selected objects 9a to 9c are right-aligned. For example, right-alignment may cause the selected objects 8 to be aligned as shown in (1) of FIG. 24.

In FIG. 24, a diagram at the second stage from the top (a diagram appended with (2)) shows that, in the state where the aligned three objects 8 (selected objects 9a to 9c) are selected, two-point touching is performed. The touch panel portion 12 accepts that the two-point touching has been performed. Based on the output of the touch panel portion 12, the panel control portion 10 recognizes that the two-point touching has been performed. Further, the panel control portion 10 recognizes that the touched two points are positioned in the vertical direction.

Then, as shown in a diagram at the third stage from the top (a diagram appended with (3)) in FIG. 24, in order to change the alignment direction of the selected objects 9, a user performs an operation of rotating the two points the user touches. The touch panel portion 12 accepts an operation of rotating the touched two points. Based on the output of the touch panel portion 12, the panel control portion 10 recognizes that an operation to instruct change of the alignment direction has been performed.

The panel control portion 10 calculates the angle by which the touched two points have been rotated in the rotation operation. The panel control portion 10 recognizes the coordinates (positions) of the touched two points. It is noted that the manner of calculating the angle is the same as that described with reference to FIG. 23, and therefore, will not be repeatedly described.

Further, when the operation of rotating the touched two points has been performed, the panel control portion 10 determines a reference point A. A manner of determining a reference point A for the case of rotating the selected objects 9 aligned in the vertical direction has previously been determined. For example, in the case where the two points that have been touched first are in the vertical direction, if the calculated angle is in the range of $90°<θ<180°$ ((3) of FIG. 24), the lower-right corner of the lowermost selected object 9 is determined as the reference point A (in (3) of FIG. 24, an example of the reference point A is shown by a black dot). If the calculated angle is in the range of $0°<θ<90°$, the lower-left corner of the lowermost selected object 9 is determined as the reference point A. If the calculated angle is in the range of $-90°<θ<0°$, the upper-left corner of the uppermost selected object 9 is determined as the reference point A. If the calculated angle is in the range of $180°<θ<270°$, the upper-right corner of the uppermost selected object 9 is determined as the reference point A.

Then, the panel control portion 10 recognizes a reference line B connecting the determined reference point A and predetermined specific portions of the selected objects 9. For example, the panel control portion 10 determines, as a specific portion of each selected object 9, a portion at the same position as the reference point A. In the example of FIG. 24 where the lower-right corner of the selected object 9c is the reference point A, the panel control portion 10 recognizes the reference line B with the lower-right corner of each selected object 9 being the specific portion.

Then, as shown in the diagram at the third stage from the top (the diagram appended with (3)) in FIG. 24, the panel control portion 10 causes the display portion 11 to change the display positions of the selected objects 9 other than the selected object 9 having the reference point A, based on the angle calculated in accordance with the rotation operation (based on change of the angle of the straight line connecting the touched two points). In the example of FIG. 24, the panel control portion 10 causes the display portion 11 to change the display positions of the selected objects 9a and 9b.

Then, as shown in the diagram at the third stage from the top in FIG. 24, when causing the display portion 11 to change the display positions of the selected objects 9, the panel control portion 10 causes the display portion 11 to change the display positions of the selected objects 9 other than the selected object 9 having the reference point A, based on the angle calculated in accordance with the rotation operation (based on change of the angle of the straight line connecting the touched two points). In the example of FIG. 24, the panel control portion 10 causes the display portion 11 to change the display positions of the selected objects 9a and 9b so that the specific portions (lower-right corners) of the selected objects 9a and 9b are located on the reference line B.

Further, the touch panel portion 12 accepts that the two points are both no longer touched. The panel control portion 10 recognizes that the display positions of the selected objects 9 are fixed at the display positions thereof when the two points are both no longer touched.

As described above, the display positions of the selected objects 9 can be changed so as to be rotated around the reference point A in accordance with the operation of rotating the touched two points. Accordingly, by rotating the positions at which two-point touching has been performed, in accordance with the alignment direction of the selected objects 9 and the direction in which a user desires to rotate the selected objects 9, the selected objects 9 move in a similar way to the motion of the fingers, and thereby the alignment direction of the selected objects 9 can be easily and quickly changed intuitively.

Then, as shown in a diagram at the fourth stage from the top in FIG. 24, the touch panel portion 12 accepts an operation of rotating the touched points up to 90°. Upon recognizing that the operation of rotating the touched points up to 90° has been performed, the panel control portion 10 causes the display portion 11 to change the display positions of the selected objects 9 so that the alignment direction of the selected objects 9 is changed by 90° from the vertical direction to the horizontal direction. Thus, the alignment direction of the selected objects 9 is changed in a similar way to the motion of the fingers, and thereby the alignment direction of the plurality of objects 8 can be changed between the vertical direction and the horizontal direction by such an intuitive operation.

The panel control portion 10 causes the memory 15 to update, for each of the selected objects 9 for which the alignment direction has been changed, information indicating the display position of the object on the screen, which information is stored in the object data. Thus, thereafter, when displaying the screen on which the alignment direction of the selected objects 9 has been changed, the panel control portion 10 refers to the object data of each selected object 9 which is stored in the memory 15, and causes the display portion 11 to display the screen in the state where the alignment direction of the selected objects 9 has been changed.

(Change of Overlapping Order of Selected Objects 9: Part 1)

Figure 25:
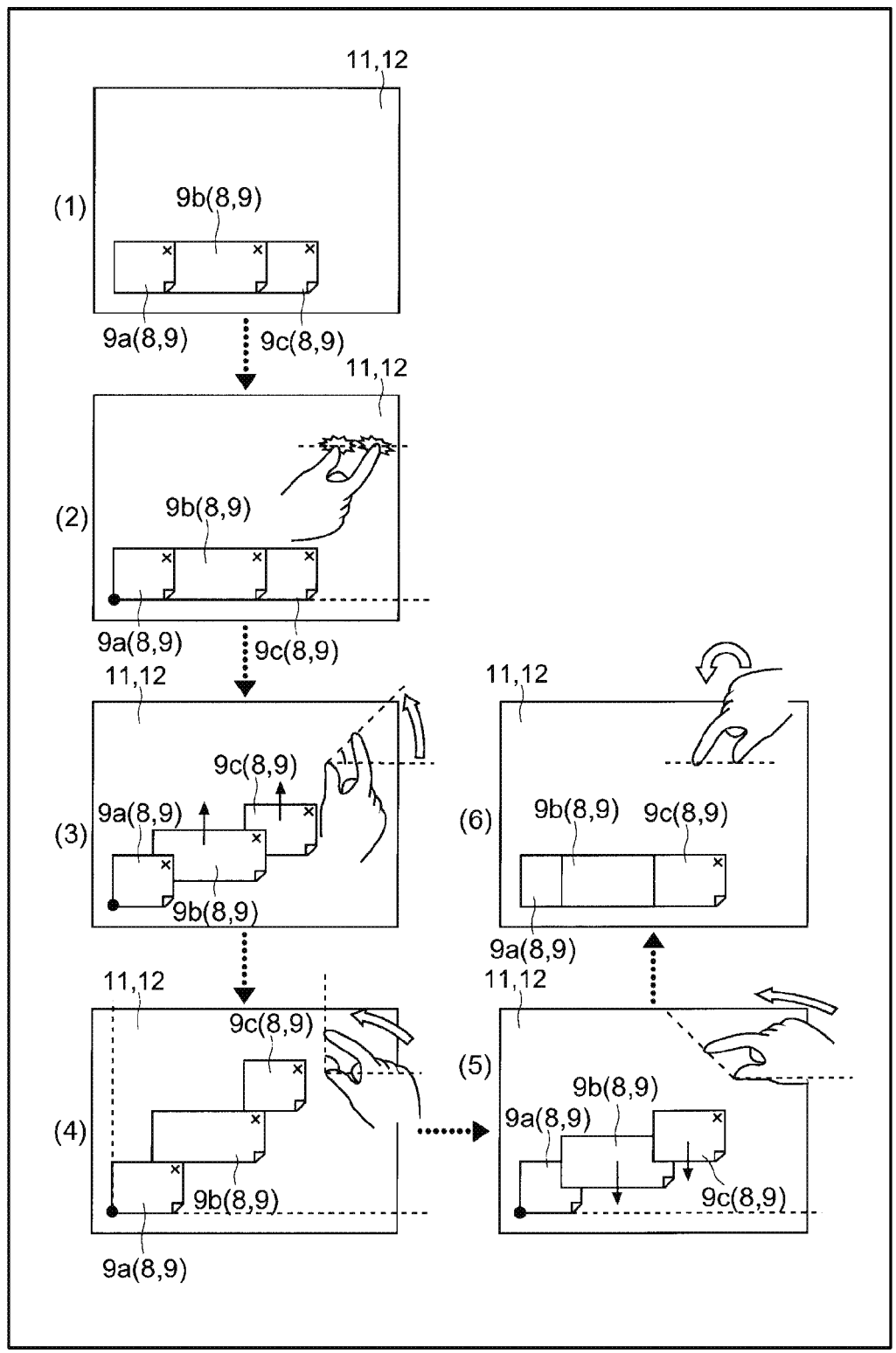
FIG. 25 is an explanation diagram showing an example of a manner of changing the overlapping order of selected objects arranged in the horizontal direction, according to the embodiment of the present disclosure.

Next, with reference to FIG. 25, an example of changing the overlapping order of selected objects 9 arranged in the horizontal direction on the operation panel 1 according to the present embodiment will be described. FIG. 25 is an explanation diagram showing an example of a manner of changing the overlapping order of selected objects 9 arranged in the horizontal direction.

First, in FIG. 25, a diagram at the uppermost stage (a diagram appended with (1)) shows that three objects 8 displayed on the display portion 11 are selected (selected objects 9a to 9c). (1) of FIG. 25 shows an example of a case where, in advance of alignment, the selected objects 9 are partially overlapped with each other and displayed at a lower-left position on the display portion 11. Specifically, in FIG. 25, the selected object 9b lies over the selected object 9c, and the selected object 9a lies over the selected object 9b. For example, bottom-alignment may cause such overlapping of the selected objects 9 as shown in (1) of FIG. 25.

In FIG. 25, a diagram at the second stage from the top (a diagram appended with (2)) shows that, in the state where the overlapping three objects 8 (selected objects 9a to 9c) are selected, two-point touching is performed in the horizontal direction (or in the vertical direction). The touch panel portion 12 accepts that the two-point touching has been performed. Based on the output of the touch panel portion 12, the panel control portion 10 recognizes that the two-point touching has been performed in the state where the overlapping objects 8 arranged in the horizontal direction are selected.

Then, as shown in a diagram on the left side at the third stage from the top (a diagram appended with (3)) in FIG. 25, in order to change the overlapping order of the selected objects 9, a user performs an operation of rotating the two points the user touches. The touch panel portion 12 accepts an operation of rotating the touched two points. Based on the output of the touch panel portion 12, the panel control portion 10 recognizes that an operation to instruct change of the overlapping order of the selected objects 9 has been started.

The panel control portion 10 calculates the angle by which the touched two points have been rotated by the rotation operation. The panel control portion 10 recognizes the coordinates (positions) of the touched two points. It is noted that the manner of calculating the angle is the same as that described with reference to FIG. 23, and therefore, will not be repeatedly described.

When the operation of rotating the touched two points has been performed, the panel control portion 10 moves the selected objects 9 arranged in the horizontal direction, in a direction that cancels the overlapping, until an angle change amount (an amount of change in the angle of the straight line connecting the two points being currently touched with respect to the straight line connecting the two points that have been touched first) reaches a predetermined angle change amount. When the selected objects 9 are arranged in the horizontal direction as shown in FIG. 25, the panel control portion 10 causes the display portion 11 to change the display positions of the selected objects 9 in the vertical direction. However, as shown in (3) of FIG. 25, the display portion 11 does not move the display position of the topmost selected object 9 (the selected object 9a) among the overlapping selected objects 9.

In the present embodiment, an example where the predetermined angle change amount is 90° will be described. However, the predetermined angle change amount may be smaller or larger than 90°. In addition, if the selected objects 9 are positioned lower than the center of the display area of the display portion 11 in the vertical direction, the selected objects 9 may be moved in the upward direction. On the other hand, if the selected objects 9 are positioned higher than the center of the display area of the display portion 11 in the vertical direction, the selected objects 9 may be moved in the downward direction.

In the example shown in (3) of FIG. 25, first, the panel control portion 10 causes the display portion 11 not to move the display position of the topmost selected object 9a. Then, if the angle change amount is in the range of 0°<θ<90°, the panel control portion 10 causes the display portion 11 to perform display so that the display positions of the selected objects 9b and 9c move upward. As the angle change amount increases, the panel control portion 10 increases the amount of movement of the display positions of the selected objects 9b and 9c from their original display positions. In addition, the panel control portion 10 causes the display portion 11 to change the display positions of the selected objects 9b and 9c so that the selected object 9 that is farther from the selected object 9a that is not moved is moved by a larger amount of movement with respect to the angle change. For example, assuming that the amount of movement of the selected object 9b with respect to an angle change of 1° is "1", the amount of movement of the selected object 9c with respect to an angle change of 1° is "2" (1:2).

Further, as shown in a diagram on the left side at the lowermost stage (a diagram appended with (4)) in FIG. 25, when the angle change amount has reached the predetermined angle change amount (90°), the panel control portion 10 causes the display portion 11 to change the display positions of the selected objects 9 so that the selected objects 9 do not overlap at all. In the example shown in (4) of FIG. 25, when the angle change amount has reached 90°, the panel control portion 10 causes the display portion 11 to perform display so that the selected object 9a, the selected object 9b, and the selected object 9c do not overlap each other.

Further, as shown in a diagram on the right side at the lowermost stage (a diagram appended with (5)) in FIG. 25, when the angle change amount has exceeded the predetermined angle change amount (90°), the panel control portion 10 causes the display portion 11 to display the selected objects 9 so that the overlapping order is reversed. In the example shown in (4) of FIG. 25, when the angle change amount has exceeded 90°, the panel control portion 10 causes the display portion 11 to perform display so that the selected object 9a that has been the topmost object becomes the bottommost object, and the selected object 9c that has been the bottommost object becomes the topmost object.

Further, as shown in (5) of FIG. 25, the panel control portion 10 causes the display portion 11 to change the display positions of the selected objects 9 so that the selected objects 9 that have been moved return to their original positions. In the example shown in (5) of FIG. 25, when the angle change amount has exceeded 90°, the panel control portion 10 causes the display portion 11 to change the display so that the display positions of the selected objects 9b and 9c that have been moved are moved downward. In addition, as the angle change amount increases, the panel control portion 10 increases the amount of movement of the display positions of the selected objects 9b and 9c from the state where the selected objects 9b and 9c do not overlap at all. In addition, the panel control portion 10 causes the display portion 11 to change the display positions of the selected objects 9b and 9c so that the selected object 9 that is farther from the selected object 9a that is not moved is moved by a larger amount of movement with respect to the angle change. After the angle change amount has exceeded 90°, for example, if the amount of downward movement of the selected object 9b with respect to an angle change of 1° is "1", the amount of downward movement of the selected object 9c with respect to an angle change of 1° is "2" (1:2).

Further, as shown in a diagram on the right side at the third stage from the top (a diagram appended with (6)) in FIG. 25, when the angle change amount has reached twice (180°) the predetermined angle change amount, the display positions of the selected objects 9 return to their original display positions although the overlapping order of the selected objects 9 is reversed from that before start of the rotation operation.

Therefore, in order to reverse the overlapping order of the overlapping selected objects 9, a user, after selecting the objects 8, rotates the two points the user touches, by 180°, and then takes off the fingers from the touch panel portion 12.

When the touch panel portion 12 has accepted that the points having been touched are no longer touched, the display positions of the selected objects 9 are fixed at the display positions at that time. The panel control portion 10 recognizes that, thereafter, the selected objects 9 are to be displayed in the overlapping order and at the display positions, which have been fixed when the points having been touched are no longer touched.

Therefore, when the points having been touched are no longer touched, the panel control portion 10 causes the memory 15 to update, for each selected object 9, information indicating the overlapping order of the object and information indicating the display position of the object on the screen, which are included in the object data. Thus, thereafter, when displaying the screen on which the overlapping order of the selected objects 9 have been changed, the panel control portion 10 refers to the object data of each object 8 which is stored in the memory 15, and causes the display portion 11 to display the screen in the state where the display positions and overlapping order of the selected objects 9 have been changed.

As described above, of the overlapping selected objects 9, the selected object 9 to be displayed at the topmost position can be changed in accordance with the operation of rotating the touched two points. Accordingly, it is possible to change the display order of a plurality of objects 8 overlapping each other by such an intuitive operation.

(Change of Overlapping Order of Selected Objects 9: Part 2)

Figure 26:
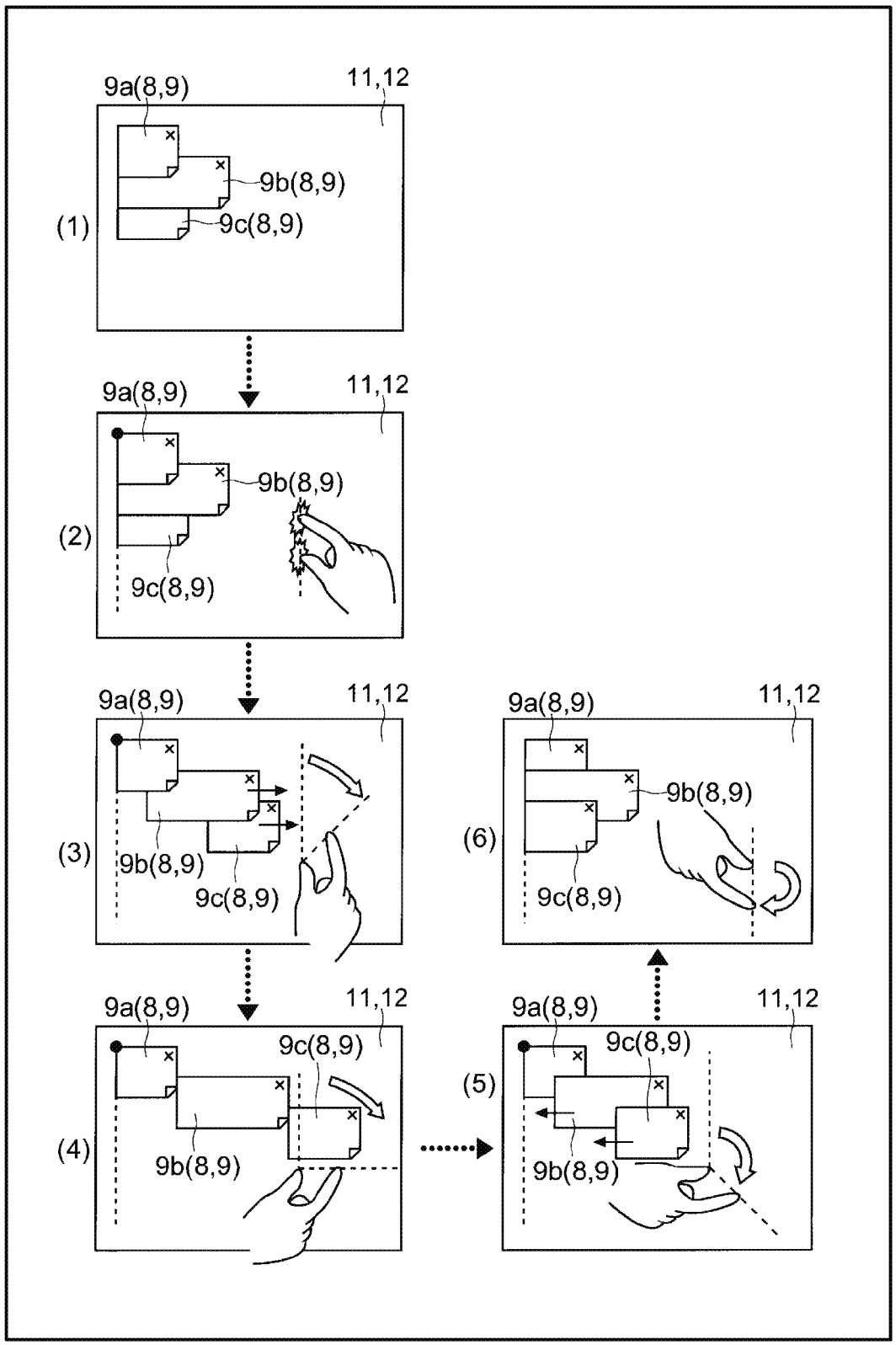
FIG. 26 is an explanation diagram showing an example of a manner of changing the overlapping order of selected objects arranged in the vertical direction, according to the embodiment of the present disclosure.

Next, with reference to FIG. 26, an example of changing the overlapping order of selected objects 9 arranged in the vertical direction on the operation panel 1 according to the present embodiment will be described. FIG. 26 is an explanation diagram showing an example of a manner of changing the overlapping order of selected objects 9 arranged in the vertical direction.

First, in FIG. 26, a diagram at the uppermost stage (a diagram appended with (1)) shows that three objects 8 displayed on the display portion 11 are selected (selected objects 9a to 9c). (1) of FIG. 26 shows an example of a case where, in advance of alignment, the selected objects 9 are partially overlapped with each other and displayed at an upper-left position on the display portion 11. Specifically, in FIG. 26, the selected object 9b lies over the selected object 9c, and the selected object 9a lies over the selected object 9b. For example, left-alignment may cause such overlapping of the selected objects 9 as shown in (1).

In FIG. 26, a diagram at the second stage from the top (a diagram appended with (2)) shows that, in the state where the overlapping three objects 8 (selected objects 9a to 9c) are selected, two-point touching is performed in the vertical direction (or in the horizontal direction). The touch panel portion 12 accepts that the two-point touching has been performed. Based on the output of the touch panel portion 12, the panel control portion 10 recognizes that the two-point touching has been performed in the state where the overlapping objects 8 arranged in the vertical direction are selected.

Then, as shown in a diagram on the left side at the third stage from the top (a diagram appended with (3)) in FIG. 26, in order to change the overlapping order of the selected objects 9, a user performs an operation of rotating the two points the user touches. The touch panel portion 12 accepts an operation of rotating the touched two points. Based on the output of the touch panel portion 12, the panel control portion 10 recognizes that an operation to instruct change of the overlapping order of the selected objects 9 has been started.

The panel control portion 10 calculates the angle by which the touched two points have been rotated by the rotation operation. The panel control portion 10 recognizes the coordinates (positions) of the touched two points. It is noted that the manner of calculating the angle is the same as that described with reference to FIG. 23, and therefore, will not be repeatedly described.

When the operation of rotating the touched two points has been performed, the panel control portion 10 moves the selected objects 9 arranged in the vertical direction, in a direction that cancels the overlapping, until an angle change amount (an amount of change in the angle of the straight line connecting the two points being currently touched with respect to the straight line connecting the two points that have been touched first) reaches a predetermined angle change amount. When the selected objects 9 are arranged in the vertical direction as shown in FIG. 26, the panel control portion 10 causes the display portion 11 to change the display positions of the selected objects 9 in the horizontal direction. However, as shown in (3) of FIG. 26, the display portion 11 does not move the display position of the topmost selected object 9 (the selected object 9a) among the overlapping selected objects 9.

If the selected objects 9 are positioned to the left relative to the center of the display area of the display portion 11 in the horizontal direction, the selected objects 9 may be moved in the rightward direction. On the other hand, if the selected objects 9 are positioned to the right relative to the center of the display area of the display portion 11 in the horizontal direction, the selected objects 9 may be moved in the leftward direction.

In the example shown in (3) of FIG. 26, first, the panel control portion 10 causes the display portion 11 not to move the display position of the topmost selected object 9a. Then, if the angle change amount is in the range of 0°<θ<90°, the panel control portion 10 causes the display portion 11 to perform display so that the display positions of the selected objects 9b and 9c move rightward. As the angle change amount increases, the panel control portion 10 increases the amount of movement of the display positions of the selected objects 9b and 9c from their original display positions. In addition, the panel control portion 10 causes the display portion 11 to change the display positions of the selected objects 9b and 9c so that the selected object 9 that is farther from the selected object 9a that is not moved is moved by a larger amount of movement with respect to the angle change. For example, assuming that the amount of movement of the selected object 9b with respect to an angle change of 1° is "1", the amount of movement of the selected object 9c with respect to an angle change of 1° is "2" (1:2).

Further, as shown in a diagram on the left side at the lowermost stage (a diagram appended with (4)) in FIG. 26, when the angle change amount has reached the predetermined angle change amount (90°), the panel control portion 10 causes the display portion 11 to change the display positions of the selected objects 9 so that the selected objects 9 do not overlap at all. In the example shown in (4) of FIG. 26, when the angle change amount has reached 90°, the panel control portion 10 causes the display portion 11 to perform display so that the selected object 9a, the selected object 9b, and the selected object 9c do not overlap each other.

Further, as shown in a diagram on the right side at the lowermost stage (a diagram appended with (5)) in FIG. 26, when the angle change amount has exceeded the predetermined angle change amount (90°), the panel control portion 10 causes the display portion 11 to display the selected objects 9 so that the overlapping order is reversed. In the example shown in (4) of FIG. 26, when the angle change amount has exceeded 90°, the panel control portion 10 causes the display portion 11 to perform display so that the selected object 9a that has been the topmost object becomes the bottommost object, and the selected object 9c that has been the bottommost object becomes the topmost object.

Further, as shown in (5) of FIG. 26, the panel control portion 10 causes the display portion 11 to change the display positions of the selected objects 9 so that the selected objects 9 that have been moved return to their original positions. In the example shown in (5) of FIG. 26, when the angle change amount has exceeded 90°, the panel control portion 10 causes the display portion 11 to change the display so that the display positions of the selected objects 9b and 9c having been moved are moved leftward. In addition, as the angle change amount increases, the panel control portion 10 increases the amount of movement of the display positions of the selected objects 9b and 9c from the state where the selected objects 9b and 9c do not overlap at all. In addition, the panel control portion 10 causes the display portion 11 to change the display positions of the selected objects 9b and 9c so that the selected object 9 that is farther from the selected object 9a that is not moved is moved by a larger amount of movement with respect to the angle change. After the angle change amount has exceeded 90°, for example, if the amount of leftward movement of the selected object 9b with respect to an angle change of 1° is "1", the amount of leftward movement of the selected object 9c with respect to an angle change of 1° is "2" (1:2).

Further, as shown in a diagram on the right side at the third stage from the top (a diagram appended with (6)) in FIG. 26, when the angle change amount has reached twice (180°) the predetermined angle change amount, the display positions of the selected objects 9 return to their original display positions although the overlapping order of the selected objects 9 is reversed from that before start of the rotation operation. Therefore, in order to reverse the overlapping order of the overlapping selected objects 9, a user, after selecting the objects 8, rotates the two points the user touches, by 180°, and then takes off the fingers from the touch panel portion 12.

When the touch panel portion 12 has accepted that the points having been touched are no longer touched, the display positions of the selected objects 9 are fixed at the display positions at that time. The panel control portion 10 recognizes that, thereafter, the selected objects 9 are to be displayed in the overlapping order and at the display positions, which have been fixed when the points having been touched are no longer touched.

Therefore, when the points having been touched are no longer touched, the panel control portion 10 causes the memory 15 to update, for each selected object 9, information indicating the overlapping order of the object and information indicating the display position of the object on the screen, which are included in the object data. Thus, thereafter, when displaying the screen on which the overlapping order of the selected objects 9 have been changed, the panel control portion 10 refers to the object data of each object 8 which is stored in the memory 15, and causes the display portion 11 to display the screen in the state where the display positions and overlapping order of the selected objects 9 have been changed.

As described above, of the overlapping selected objects 9, the selected object 9 to be displayed at the topmost position can be changed in accordance with the operation of rotating the touched two points. Accordingly, it is possible to change the display order of a plurality of objects 8 overlapping each other by such an intuitive operation.

(Flow of Alignment of Objects 8)

Figure 27:
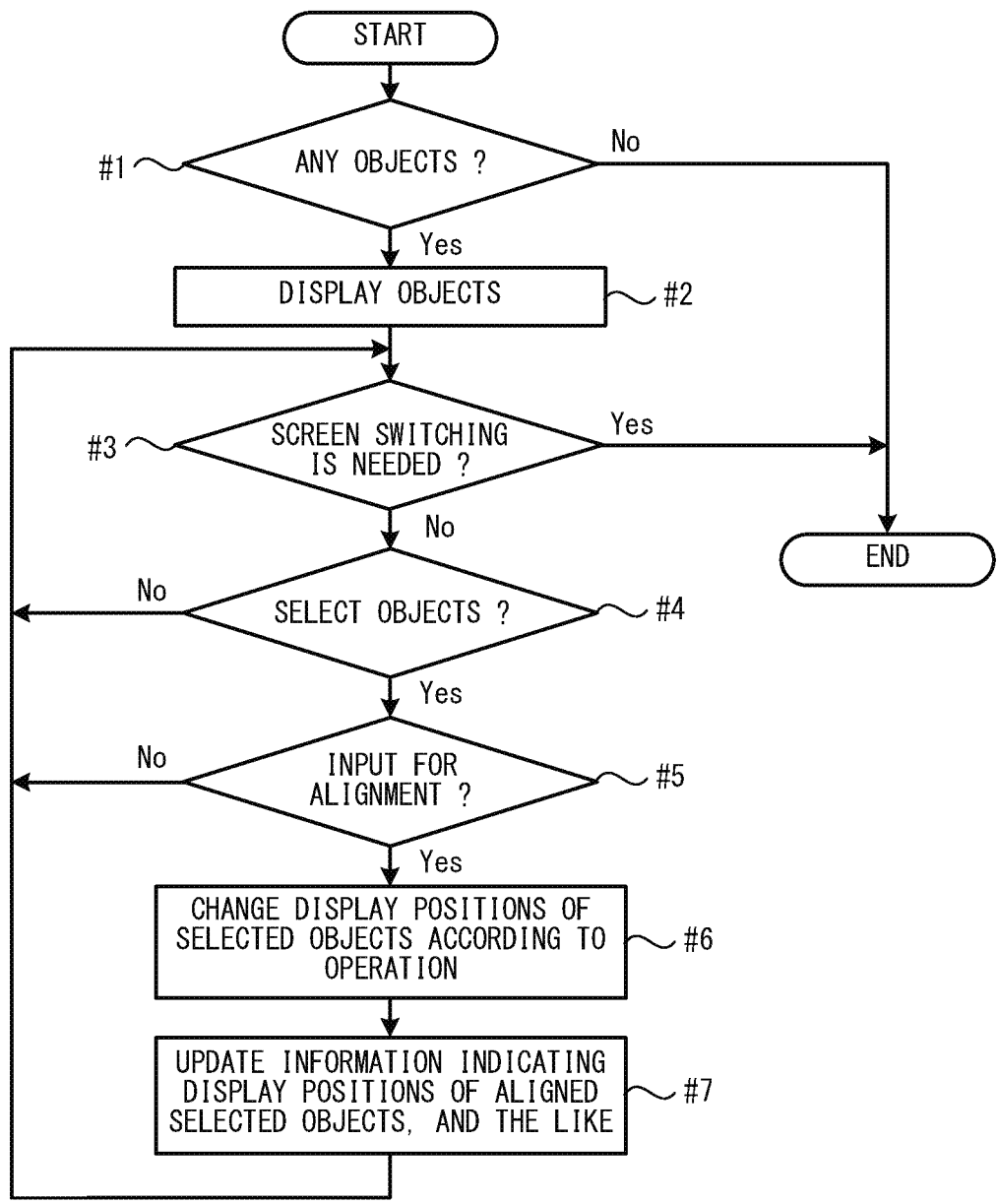
FIG. 27 is a flowchart showing an example of a flow of alignment of objects, according to the embodiment of the present disclosure.

Next, with reference to FIG. 27, a flow of alignment of objects 8 in the operation panel 1 and the image forming apparatus according to the present embodiment will be described. FIG. 27 is a flowchart showing an example of a flow of alignment of objects 8.

START in FIG. 27 indicates a point when the panel control portion 10 causes the display portion 11 to display a new screen (to switch the screen), such as when a display position of a key has been touched or when a hardware key on the operation panel 1 has been pressed.

First, with reference to the object data of the respective objects 8 stored in the memory 15, the panel control portion 10 confirms whether or not there are any objects 8 to be displayed on a newly displayed screen (switched screen) (step #1). If there are no such objects 8 (No in step #1), since alignment of objects 8 cannot be performed, this flow may be ended (END). On the other hand, if there are objects 8 to be displayed, the panel control portion 10 displays the objects 8 with the contents and sizes thereof and at the display positions thereof, which are defined in the object data of the objects 8 to be displayed (step #2).

Then, the panel control portion 10 confirms whether or not the touch panel portion 12 has accepted an input of instructing switching of the screen (step #3). In other words, the panel control portion 10 confirms whether or not it is needed to cause the display portion 11 to display a new screen (step #3). If switching to a new screen is needed (Yes in step #3), this flow may be ended (END). Then, this flow is started on the newly displayed screen (the screen displayed by the switching).

On the other hand, if switching to a new screen is not yet needed, the panel control portion 10 confirms whether or not any objects 8 have been selected (step #4). If the touch panel portion 12 has not accepted an input of selecting objects 8 (No in step #4), the flow may return to step #3.

When the touch panel portion 12 has accepted an input of selecting objects 8 (Yes in step #4), the panel control portion 10 confirms whether or not an input of aligning the selected objects 8 has been performed by two-point touching on the touch panel portion 12 (step #5). If an input of aligning the selected objects 8 has not been performed (No in step #5), the flow may return to step #3.

On the other hand, if an input of aligning the selected objects 8 has been performed (if alignment is needed: Yes in step #5), the panel control portion 10 causes the display portion 11 to change the display positions of the selected objects 9 in accordance with an operation, and align the selected objects 9 (step #6). Then, the panel control portion 10 causes the memory 15 to update the object data, such as information indicating the display positions of the aligned selected objects 9 and information indicating the overlapping order of the aligned selected objects 9 (step #7). After step #7, the flow may return to step #3.

In this way, the display input device (operation panel 1) according to the present embodiment includes: the display portion 11 that displays a screen and an image, and displays a plurality of objects 8 that are images whose display positions are movable; the touch panel portion 12 that is provided for the display portion 11, accepts an input from a user, and detects a plurality of positions being touched; and the determination portion (panel control portion 10) that determines whether two points being touched are in the vertical direction or the horizontal direction. The touch panel portion 12 accepts an input of selecting some or all of the objects 8 displayed on the display portion 11 as selected objects 9. When the touch panel portion 12 has detected that two-point touching has been performed thereon in the state where the objects 8 are selected, the display portion 11 aligns the display positions of the selected objects 9 in accordance with the direction of the touched two points and movement of the touched points.

Therefore, after selecting a plurality of objects 8, a user can align the selected objects 9 by only performing two-point touching on the touch panel portion 12, and performing an operation to move the two points the user touches. Accordingly, the number of operations for aligning a plurality of objects 8 can be reduced, and the plurality of objects 8 can be easily and quickly aligned by such an intuitive operation. In addition, a menu and/or a key, which have conventionally been displayed for alignment of objects 8, need not be displayed, thereby making the display on the display portion 11 easily viewable.

Furthermore, the image forming apparatus (multifunction peripheral 100) includes the above-mentioned display input device (operation panel 1). The image forming apparatus includes the display input device that can perform alignment of objects 8 easily and intuitively, and is easy to use. Accordingly, it is possible to provide a user-friendly image forming apparatus.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A display input device comprising:
   a display portion that displays a screen and an image, and displays a plurality of objects which are images whose display positions are movable;
   a touch panel portion that is provided for the display portion, and that accepts an input from a user, and detects a plurality of positions that are touched; and
   a determination portion that determines whether two points that are touched are in a vertical direction or in a horizontal direction, wherein
   the touch panel portion accepts an input of selecting, as selected objects, some or all of the objects displayed on the display portion;
   when the touch panel portion has detected that two-point touching has been performed thereon in the state where the objects are selected, the display portion aligns the display positions of the selected objects in accordance with the direction of the touched two points and movement of the touched points;
   in a case where the touched two points are in the horizontal direction,
      when the touch panel portion has accepted that a right-side touched point has been moved in a leftward direction with a left-side touched point being fixed, the display portion aligns the display positions of the selected objects by left-alignment so that left ends of the selected objects are aligned with a predetermined left-alignment position, and when the touch panel portion has accepted that the left-side touched point has been moved in the rightward direction with the right-side touched point being fixed, the display portion aligns the display positions of the selected objects by right-alignment so that right ends of the selected objects are aligned with a predetermined right-alignment position;
      when any of the selected objects is displayed at a position of one of the touched two points, the left-alignment position is a position of the left end of the selected object displayed at the touched position, and when none of the selected objects is displayed at the position of one of the touched two points, the left-alignment position is a position of the left end of a display area of the display portion or the position of the left end of the selected object located at a leftmost position; and
      when any of the selected objects is displayed at the position of one of the touched two points, the right-alignment position is a position of the right end of the selected object displayed at the touched position, and when none of the selected objects is displayed at the position of one of the touched two points, the right-alignment position is a position of the right end of the display area of the display portion or the position of the right end of the selected object located at a rightmost position among the selected objects; and
   in a case where the touched two points are in the vertical direction,
      when the touch panel portion has accepted that a lower touched point has been moved in an upward direction with an upper touched point being fixed, the display portion aligns the display positions of the selected objects by top-alignment so that upper ends of the selected objects are aligned with a predetermined top-alignment position, and when the touch panel portion has accepted that the upper touched point has been moved in a downward direction with the lower touched point being fixed, the display portion aligns the display positions of the selected objects by bottom-alignment so that lower ends of the selected objects are aligned with a predetermined bottom-alignment position;
      when any of the selected objects is displayed at the position of one of the touched two points, the top-alignment position is the position of the upper end of the selected object displayed at the touched position, and when none of the selected objects is displayed at the position of one of the touched two points, the top-alignment position is the position of the upper end of a display area of the display portion or the position of the upper end of the selected object located at the uppermost position; and
      when any of the selected objects is displayed at the position of one of the touched two points, the bottom-alignment position is the position of the lower end of the selected object displayed at the touched position, and when none of the selected objects is displayed at the position of one of the touched two points, the bottom-alignment position is the position of a lower end of the display area of the display portion or the position of the lower end of the selected object located at the lowermost position.

2. A display input device comprising:
   a display portion that displays a screen and an image, and displays a plurality of objects which are images whose display positions are movable;
   a touch panel portion that is provided for the display portion, and that accepts an input from a user, and detects a plurality of positions that are touched; and
   a determination portion that determines whether two points that are touched are in a vertical direction or in a horizontal direction; wherein
   the touch panel portion accepts an input of selecting, as selected objects, some or all of the objects displayed on the display portion;

when the touch panel portion has detected that two-point touching has been performed thereon in the state where the objects are selected, the display portion aligns the display positions of the selected objects in accordance with the direction of the touched two points and movement of the touched points;

in a case where the touched two points are in the horizontal direction, when the touch panel portion has accepted that a right-side touched point has been moved in a leftward direction with a left-side touched point being fixed, the display portion aligns the display positions of the selected objects by left-alignment so that left ends of the selected objects are aligned with a predetermined left-alignment position; and when the touch panel portion has accepted that the left-side touched point has been moved in the rightward direction with the right-side touched point being fixed, the display portion aligns the display positions of the selected objects by right-alignment so that right ends of the selected objects are aligned with a predetermined right-alignment position;

when any of the selected objects is displayed at a position of one of the touched two points, the left-alignment position is a position of the left end of the selected object displayed at the touched position, and when none of the selected objects is displayed at the position of one of the touched two points, the left-alignment position is a position of the left end of a display area of the display portion or the position of the left end of the selected object located at a leftmost position; and when any of the selected objects is displayed at the position of one of the touched two points, the right-alignment position is a position of the right end of the selected object displayed at the touched position, and when none of the selected objects is displayed at the position of one of the touched two points, the right-alignment position is a position of the right end of the display area of the display portion or the position of the right end of the selected object located at a rightmost position among the selected objects;

in a case where the touched two points are in the vertical direction, when the touch panel portion has accepted that a lower touched point has been moved in an upward direction with an upper touched point being fixed, the display portion aligns the display positions of the selected objects by top-alignment so that upper ends of the selected objects are aligned with a predetermined top-alignment position, and when the touch panel portion has accepted that the upper touched point has been moved in a downward direction with the lower touched point being fixed, the display portion aligns the display positions of the selected objects by bottom-alignment so that lower ends of the selected objects are aligned with a predetermined bottom-alignment position;

when any of the selected objects is displayed at the position of one of the touched two points, the top-alignment position is the position of the upper end of the selected object displayed at the touched position, and when none of the selected objects is displayed at the position of one of the touched two points, the top-alignment position is the position of the upper end of a display area of the display portion or the position of the upper end of the selected object located at the uppermost position; and when any of the selected objects is displayed at the position of one of the touched two points, the bottom-alignment position is the position of the lower end of the selected object displayed at the touched position, and when none of the selected objects is displayed at the position of one of the touched two points, the bottom-alignment position is the position of a lower end of the display area of the display portion or the position of the lower end of the selected object located at the lowermost position;

in the case where the touched two points are in the horizontal direction, when the touch panel portion has accepted that an interval between the touched two points has been narrowed in the horizontal direction, the display portion aligns the display positions of the selected objects so that a center of each selected object in the horizontal direction is aligned with a center of a display area of the display portion in the horizontal direction; and in the case where the touched two points are in the vertical direction, when the touch panel portion has accepted that the interval between the touched two points has been narrowed in the vertical direction, the display portion aliens the display positions of the selected objects so that the center of each selected obi ect in the vertical direction is aliened with the center of a display area of the display portion in the vertical direction.

3. The display input device according to claim 1, wherein in the case where the touched two points are in the horizontal direction, when the touch panel portion has accepted that the interval between the touched two points has been broadened in the horizontal direction, the display portion aligns the display positions of the selected objects so that the spaces between the respective selected objects become equal to each other in the horizontal direction.

4. The display input device according to claim 3, wherein the display portion aligns the display positions of the selected objects such that the selected object displayed at the leftmost position and the selected object displayed at the rightmost position are not moved, and the spaces between the respective selected objects become equal to each other in the horizontal direction.

5. The display input device according to claim 3, wherein the display portion aligns the display positions of the selected objects such that the left end of the selected object displayed at the leftmost position is moved to the left end of the display area and the right end of the selected object displayed at the rightmost position is moved to the right end of the display area, and the spaces between the respective selected objects become equal to each other in the horizontal direction.

6. The display input device according to claim 1, wherein in the case where the touched two points are in the vertical direction, when the touch panel portion has accepted that the interval between the touched two points has been broadened in the vertical direction, the display portion aligns the display positions of the selected objects so that the spaces between the respective selected objects become equal to each other in the vertical direction.

7. The display input device according to claim 6, wherein the display portion aligns the display positions of the selected objects such that the selected object displayed at the uppermost position and the selected object displayed at the lowermost position are not moved, and the spaces between the respective selected objects become equal to each other in the vertical direction.

8. The display input device according to claim 6, wherein the display portion aligns the display positions of the selected objects such that the upper end of the selected object displayed at the uppermost position is moved to the upper end of the display area and the lower end of the selected object displayed at the lowermost position is moved to the lower end of the display area, and the spaces between the respective selected objects become equal to each other in the vertical direction.

9. The display input device according to claim 1, wherein in the case where the objects overlapping each other are selected, and the touched two points are in the horizontal direction, when the touch panel portion has accepted that the right-side touched point has been moved in the rightward direction with the left-side touched point being fixed, the display portion changes the display positions of the selected objects such that, of the overlapping selected objects, the selected object located at the leftmost position is not moved and the display positions of the other selected objects are shifted in the rightward direction, thereby to cancel the overlapping of the selected objects, and when the touch panel portion has accepted that the left-side touched point has been moved in the leftward direction with the right-side touched point being fixed, the display portion changes the display positions of the selected objects such that, of the overlapping selected objects, the selected object located at the rightmost position is not moved and the display positions of the other selected objects are shifted in the leftward direction, thereby to cancel the overlapping of the selected objects.

10. The display input device according to claim 1, wherein in the case where the objects overlapping each other are selected, and the touched two points are in the vertical direction, when the touch panel portion has accepted that the lower touched point has been moved in the downward direction with the upper touched point being fixed, the display portion changes the display positions of the selected objects such that, of the overlapping selected objects, the selected object located at the uppermost position is not moved and the display positions of the other selected objects are shifted in the downward direction, thereby to cancel the overlapping of the selected objects, and when the touch panel portion has accepted that the upper touched point has been moved in the upward direction with the lower touched point being fixed, the display portion changes the display positions of the selected objects such that, of the overlapping selected objects, the selected object located at the lowermost position is not moved and the display positions of the other selected objects are shifted in the upward direction, thereby to cancel the overlapping of the selected objects.

11. The display input device according to claim 1, wherein when the touch panel portion has accepted an operation of rotating the touched points in the state where the objects having been aligned are selected, the determination portion sets a reference point based on an angle of the rotation, and recognizes a reference line connecting predetermined specific portions of the plurality of selected objects having been aligned, and the display portion changes the display positions of the plurality of selected objects, based on a change in an angle of a straight line connecting the touched two points, so that the specific portions are located on the reference line rotated around the reference point.

12. The display input device according to claim 11, wherein when the touch panel portion has accepted an operation of rotating the touched points by 90° in the state where the objects having been aligned are selected, and the display portion changes the display positions of the plurality of selected objects such that the alignment direction of the selected objects is changed from the horizontal direction to the vertical direction, or from the vertical direction to the horizontal direction.

13. A display input device comprising:

a display portion that displays a screen and an image, and displays a plurality of objects which are images whose display positions are movable;

a touch panel portion that is provided for the display portion, and that accepts an input from a user, and detects a plurality of positions that are touched; and a determination portion that determines whether two points that are touched are in a vertical direction or in a horizontal direction; wherein the touch panel portion accepts an input of selecting, as selected objects, some or all of the objects displayed on the display portion;

when the touch panel portion has detected that two-point touching has been performed thereon in the state where the objects are selected, the display portion aligns the display positions of the selected objects in accordance with the direction of the touched two points and movement of the touched points;

in a case where the touch panel portion has accepted an operation of rotating the touched points in the state where the objects overlapping each other are selected;

when an amount of change in an angle of a straight line connecting the two points that are currently touched with respect to a straight line connecting the two points that have been touched first is smaller than a predetermined angle change amount, the display portion moves the selected objects in accordance with the amount of change in the angle, in a direction that cancels the overlapping of the selected objects; and when the amount of change in the angle exceeds the predetermined angle change amount, the display portion reverses the overlapping order of the selected objects, and moves the selected objects in a direction that returns the selected objects to their original positions, based on the amount of change in the angle.

* * * * *

UNITED STATES PATENT AND TRADEMARK OFFICE
CERTIFICATE OF CORRECTION

PATENT NO.         : 9,134,890 B2
APPLICATION NO.    : 13/856372
DATED              : September 15, 2015
INVENTOR(S)        : Norie Fujimoto and Yasuhiro Sekiguchi It is certified that error appears in the above-identified patent and that said Letters Patent is hereby corrected as shown below:

In the claims, column 48, line 28, claim 2, delete "obi ect" and insert --object--.

Signed and Sealed this
Twenty-second Day of March, 2016

Michelle K. Lee
*Director of the United States Patent and Trademark Office*